(12) United States Patent
Doerr et al.

(10) Patent No.: US 9,430,369 B2
(45) Date of Patent: Aug. 30, 2016

(54) MEMORY-NETWORK PROCESSOR WITH PROGRAMMABLE OPTIMIZATIONS

(71) Applicant: COHERENT LOGIX, INCORPORATED, Austin, TX (US)

(72) Inventors: Michael B. Doerr, Dripping Springs, TX (US); Carl S. Dobbs, Austin, TX (US); Michael B. Solka, Austin, TX (US); Michael R. Trocino, Austin, TX (US); Kenneth R. Faulkner, Austin, TX (US); Keith M. Bindloss, Irvine, CA (US); Sumeer Arya, Austin, TX (US); John Mark Beardslee, Menlo Park, CA (US); David A. Gibson, Austin, TX (US)

(73) Assignee: Coherent Logix, Incorporated, Austin, TX (US)

( * ) Notice: Subject to any disclaimer, the term of this patent is extended or adjusted under 35 U.S.C. 154(b) by 77 days.

(21) Appl. No.: 14/285,838

(22) Filed: May 23, 2014

(65) Prior Publication Data

US 2014/0351551 A1    Nov. 27, 2014

Related U.S. Application Data

(60) Provisional application No. 61/827,117, filed on May 24, 2013.

(51) Int. Cl.
*G06F 12/02* (2006.01)
*G06F 9/30* (2006.01)
*G06F 9/38* (2006.01)

(52) U.S. Cl.
CPC ....... *G06F 12/0215* (2013.01); *G06F 9/30181* (2013.01); *G06F 9/3853* (2013.01); *G06F 9/3885* (2013.01); *G06F 9/30145* (2013.01); *G06F 9/3851* (2013.01)

(58) Field of Classification Search
CPC . G06F 9/30145; G06F 9/3851; G06F 9/3885
See application file for complete search history.

(56) References Cited

U.S. PATENT DOCUMENTS 6,453,405 B1 *  9/2002  Hoyle ............... G06F 9/30036
                                                        711/110
7,415,594 B2    8/2008  Doerr
(Continued)

FOREIGN PATENT DOCUMENTS

WO    WO 2010/093828    8/2010

OTHER PUBLICATIONS

Hinton et al.; "Performance Enhancements of the Superscalar i960 Processor Family"; 8080 Wescon Conference Record; Nov. 1990; pp. 463-466; North Hollywood, CA, U.S.
(Continued)

*Primary Examiner* — Michelle Taeuber
(74) *Attorney, Agent, or Firm* — Meyertons Hood Kivlin Kowert & Goetzel, P.C.; Jeffrey C. Hood; Matthew C. Washburn

(57) ABSTRACT

Various embodiments are disclosed of a multiprocessor system with processing elements optimized for high performance and low power dissipation and an associated method of programming the processing elements. Each processing element may comprise a fetch unit and a plurality of address generator units and a plurality of pipelined datapaths. The fetch unit may be configured to receive a multi-part instruction, wherein the multi-part instruction includes a plurality of fields. A first address generator unit may be configured to perform an arithmetic operation dependent upon a first field of the plurality of fields. A second address generator unit may be configured to generate at least one address of a plurality of addresses, wherein each address is dependent upon a respective field of the plurality of fields. A parallel assembly language may be used to control the plurality of address generator units and the plurality of pipelined datapaths.

15 Claims, 34 Drawing Sheets

(56) References Cited

U.S. PATENT DOCUMENTS

| | | | |
|---|---|---|---|
| 2002/0069345 A1* | 6/2002 | Mohamed | G06F 9/3802 712/215 |
| 2004/0030859 A1* | 2/2004 | Doerr | G06F 15/8023 712/15 |
| 2013/0067205 A1* | 3/2013 | Plondke | G06F 9/3853 712/223 |
| 2014/0115569 A1* | 4/2014 | Jung | G06F 8/4432 717/160 |
| 2016/0062770 A1* | 3/2016 | Venkumahanti | G06F 9/3885 712/24 |

OTHER PUBLICATIONS

International Search Report for Application No. PCT/US2014/039345, mailed Feb. 2, 2015; 6 pages.

* cited by examiner

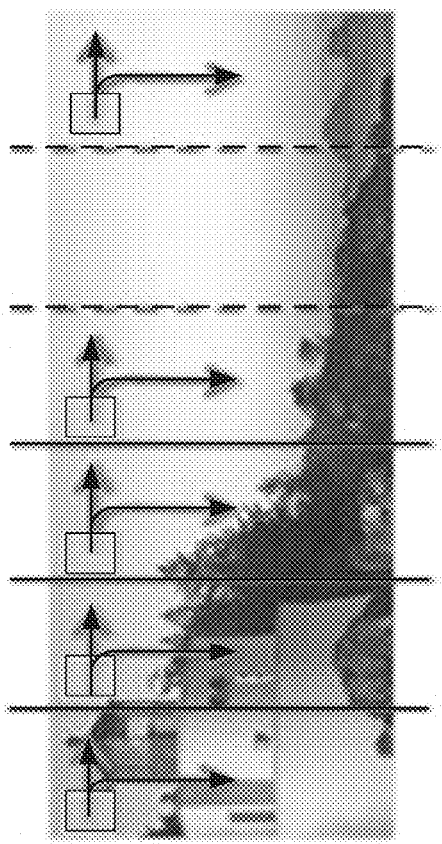
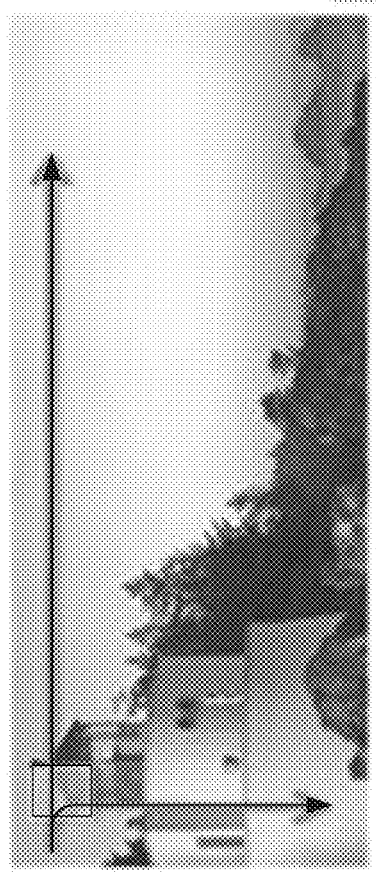
FIG. 9B
FIG. 9A

| 4th Generation (nominal 9) | |
|---|---|
| Stage | Description |
| IFA | Instruction Fetch (mem rd) |
| IFB | Instruction Decode |
| IFC | Instruction Issue & Operand Addr |
| OFA | Arbitrate |
| OFB | Operand Read (mem rd) |
| OFC | Operand Return |
| EXE | Execute (variable) & Result Addr |
| WBA | Result Data & Arbitrate |
| WBB | Result Write (mem wrt) |

- IFA: Fetch
- IFB, IFC: Decode/Issue
- OFA, OFB, OFC: Operand Fetch
- EXE: Execute
- WBA, WBB: Write-back

FIG. 18

Normal mode:
i6 = start;
s6 = incr;
for() {
   i6 += s6;
}

1D Circular mode:
i6 = start;
i7 = end;
s6 = incr;
s7 = wrap_incr = (incr-len) ;
wrap = 0;
for() {
   if (wrap) i6 += s7;
   else i6 += s6;
   wrap = (i6 >= i7) ;
}

| 127 | 126 | 125 | 124 | 123 | 122 | 121 | 120 | 119 | 118 | 117 | 116 | 115 | 114 | 113 | 112 | 111 | 110 | 109 | 108 | 107 | 106 | 105 | 104 | 103 | 102 | 101 | 100 | 99 | 98 | 97 | 96 |
|---|---|---|---|---|---|---|---|---|---|---|---|---|---|---|---|---|---|---|---|---|---|---|---|---|---|---|---|---|---|---|---|
| 1 | condExec | | | | | | | | | typG0 | typG1 | typG2 | adrG0 | | | | | | | | | | | | | | | | | | |

| 95 | 94 | 93 | 92 | 91 | 90 | 89 | 88 | 87 | 86 | 85 | 84 | 83 | 82 | 81 | 80 | 79 | 78 | 77 | 76 | 75 | 74 | 73 | 72 | 71 | 70 | 69 | 68 | 67 | 66 | 65 | 64 |
|---|---|---|---|---|---|---|---|---|---|---|---|---|---|---|---|---|---|---|---|---|---|---|---|---|---|---|---|---|---|---|---|
| adrG1 | | | | | | | | | | | | | | | | adrG2 | | | | | | | | | | | | | | | |

| 63 | 62 | 61 | 60 | 59 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 | 32 |
|---|---|---|---|---|---|---|---|---|---|---|---|---|---|---|---|---|---|---|---|---|---|---|---|---|---|---|---|---|---|---|---|
| fmt | | opG0 | | | | | | | opG1 | | | | | | | opG2 | | | | | | | | opDP0 (p1) | | | | | | | |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| opDP0 (p2) | | | | | | | | | | | opDP1 | | | | | | | | | | | | | | | | | | | | |

FIG. 27

MEMORY-NETWORK PROCESSOR WITH PROGRAMMABLE OPTIMIZATIONS

PRIORITY CLAIM

This application claims the benefit of U.S. Provisional Application No. 61/827,117, filed May 24, 2013, and titled "Memory-Network Processor with Programmable Optimizations", which is incorporated by reference as if fully and completely set forth herein.

TECHNICAL FIELD

This invention relates to multi-processor systems, and more particularly to improvements in processor operation and execution, as well as development of software targeted to such systems.

DESCRIPTION OF THE RELATED ART

A primary objective of a generic hardware system is to achieve application specific (non-programmable) hardware performance while preserving full programmability. Historically, these two concepts are diametric extremes. Application specific hardware is a fixed hardware solution that performs specific functions in the most efficient way possible. This is usually measured in terms of energy per function or energy per operation(s) and in terms of function per (circuit) area which can be related to partial cost of a product. Cost and market dynamics have driven innovation to attempt to meet this objective. Cost of a chip product is made up of many factors including die area and final package. Cost should also take into consideration the entire ecosystem to develop a product. This ecosystem cost is made up of the time to reduce a specific application to a specific hardware solution, the number of specific hardware solutions required to make up an entire system, and the time it takes to integrate all of the specific hardware solutions through customized communication and memory structures, etc. Thus a fully integrated solution is required to support all of the numerous specific hardware solutions with their custom interconnect, resulting in a very large area requirement on a single chip die. Historically, this process has resulted in solutions that are non-efficient in area, energy, and time-to-market.

When considering the world of programmability and the concept of targeting hardware, the marketplace or landscape from a hardware architectural and software development style perspective is represented by General Purpose Processors (GPPs) that companies like Intel, AMD (Intel or Arm instruction set based) and ARM provide; Graphical Processing Units (GPUs) from the likes of nVidia and AMD (used to be ATI and acquired by AMD in 2006); Digital Signal Processors (DSPs) from TI and Analog Devices; Field Programmable Gate Arrays (FPGAs) from Xilinx, Altera, etc.; Multi-Core/Many-Core Processors from Cavium and Tilera; and Application Specific Integrated Circuits (ASICs) or System On Chips (SoCs).

The General Purpose Processor (GPP):

The GPPs are for general purpose processing, that is, trying to be a jack of all trades, based on very old but proven hardware architecture thinking over more than 40 years. Their mainstream purpose is running user interface (UI) and highly interactive UI intensive applications like MSWord, Excel, email, etc., with a supporting operating system (e.g. Windows and Linux). The hardware characteristics that impact power dissipation are multi-level caches, complex hardware memory management units, large buses, and large clocking structures. In summary, they dissipate a lot of power to perform these tasks. From the perspective of software development, it is considered the easiest software programming model to target. This is from the perspective that the user is developing a single thread that executes consecutively or serially. When parallelism or multiple hardware threads (greater than about four threads) are introduced, the ability to program them efficiently becomes much harder. This is due to the fact that fundamentally the architecture was not developed to support parallel thread operation, and as a result the hardware architecture requires a tremendous amount of overhead complexity to manage. The software programming model requires the introduction of an API or language extensions in order to support the definition of multiple software threads. Although this does not have to be complex, unfortunately current GPP hardware architectures require such complexity.

At a high level, an API that has been extensively used with C, C++, Fortran, etc. for many years in every supercomputer in the world is the MPI (message passing interface) API, an industry standard since the early 1990s. This is a very simple, well understood, API that does not restrict the hardware implementation path. The MPI API allows definition of software threads and communication in a manner that is independent of hardware. This is different from OpenMP, Coarray Fortran, OpenCL, etc. and other language/APIs that inherently dictate an assumed underlying hardware model, which thus restricts interpretation flexibility and causes a forward compatibility issue. In other words, with these latter languages/APIs, the programmer is required to rewrite the program for every new hardware platform targeted.

The Graphical Processing Unit (GPU):

GPUs were historically developed for processing and targeting the display of data. They are hardware architecturally constrained by their out of core (external) memory model requirements and inner core memory model requirements. The out of core memory requires a GPP to place data in the GPUs memory space. The GPU then pulls in the data, operates on it in a pipeline fashion and then places it back in its external memory space. From here, the data can be sent to a display, or a GPP needs to move the data out of the GPUs memory space to be used/stored further in operation under general processing. Inefficiencies in the hardware are due to (1) the support required to move data around to support out-of-core hardware restrictions and (2) the limited inner-core memory structure, where data is restricted to being processed in streamlined pipelines—similar to deeply pipelined SIMD machines. The result is high power due to hardware inefficiencies to process data. The software programming models used are extremely hardware centric, OpenCL, CUDA, etc. and thus are complex to achieve efficiency and not very portable, with code having to be re-written and re-structured when trying to move to a new hardware target platform.

The Digital Signal Processor (DSP):

DSPs can be viewed as a GPP with an instruction set that has been reduced and targeted for generic signal processing. They suffer from the same cache, MMU, and bus woes of their big brother/sister GPP. Additionally, any really high throughput processing function such as Viterbi/Turbo decoding or motion estimation has been reduced to an ASIC accelerator with limited capability, usually only supporting a limited set of specific standards in the commercial marketplace. The programming model is similar to the GPP when targeting a single hardware thread, but because of the signal processing instruction approach in execution unit hardware, to achieve any high efficiency requires hand assembly of functions or use of the DSP company's libraries. When creating a multiple parallel DSP architecture, similar to the parallel GPP discussed above, the problems are further exacerbated.

The Field Programmable Gate Array (FPGA):

FPGAs are a completely different hardware approach where the definition of functionality can be done at a bit-level and communication between logical functions is done through programmable wire structures. This hardware approach introduces tremendous overhead and complexity. Due to this, efficient programming is performed in a hardware programming language such as Verilog or VHDL. The compilation process is much more complex due to programmable wiring and programmable logic introducing timing closure hurdles, similar to what is required in an ASIC/SOC but with a structured wire fabric. Power dissipation and performance throughput on specific functions are obviously much better than a GPP or GPU when comparing only one function at a time due to the FPGA only performing exactly what it is programmed for and nothing else. However, if all of the capabilities of the GPP were attempted to be implemented in the FPGA, it would obviously be much worse than the GPP. The difficulty of programming at the hardware level is obvious (for example timing closure). Programming an FPGA really is not "programming," but rather it is logic/hardware design, and VHDL/Verilog are logic/hardware design languages, not programming languages.

The Multi-Core/Many-Core:

Almost all of the multi-core/many-core architectures are, from a hardware perspective, taking a core processor, the cache, MMU, buses, and all associated logic and replicating them on a die with a communication bus/fabric around them. Examples of a multi-core architecture are IBM's Cell, Intel's and AMD's quad and N multi-cores, Cavium's and Tilera's products, a number of custom SoCs, etc. In addition, the power reduction achieved in multi-core architectures is largely insignificant. This fairly obvious result derives from the fact that the multi-core approach merely replicates the GPU approach. The only real power saving in a multi-core architecture is a reduction in some IO drivers which now are not needed since the cores are connected on an added communication bus, whereas before they were on separate die. Thus the multi-core approach does not result in any less power. Secondly, the software programming model is not improved from the GPP discussed above.

The Application Specific Integrated Circuits (ASIC) or System On Chips (SoC):

The list of issues identified for the other approaches is why, for specific markets, it is often viewed that the only way to achieve performance efficiency and cost goals is to develop a custom chip that has specific GPPs, DSPs, and ASIC accelerators to form an SoC. The SoC provides programmability where needed and ASIC performance for specific functions to balance power dissipation and cost. However, now the software programming model is even more complex than discussed under the above programmable hardware solutions. In addition, SoCs may result in a loss of flexibility associated with a fully programmable solution.

Common among all of these programmable hardware solutions is that the software programming models represented today in the marketplace are focused on extrapolating the execution model and underlying hardware architecture to more efficiently support it's targeting. The focus on extrapolating up features of the execution model to the software programming model can be observed in looking at key characteristics of some of the more popular parallel programming languages. A few examples representing approaches in use today are OpenMP, OpenCL, and MPI.

OpenMP:

OpenMP (Open Multi-Processing) is an industry standard API that supports shared memory multiprocessing programming. OpenMP comprises a set of compiler directives, library routines, and environment variables that influence run-time behavior. It supports multithreading through a method of parallelizing whereby a master thread (a series of instructions executed consecutively) forks a specified number of slave threads and a task is divided among them. The threads then run concurrently, with the runtime environment allocating threads to different resources or processors depending on usage, machine load and other factors. The number of threads can be assigned by the runtime environment based on environment variables or in code using functions. The section of code that is meant to run in parallel is marked accordingly, with a preprocessor directive that will cause the threads to form before the section is executed. In C/C++ this is through the use of #pragmas. By default, each thread executes the parallelized section of code independently. Both task parallelism and data parallelism can be achieved. After the execution of the parallelized code, the threads join back into the master thread, which continues onward to the end of the program. FIG. 1 illustrates multi-threading utilizing OpenMP, where the master thread forks off a number of threads which execute blocks of code in parallel. To support inter thread communication, extensions of OpenMP could be used or another different industry standard API such as MPI (Message Passing Interface).

OpenCL:

The Open Computing language (OpenCL) is a framework for writing programs with the objective to enable execution across heterogeneous platforms comprising central processing units (CPUs), graphics processing units (GPUs), digital signal processors (DSPs), field-programmable gate arrays (FPGAs) and other processors. It is designed to support close-to-hardware interface with limited abstraction. Because of this, OpenCL based programs generally require advanced knowledge of underlying hardware to achieve acceptable performance. OpenCL programs also require refactoring when retargeting to a different hardware architecture. As shown in FIG. 2, OpenCL supports a strict processing model, control model, memory model, and communication model hierarchy.

OpenCL supports writing of kernels using the ANSI C programming language with some limitations and additions. It does not allow the use of function pointers, recursion, bit fields, variable-length arrays, and standard header files. The language is extended to support parallelism with vector types and operations, synchronization, and functions to work with work-items/groups. An application programming interface (API) is used to define and then control the platform. OpenCL, at a course-level, supports parallel computing using task-based and data-based parallelism.

MPI:

The Message Passing Interface (MPI) is a standardized language-independent, scalable, and portable message-passing communications protocol API. The MPI API is meant to provide essential virtual topology, synchronization, and communication functionality between a set of processes (that have been mapped to nodes/servers/computer instances) in a language-independent way, with language-specific syntax (bindings). The MPI API standard defines the syntax and semantics of a core of library routines that include support for, but are not limited to, various behavior definable point-to-point and collective/broadcast communication send/receive operations and synchronizing of processes. MPI remains the dominant model used in high-performance computing today.

The MPI API is the most hardware independent approach, and thus used as the basis for the examples presented.

Prior art approaches to development of software applications for parallel execution on multiprocessor systems generally require tradeoffs between ease of development and efficiency of parallel execution. In other words, it has generally been the case that the easier the development process for the programmer, the more inefficiently the resulting executable program executes concurrently on hardware; and conversely, more efficient parallel execution has generally required significantly more effort by programmers, i.e., to design programs in greater detail to avoid inefficient processing and to use efficiency enhancing features of the target hardware.

Therefore, improved systems and methods are desired for facilitating the software description of the application or system level view to drive the software programming model and its subsequent use to target the execution model and underlying hardware architecture. Improvements are also desired which provide mechanisms that enable efficient programmable implementation of applications through this process.

SUMMARY

Various embodiments are disclosed of a multiprocessor system with processing elements optimized for high performance and low power dissipation and an associated method of programming the processing elements.

A first embodiment relates to a processor apparatus comprising a fetch unit and a plurality of address generator units. The fetch unit is configured to receive a multi-part instruction, wherein the multi-part instruction includes a plurality of fields. A first address generator unit is configured to perform an arithmetic operation dependent upon a first field of the plurality of fields. A second address generator unit is configured to generate at least one address of a plurality of addresses, wherein each address is dependent upon a respective field of the plurality of fields.

A second embodiment related to controlling multiple datapaths involves a processor apparatus comprising a fetch unit and an execution unit. The fetch unit is configured to receive a multi-part instruction, wherein the multi-part instruction includes a plurality of data fields. The execution unit includes a plurality of pipeline units, wherein the execution unit is configured to: 1) perform a first operation using a given pipeline unit of the plurality of pipeline units dependent upon a first field of the plurality of fields; and 2) perform a second operation using, in parallel, at least two pipeline units of the plurality of pipeline units dependent upon a second field of the plurality of fields.

A third embodiment related to accumulate forwarding involves a processor apparatus comprising a fetch unit and an execution unit. The fetch unit is configured to receive an instruction. The execution unit comprises a plurality of pipeline units, wherein each pipeline unit of the plurality of pipeline units includes an accumulator unit, wherein the execution unit is configured to: 1) perform, using a first pipeline unit of the plurality of pipeline units, a first operation dependent upon the received instruction to generate a result; 2) store the result in the accumulator unit of the first pipeline unit of the plurality of pipeline units; and 3) transfer the result stored in the accumulator unit of the first pipeline unit of the plurality of pipeline units to an accumulator unit of a processor.

A fourth embodiment related to address generator unit coupling involves a processor apparatus comprising a fetch unit and a plurality of address generator units. The fetch unit is configured to receive a multi-part instruction, wherein the multi-part instruction includes a plurality of fields. A first address generator unit is configured to perform a first operation dependent upon a first field of the plurality of fields to generate a first result. A second address generator unit is configured to perform a second operation dependent upon a second field of the plurality of fields and the first result.

A fifth embodiment relates to a processor apparatus capable of receiving instructions with single-part/multi-part determination. The processor apparatus may comprise a fetch unit configured to receive an instruction and an execution unit. The execution unit may comprise a plurality of pipeline units. The execution unit may be configured to: 1) perform a first operation using a first pipeline unit of the plurality of pipeline units responsive to a determination that the instruction is a multi-part instruction, wherein the multi-part instruction includes a plurality of fields, wherein the first operation is dependent on a first field of the plurality of fields; and 2) perform a second operation using, in parallel, at least two pipeline units of the plurality of pipeline units dependent upon a second field of the plurality of fields.

A sixth embodiment relates to a processor apparatus capable of powering down unused portions of a processor during repeat loops. The processor apparatus may comprise a fetch unit and an execution unit. The fetch unit is configured to receive a plurality of instructions and identify at least one repeated instruction sequence based upon the received plurality of instructions. The at least one repeated instruction sequence includes at least one instruction of the plurality of instructions. The execution unit includes a plurality of pipeline units, wherein the execution unit is configured to: 1) selectively disable a first subset of the plurality of pipeline units for at least a first cycle based upon the identified repeated instruction sequence; and 2) selectively disable a second subset of the plurality of pipeline units for a second cycle dependent upon the identified repeated instruction sequence.

Embodiments of a method for developing software targeted for parallel execution on a multiprocessor system are presented.

Input may be received specifying a plurality of views of a desired system, e.g., of an application targeted for deployment and execution on a multiple processor system. Each view may represent or specify a respective aspect of the system, and the views may collectively provide information usable by a compiler (or other software tool) to generate an executable program that is deployable to the multiprocessor system for efficient parallel execution.

The input may be received in any of a variety of forms, and via any of a variety of tools. For example, in some embodiments, the input may be provided by a user, i.e., may be user input. In other embodiments, the input may be received from another system or process, from a storage medium, and so forth, as desired. Moreover, the input may be provided locally, or may be received over a network, such as a local area network (LAN) or a wide area network (WAN), such as the Internet. In one exemplary embodiment, the user may specify the views in a spreadsheet. In another exemplary embodiment, the user may enter the input to a wizard, i.e., a graphical user interface (GUI) that leads the user through the specification process, e.g., via prompts, helpful suggestions, etc. In a further embodiment, the user may use a checklist to manage the input/specification process, where each item to be specified, e.g., views, sub-views, etc., is represented in the checklist, and where the checklist indicates whether each checklist item has been specified (or not). In another exemplary embodiment, one or more templates or forms may be provided, which the user may populate with information specifying the views.

Each view may include or be a representation of a respective aspect of the application's operation or execution. The multiple views may include a memory view, a communication view, a control view, and a processing view. Other views may also be defined or specified as desired. In one embodiment, each view may include or specify multiple sub-views (or "facets") specifying more detailed attributes of the view. For example, each view may include size, behavior, and accessibility sub-views (or facets), where each sub-view may have a specific meaning in the context of the view of which it is a part.

Thus, for example, the memory view may specify the size (or amount) of memory required or available for use by the application, i.e., the memory structure size used by the application to process data; the behavior of the memory, i.e., the way the memory structure behaves in time; and the memory accessibility, i.e., the accessibility of the memory structure, e.g., by the application and/or system.

Similarly, the input may define or specify the communication view, including defining respective sub-views of the communication view, e.g., communication size, behavior, and accessibility, the control view, including control size, behavior, and accessibility, and the processing view, including processing size, behavior, and accessibility.

Note that in some embodiments, some of the views or sub-views may be defined or specified automatically by specification of the other sub-views or views, e.g., by the sub-views of the same or other views. Thus, for example, the communication behavior may be automatically specified once the memory size, behavior, and accessibility are specified. Considered another way, in some embodiments, the views may be "over-specified" or "over-determined" similar to over-determined systems of linear equations, where the number of equations exceeds the number of variables.

It should be noted that the particular terms or labels used herein are exemplary only, and that any names may be used for the novel components, information, and processes disclosed herein as desired. For example, the views or aspects may also be referred to as models, etc., and the sub-views disclosed herein may be referred to as sub-models, facets, properties, etc., and so forth, as desired.

Once the views of the system have been specified or defined, information representing the views may be included in the source code of the application. This inclusion may be performed in any of a wide variety of ways. For example, in some embodiments, the information may be included in one or more header files of the application. In other embodiments, the information may be included in one or more dynamic linked libraries (DLLs) or macro definitions, among other application program elements or components. More generally, the information representing the views may be incorporated into the application source code in any way, and in any form, as desired.

The source code may be processed, e.g., by a compiler or other tool, including analyzing the information representing the multiple views specified or defined for the system. For example, in one embodiment, the compiler may be configured to recognize the information representing the multiple views in the application source code, and may extract and analyze the information. In other embodiments, the compiler may analyze the information in situ.

An executable program may be generated based on the processing, where the executable program is deployable to a multiprocessor system for efficient parallel execution. In other words, the compiler may generate the executable program based on the processing, including the analysis of the specified views.

Thus, embodiments of the present techniques may address various shortcomings of prior art approaches to software development noted above, allowing users to specify various requirements or constraints regarding operation of the system, e.g., operation of the application on the multiprocessor system, where these specified requirements or constraints may be used by a compiler (or other tool) to generate executable code that may be executed efficiently on the system.

BRIEF DESCRIPTION OF THE DRAWINGS

FIGS. 9A-9B show two common 2D filtering organization schemes;

FIG. 18 illustrates pipeline stages of one embodiment of a 9-stage PE pipeline;

FIG. 27 shows one embodiment of a HyperOp instruction;

Figure 1:
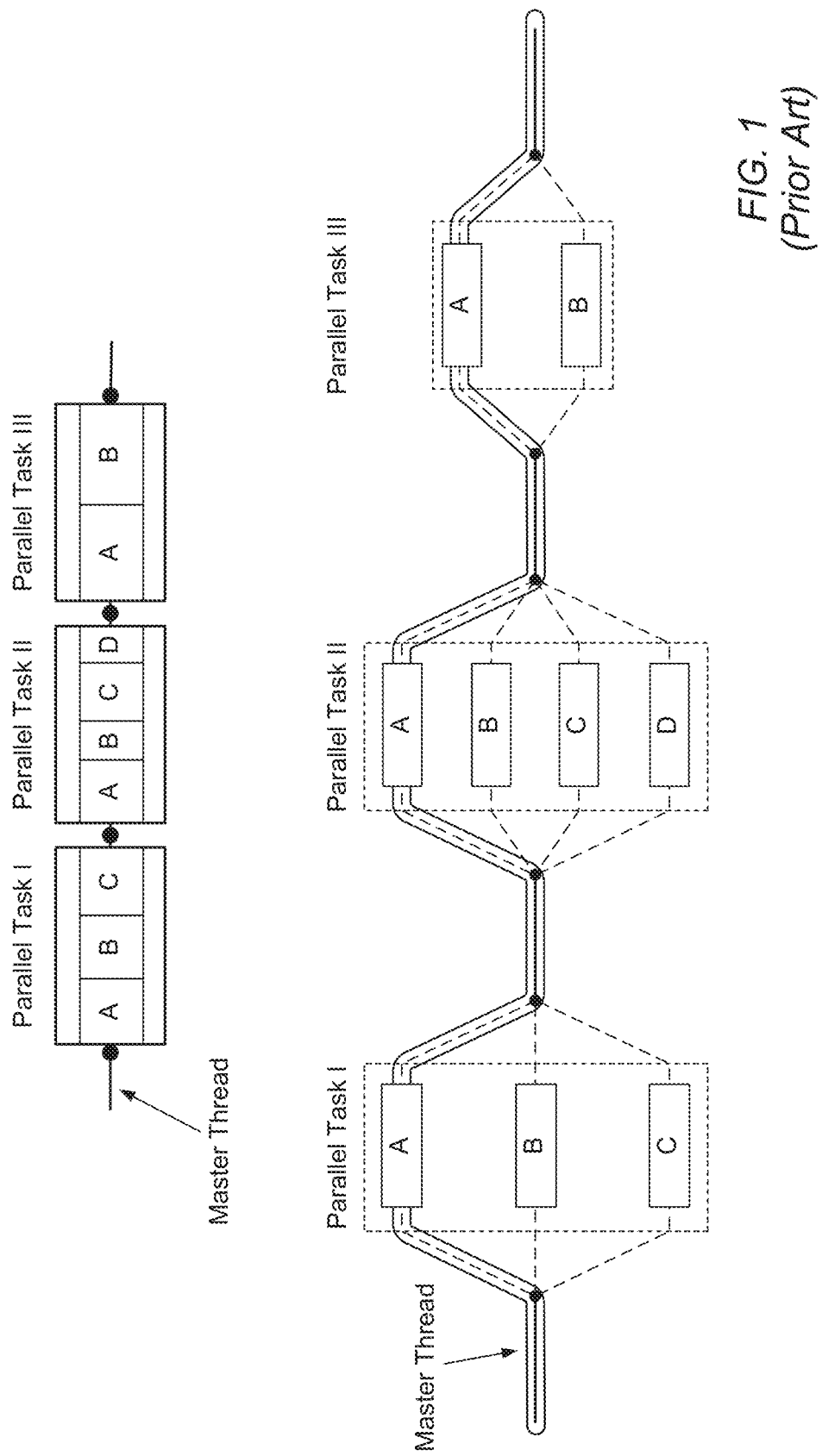
FIG. 1 illustrates multithreading utilizing OpenMP, where the master thread forks off a number of threads which execute blocks of code in parallel.
Figure 2:
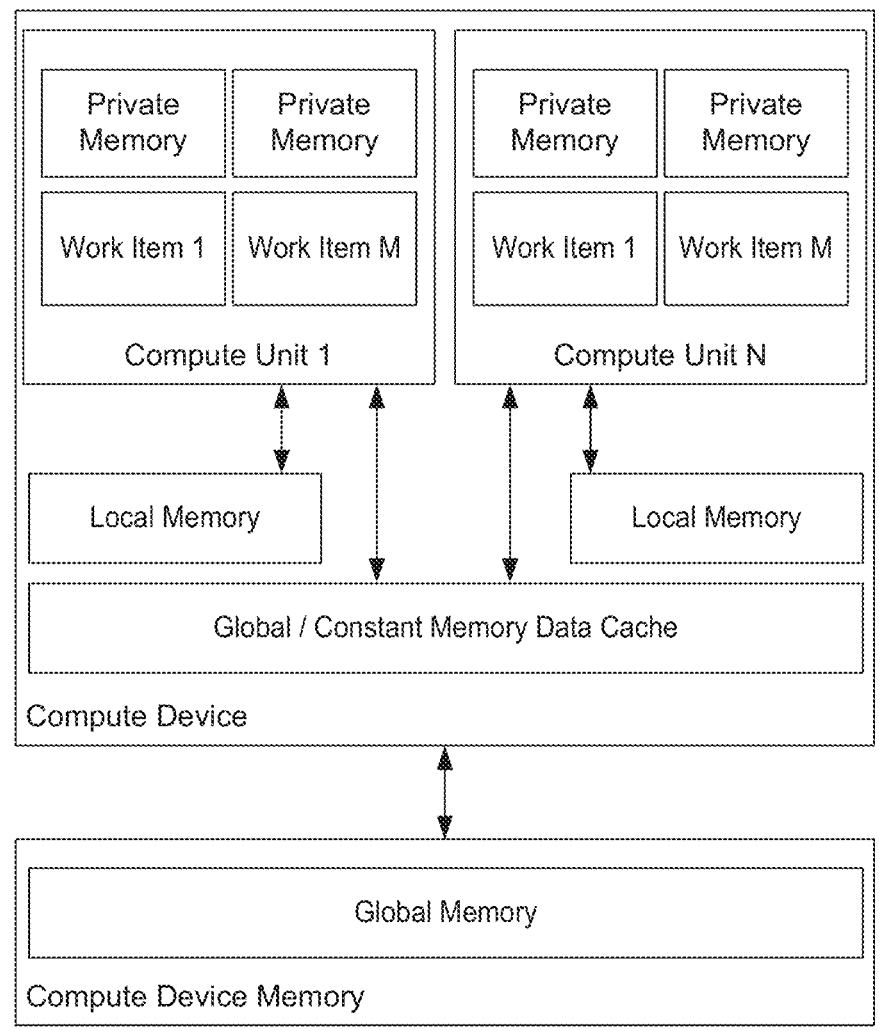
FIG. 2 illustrates strict processing model, control model, memory model, and communication model hierarchy of OpenCL.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

Incorporation by Reference

U.S. Pat. No. 7,415,594 titled "Processing System With Interspersed Stall Propagating Processors And Communication Elements" whose inventors are Michael B. Doerr, William H. Hallidy, David A. Gibson, and Craig M. Chase is hereby incorporated by reference in its entirety as though fully and completely set forth herein.

Terms

Computer System—The term "computer system" refers to any of various types of computing or processing systems, including a personal computer system (PC), mainframe computer system, workstation, network appliance, internet appliance, personal digital assistant (PDA), grid computing system, or other device or combinations of devices. In general, the term "computer system" can be broadly defined to encompass any device (or combination of devices) having at least one processor that executes instructions from a memory medium.

Software Application—The term "software application" (also referred to herein as just an "application") is intended to have the full breadth of its ordinary meaning, and includes any type of program instructions, code, script and/or data, or combinations thereof, that may be stored in one or more memories and executed by one or more processors. Exemplary software applications include programs written in text-based programming languages, such as C, C++, FORTRAN, Java™, assembly language, etc.; graphical programs (programs written in graphical programming languages); assembly language programs; programs that have been compiled to machine language; scripts; and other types of executable software. In general a program is a set of instructions that specify one or more data structures and that specify the procedural steps to take with regard to data in those structures to perform one or more functions. A program is often targeted for specific machine architecture. More abstractly, the procedural steps of a program may be referred to as its algorithm.

An application may execute on one or more processors of a multi-processor system (MPS) and may read data from and/or write data to one or more of the local memories of the MPS. An application may include one or more computational tasks, where each task typically runs on a single processor of the MPS and may share the processor with one or more tasks from one or more applications. The application may perform a particular function or operation. If the application includes more than one task, the tasks may communicate with each other to perform the function or operation.

The MPS may simultaneously execute a plurality of applications, e.g., where the applications execute in parallel with each other. The applications may communicate with each other, and the respective functions or operations performed by the applications may build upon each other to perform a larger or higher-level function or operation.

Software Programming Model—The Software Programming Model, simply stated, is the user's view of the machine and its operating environment. The Software Programming Model includes the language (or languages) that an application can be written in as well as the libraries that provide abstracted, encapsulated functionality beyond that expressed directly in the language(s). The Software Programming Model also includes the mechanisms through which an application interacts with entities outside of itself (I/O, extended memory, etc.) and through which meta-information (e.g., performance constraints or requirements) about the application is expressed. Two primary parts of the Programming Model are the Control Model, which represents how parallelism is expressed in or derived from the application, and the Communication Model, which represents how the parallel entities of the application share information.

The Software Programming Model presents an "idealized" view of the actual control and data flow and communications that will occur when the application is ultimately executed. The semantics of the operations are "as if" the underlying implementation performed exactly as described in the Software Programming Model; the actual steps undertaken are not important as long as the same effects (answers) are obtained. The actual implementation steps may differ for reasons of efficiency in code and/or data size, speed, power consumption, etc.

An important consideration of the Software Programming Model is that it simultaneously provides the user with mechanisms that support the expression of the application (and its operation) in terms that are convenient, natural, and intuitive for the user while also capturing information sufficient to support the correct and efficient processing of the application through the toolset (compiler, etc.) and then under the Execution Model.

Hardware Programming/Execution Model—The Hardware Programming Model or Execution Model represents how an application is executed. It defines how the set of information that corresponds to an application's logic and data objects is expressed and how that information is processed over time to accomplish the function specified by the application. The purpose of the system tools (compiler, parallelism extractor, place-and-route, etc.) is to convert the application from its Software Programming Model expression into the corresponding Execution Model expression. The Execution Model includes the mechanisms required to support the functionality described by the Software Programming Model (e.g., through libraries) as well as monitor, mediate, and manage the use of the hardware (e.g., through an O/S).

The Execution Model may correspond quite closely to the Software Programming Model or it may be quite different; different aspects of the Software Programming Model may have different degrees of direct correspondence to the Execution Model. The level of correspondence is related to how closely the Underlying Hardware Architecture resembles the original (Software) Programming Model. The closer the resemblance, the higher the correspondence.

Underlying Hardware Architecture—The Underlying Hardware Architecture is the architecture of the physical device on which the computation executes. At this level, all operations directly correspond to physical operations carried out by the device. The level of abstraction at which the Underlying Hardware Architecture may be described can vary from a high-level conceptual architecture (useful for evaluation, simulation, characterization, and tradeoff analysis during design-space exploration) to a low-level implementation architecture (useful for driving the physical design of a device to be fabricated). Even at the implementation level, different instances of the Underlying Hardware Architecture may vary in capability or capacity. For example, one instance may implement a 10×10 grid of processing units while another may implement only a 6×6 grid. While different in capacity, each remains consistent with the Underlying Hardware Architecture.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

MPS System Overview

Various embodiments of a multi-processor system (MPS) and an associated method are described. A multi-processor system (MPS) may be defined as a system that includes a plurality of processing elements (PEs). An MPS may have a plurality of memories interspersed among the PEs, or alternatively may have a single shared memory. As used herein, the term "processing element" refers to a processor or CPU (central processing unit), microprocessor, or a processor core. Although an MPS may include any number of two or more PEs, it is noted that some MPSs may include significantly more PEs than a traditional computer system which typically includes only one general purpose processor (GPP), or a few GPPs. For example, some MPSs may include 4, 8, 16, 32, or 64 PEs (other examples include, e.g., dozens, hundreds, or even thousands of PEs). In some embodiments, PEs suitable for large MPSs may be more energy efficient than general purpose processors used by traditional computer systems because of their special construction for the purpose of low power consumption.

MPS may also include an interconnection network (IN) that interconnects the PEs and/or memories. The PEs and memories may be interconnected in one, two, three, or more dimensions, including circular dimensions (e.g., loops or rings). A higher-dimensioned MPS can be mapped onto fabrication media with fewer dimensions. For example, an MPS with the shape of a four dimensional (4D) hypercube can be mapped onto a 3D stack of silicon integrated circuit (IC) chips, or onto a single 2D chip, or even a 1D line of computational units. Also, low-dimensional MPSs can be mapped to higher dimensional media. For example, a 1D line of computation units can be laid out in a serpentine shape onto the 2D plane of an IC chip, or coiled into a 3D stack of chips. An MPS may include multiple types of computational units and interspersed arrangements of processors and memory. Also included in the broad sense of an MPS is a hierarchy or nested arrangement of MPSs, especially an MPS composed of interconnected IC chips where the IC chips contain one or more MPSs which may also have deeper hierarchal structure.

As used herein, the term MPS covers both relatively homogeneous sets of processors, as well as heterogeneous collections of general purpose, and specialized processors that are integrated on so-called "platform IC" chips. Platform IC chips may contain from a few to many processors, typically interconnected with shared memory and perhaps an on-chip network. There may or may not be a difference between an MPS and a "platform IC" chip. However, a "platform IC" chip may be marketed to address specific technical requirements in a specific vertical market.

In general, the memory for an MPS may be organized in a hierarchy with fast memory at the top and slower but higher capacity memory at each step down the hierarchy. In an MPS, supporting memories (SM) at the top of the hierarchy may be located nearby each PE. Each supporting memory may be specialized to hold only instructions or only data. A supporting memory for a particular PE may be private to that PE or shared with other PEs.

Further down the memory hierarchy there may be a larger shared memory, such as a semiconductor synchronous dynamic random access memory (SDRAM) with a bit capacity many times larger than that of the supporting memory adjacent to each PE. SDRAM may be located on a separate IC chip or chips from the PE and supporting memory, to specialize its fabrication. Further down the memory hierarchy there may be other types of memory, such as flash memory, magnetic disks, and optical disks.

The MPS may be programmed with software programs to accomplish specific functions. Each of the functions may be executed by one or more of the PEs in the MPS. Oftentimes, multiple programs may execute concurrently with each other on the MPS. The programs may execute together and communicate with each other to perform a more complex function or to perform a simpler function faster by employing parallel processing techniques. Such coordination between PE is referred to herein as cooperative processing.

An MPS may execute an application or program fast enough that it can accept input data and commands faster than the associated sources of data and commands can provide them and can provide results with a latency that is low enough to be ignored. Such an application is referred to as operating without delays in real time or as a "real-time application". The associated input data (or commands) may be referred to as "real-time data" (or "real-time" commands. For example, the MPS may receive real-time data via an input signal. One or more of the applications, programs, or functions, may process the input signal, and possibly produce an output signal with modified or additional real-time data based on the program or programs.

Figure 3:
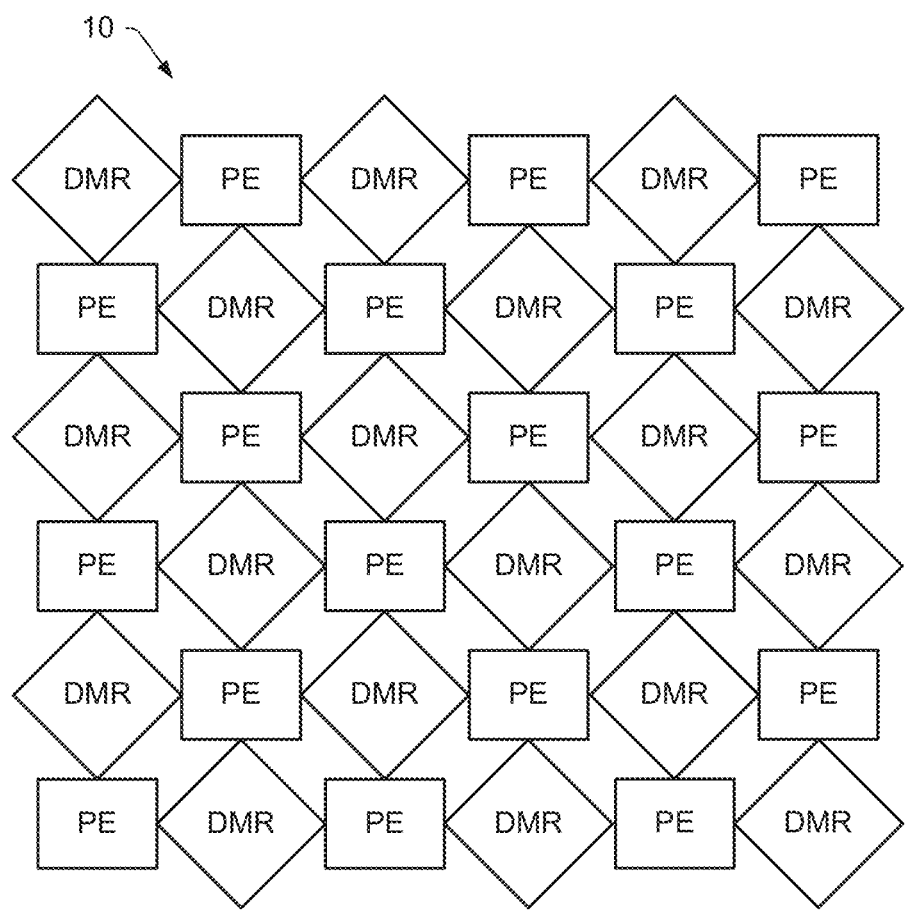
FIG. 3 is a block diagram illustrating one embodiment of a multi-processor system (MPS)

FIG. 3—MPS Block Diagram and Overview

FIG. 3 is a block diagram illustrating one embodiment of a multi-processor system (MPS). In the illustrated embodiment, MPS 10 includes a plurality of processor elements (PEs) and a plurality of data memory routers (DMRs), which may also be referred to as dynamically configurable communicators, or dynamically configurable communication elements, coupled to communicate data and instructions with each other. As used herein, a PE may also be referred to as a PE node, and a DMR may also be referred to as a DMR node.

The processing system (MPS) 10 may be used in any of various systems and applications where GPMCs, DSPs, FPGAs, or ASICs are currently used. Thus, for example, the processing system 10 may be used in any of various types of computer systems or other devices that require computation. In one contemplated embodiment, the processing system 10 is used as a signal processing device in a digital video display system.

Figure 7:
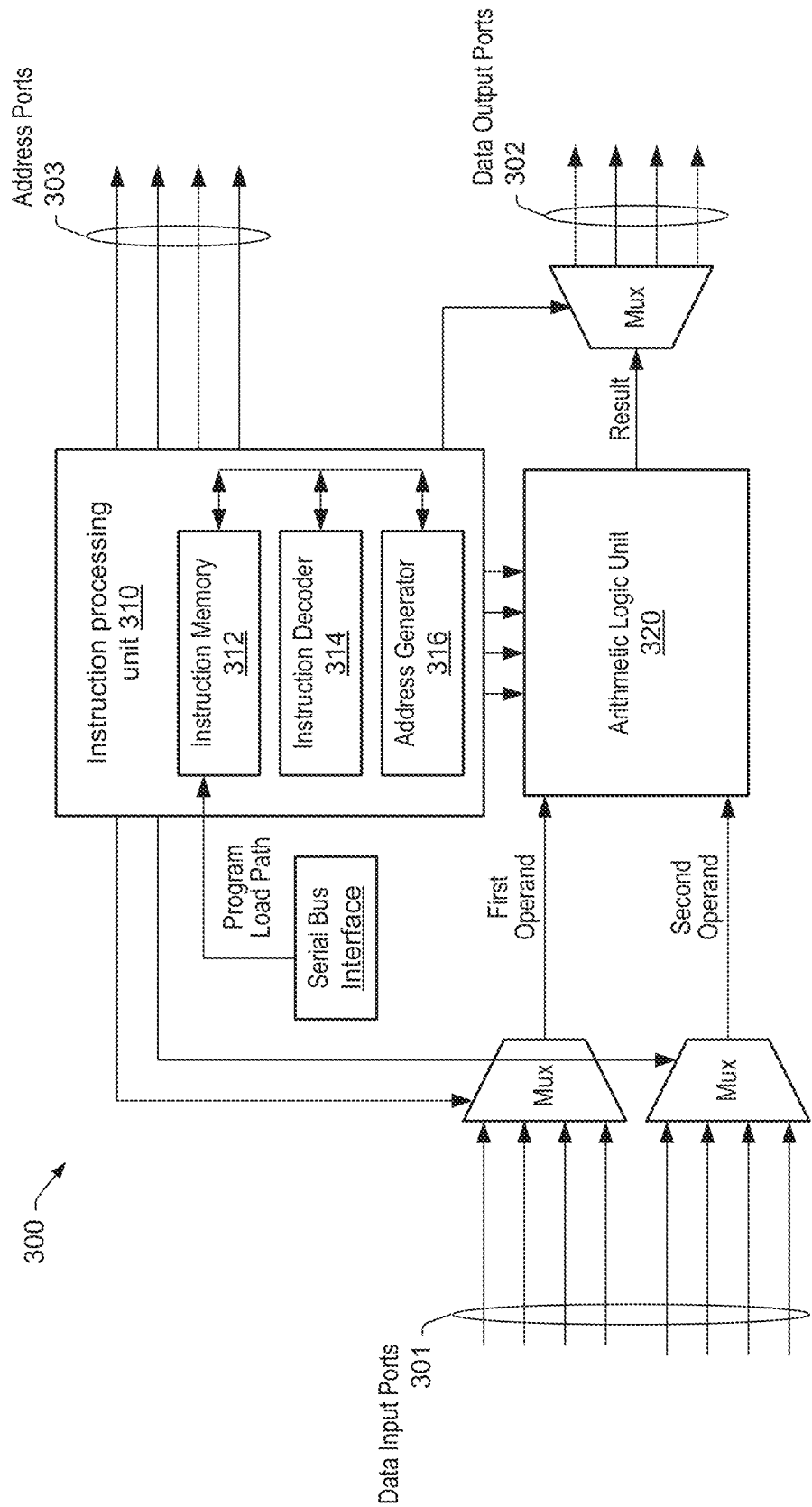
FIG. 7 is a block diagram illustrating one embodiment of a dynamically configurable processor (PE)

In one embodiment, a PE may include one or more arithmetic-logic units (ALUs) configured for manipulating data, one or more instruction processing units (IPUs) configured for controlling the ALUs, one or more memories configured to hold instructions or data, and multiplexers and decoders of various sorts. Such an embodiment may include a number of ports ("processor ports"), some of which may be configured for connection to DMRs and others that may be configured for connection to other PEs. FIG. 7 is a block diagram of one embodiment of a PE, and is described further below.

In one embodiment, a DMR may include one or more random access memories (RAMs) configured to hold data and instructions, a configurable controller, a network switch such as a crossbar switch, registers, and multiplexers. Such an embodiment may include a plurality of ports, some of which may be configured for connection to PEs (referred to herein as PE-type ports) and others that may be configured to connect to DMRs (referred to herein as DMR-type ports). It is noted that for any given port, whether configured for connection to or from a DMR or PE, the amount of data transferable through such a given port in a particular clock cycle may vary in various embodiments. For example, in one embodiment, a given port may be configured to transfer one word of data per clock cycle, whereas in another embodiment a given port may be configured to transfer multiple words of data per clock cycle. In yet another embodiment, a given port may employ a technique such as time-division multiplexing to transfer one word of data over multiple clock cycles, thereby reducing the number of physical connections comprising the port.

In one embodiment of MPS 10, each PE may include a small local memory reserved for instructions and may include very little local data storage. In such an embodiment, DMRs neighboring each PE may be configured to provide operands to a given PE. In a particular embodiment, for many PE instructions a given PE may read operands from neighboring DMRs, execute an ALU operation, and store an ALU result to a given neighboring DMR in one clock cycle. An ALU result from one PE may thereby be made available to several other PEs in the clock cycle immediately following execution. Producing results in this fashion may enable the execution of neighboring PEs to be closely coordinated or "tightly coupled."

As used herein, from the perspective of a given DMR or PE, a neighboring DMR or PE refers to a DMR or PE that can be accessed from the given DMR or PE within a particular latency. In some embodiments, the latency defining the extent of a neighboring relationship may vary depending on factors such as clock speed, for example. Further, in some embodiments, multiple degrees of neighboring may be defined, which degrees may correspond to different access latencies. For example, in one embodiment, a "nearest neighbor" may be defined as a device that can supply data during the same clock cycle during which it is requested, a "next-nearest neighbor" may be defined as a device that can supply data within one clock cycle after it is requested, and so forth. In other embodiments, it is contemplated that other metrics may be used to quantify a neighboring relation.

In a given MPS embodiment, some DMRs and PEs may be logically adjacent to other DMRs and PEs. As used herein, "logically adjacent" refers to a relation between two devices, such as one DMR and another DMR, or one DMR and one PE, such that one or more ports of one device are directly connected to respective ports of the other device without passing through an intervening DMR or PE. Further, in a given MPS embodiment, some DMRs and PEs may be physically adjacent to other DMRs and PEs. As used herein, "physically adjacent" refers to a relation between two devices, such as one DMR and another DMR, or one DMR and one PE, such that no other DMR or PE is physically located between the two devices.

In some MPS embodiments, devices such as DMRs and PEs that are logically and/or physically adjacent are also neighboring or neighbor devices. However, it is noted that in some embodiments, logical and/or physical adjacency between given devices does not entail a neighboring relation, or a particular degree of neighboring relation, between the given devices. For example, in one embodiment one DMR may be directly connected to another DMR that is located a considerable distance away. Such a pair may be logically adjacent but not physically adjacent, and the signal propagation time from the one DMR to the other may be too great to satisfy the latency requirement of neighbors. Similarly, in one embodiment one DMR may be physically adjacent to another DMR but not directly connected to it, and therefore not logically adjacent to it. Access from the one DMR to the other DMR may traverse one or more intermediate nodes, and the resulting transit delay may be too great to satisfy the latency requirement of neighbors.

Depending on the technology and implementation of a given embodiment of MPS 10, the specific number of the DMR's plurality of ports as well as the size of the DMR memory may be balanced against the overall desired execution speed and size of the DMR. For example, one DMR embodiment may include 4 PE-type ports, 4 DMR-type ports, and 4K words of memory. Such a DMR embodiment may be configured to provide a direct memory access (DMA) mechanism. A DMA mechanism may allow a given DMR to copy data efficiently to or from other DMRs, or to or from locations external to MPS 10, while PEs are computing results.

In one embodiment of MPS 10, data and instructions may be transferred among the DMRs in one of several different ways. A serial bus may be provided to all memories in MPS 10; such a bus may be used to initialize MPS 10 from external memory or to support testing of MPS data structures. For short-distance transfers, a given PE may be programmed to directly move data to or from its neighbor DMRs. To transfer data or instructions over longer distances, communication pathways may be dynamically created and destroyed in the network of DMRs.

For the purpose of such longer-distance data transfer, a network of interconnected DMRs within MPS 10 may constitute a switched routing fabric (SRF) for communication pathways. In such an embodiment, there may be at least two methods for managing communication pathways in the SRF. A first method is by global programming, wherein paths may be selected by software control (for example, either by a human programmer or by a compiler with a routing capability) and instructions may be coded into DMR configuration controllers to program the crossbar appropriately. To create a pathway, every DMR along the pathway may be explicitly programmed with a particular routing function. In a dynamic environment where pathways are frequently created and destroyed, a large number of crossbar configuration codes may be required, storage of which may in turn consume potentially limited DMR RAM resources.

A second method for managing communication pathways is referred to as "wormhole routing". To implement wormhole routing, each DMR may include a set of steering functions and a mechanism to stop and restart the progress of a sequence of words, referred to as a message, through the SRF. Because the steering functions may be commonly used and re-used by all communication pathways, the amount of configuration code that may occupy DMR RAM may be much smaller than for the global programming method described above. For the wormhole routing method, software control may still be used to select the particular links to be used by a pathway, but the processes of pathway creation (also referred to herein as set up) and destruction/link release (also referred to herein as teardown) may be implemented in hardware with minimal software intervention.

To prevent potential loss of data words on a pathway, an embodiment of MPS 10 may implement flow control between receivers and transmitters along the pathway. Flow control refers to a mechanism that may stop a transmitter if its corresponding receiver can no longer receive data, and may restart a transmitter when its corresponding receiver becomes ready to receive data. Because stopping and restarting the flow of data on a pathway has many similarities to stopping and restarting the progress of a message in wormhole routing, the two may be combined in an integrated scheme.

In one embodiment, MPS 10 may include pluralities of PEs and DMRs, which PEs may be identical and which DMRs may be identical, connected together in a uniform array. In a uniform array, the majority of PEs may be identical and each of a majority of PEs may have the same number of connections to DMRs. Also, in a uniform array, the majority of DMRs may be identical and each of a majority of DMRs may have the same number of connections to other DMRs and to PEs. The PEs and DMRs in one MPS embodiment may be interspersed in a substantially homogeneous fashion. As used herein, a substantially homogeneous interspersion refers to an arrangement in which the ratio of PEs to DMRs is consistent across a majority of sub-regions of an array.

A uniform array arranged in a substantially homogeneous fashion may have certain advantageous characteristics, such as providing a predictable interconnection pattern and enabling software modules to be re-used across the array. In one embodiment, a uniform array may enable a small number of instances of PEs and DMRs to be designed and tested. A system may then be assembled by fabricating a unit comprising a DMR and a PE and then repeating or "tiling" such a unit multiple times. Such an approach may lower design and test costs through reuse of common system elements.

It is also noted that the configurable nature of the PE and DMR may allow a great variety of non-uniform behavior to be programmed to occur on a physically uniform array. However, in an alternative embodiment, MPS 10 may also be formed with non-uniform DMR and PE units, which may be connected in a regular or irregular array, or even in a random way. In one embodiment, PE and DMR interconnections may be implemented as circuit traces, for example on an integrated circuit (IC), ceramic substrate, or printed circuit board (PCB). However, in alternative embodiments, such interconnections may be any of a variety of miniature communication links, such as waveguides for electromagnetic energy (i.e., radio or optical energy), wireless (i.e., unguided) energy, particles (such as electron beams), or potentials on molecules, for example.

The MPS 10 may be implemented on a single integrated circuit. In one embodiment, a plurality of MPS integrated circuits may be combined to produce a larger system. A given embodiment of MPS 10 may be implemented using silicon integrated circuit (Si-ICs) technology, and may employ various features to account for specific characteristics of such a technology. For example, the circuits on a Si-IC chip may be confined to a thin plane. Correspondingly, a given embodiment of MPS 10 may employ a two-dimensional array of PEs and DMRs such as that illustrated in FIG. 3. However, alternative MPS embodiments are contemplated that include different arrangements of PEs and DMRs.

Further, the available wiring density on a Si-IC chip may be much higher than between such chips, and each chip may have a perimeter of special Input/Output (I/O) circuits to interface on-chip signals and off-chip signals. Correspondingly, a given embodiment of MPS 10 may employ a slightly non-uniform array composed of a uniform array of PEs and DMRs in core of the chip, and modified PE/DMR units along the perimeter of the chip. However, alternative MPS embodiments are contemplated that include different arrangements and combinations of uniform and modified PE/DMR units.

Also, computational operations performed by Si-IC circuits may produce heat, which may be removed by IC packaging. Increased IC packaging may require additional space, and interconnections through and around IC packaging may incur delays that are proportional to path length. Therefore, as noted above, very large MPSs may be constructed by interconnecting multiple chips. Programming of such multiple-chip MPS embodiments may take into account that inter-chip signal delays are much longer than intra-chip delays.

In a given Si-IC MPS 10 embodiment, the maximum number of PEs and DMRs that may be implemented on a single chip may be determined by the miniaturization possible with a given Si-IC technology and the complexity of each PE and DMR. In such an MPS embodiment, the circuit complexity of PEs and DMRs may be minimized subject to achieving a target level of computational throughput. Such minimized PEs and DMRs may be referred to herein as being streamlined. In one MPS 10 embodiment, the target level of throughput for a PE may be comparable to that of the arithmetic execution units of the best digital signal processors (DSPs) made in the same Si-IC technology. However, other MPS embodiments are contemplated in which alternative references for target PE throughput may be used.

In some embodiments, MPS 10 may employ the best features of DSP and FPGA architectures. Like a DSP, MPS 10 may be a programmable chip with multiple processing units and on-chip memory. However, relative to a DSP, the MPS processing units may be streamlined, there may be more of them, and they may be interconnected in a novel way to maximize the bandwidth of data movement between them as well as data movement on and off the chip. Having more processing units than a DSP may allow MPS 10 to do more multiplications per unit time, and streamlined processing units may minimize energy use. Many DSPs with internal parallelism may be bus-oriented architectures. In some embodiments, MPS 10 may not include a bus, but rather may include neighboring shared local memories, such as in a DMR, embedded in an SRF that may provide significantly higher total bandwidth than a bus-oriented architecture.

Compared to the FPGA approach, some MPS embodiments may be more coarsely grained. For example, in one MPS embodiment, operations may have a natural word length (e.g., 16-bits) and computation may be most efficient if performed using data that is a multiple of the natural word length. In some MPS embodiments, PEs and DMRs may be denser than the equivalent structures realized in FPGA, which may result in shorter average wiring length, lower wiring capacitance and less energy use. In contrast to an FPGA implementation, in some MPS embodiments, every ALU in the MPS may be part of a processor (i.e., a PE), which may facilitate the fetch of operands and the write back of results to surrounding fast memory in the DMRs. Timing and clock skew issues for ALU, fetch, and write back operations may be solved once during the design of the IC chip and need not be re-solved with each new application as is typical of FPGA implementations.

MPS Topology and Communication

MPS 10 illustrated in FIG. 3 may supply the PEs with ample connections to fast memory by interspersing DMRs between the PEs, as shown. Such an arrangement may reduce the time required for a given PE to access memory in a DMR relative to a segregated (i.e., non-interspersed) arrangement, and may be referred to herein as an interspersed grid arrangement. In the embodiment of FIG. 3, the ratio of PEs to DMRs is roughly 1:1. However, other MPS embodiments are contemplated that may include different ratios of PEs to DMRs.

Connections between DMRs and PEs are not explicitly shown in FIG. 3, because there may be many possible connection schemes using different types and numbers of connections.

Figure 4:
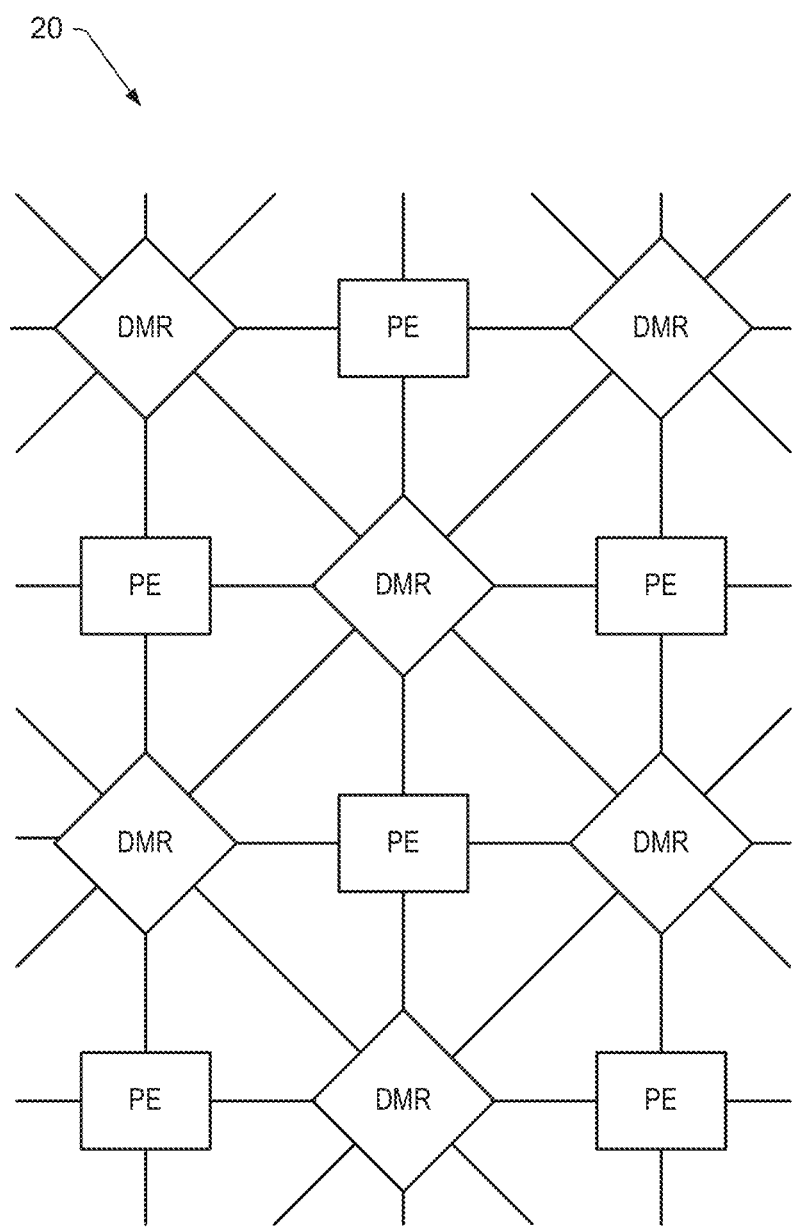
FIG. 4 is a block diagram illustrating one embodiment of an MPS connection scheme.

FIG. 4—MPS Connection Scheme

FIG. 4 is a block diagram illustrating one embodiment of an MPS connection scheme. MPS connection scheme 20 includes a plurality of DMRs and PEs and may be illustrative of a portion of the MPS of FIG. 3. In the MPS connection scheme 20, each PE is connected to four neighbor DMRs, while each DMR is connected to four neighbor PEs as well as four neighbor DMRs. MPS connection scheme 20 may therefore be illustrative of the PlanarA connection scheme discussed above.

To support high-bandwidth ports in MPS connection scheme 20, the connections between ports (PE-to-DMR, or DMR-to-DMR) may be short (i.e., limited to neighbors) and word-wide, meaning the number of electrical conductors (lines) in the data part of the connection may be the same as the number of bits used in the ALU operands. The PE-to-DMR connections may include address lines. The DMR-to-DMR connections may not necessarily have address lines but may have lines for flow control.

By keeping the PE nodes simple, large arrays (for example, in one MPS embodiment, 16 rows times 16 columns=256 PEs) may be put on a single VLSI IC at modest cost. Suitable VLSI technologies may include but are not restricted to complementary metal-oxide semiconductor (CMOS) field effect transistors with or without bipolar transistors in silicon or other semiconductors.

In some MPS embodiments, communication between nodes may be under programmer control. In an MPS each PE may communicate data/instructions with neighboring DMRs, and optionally on through those DMRs to other DMRs and PEs. This is highly effective for transfer of small amounts of data over short distances. However, for larger blocks of data, or longer distances, it is more efficient to use a DMA engine to move the data, thus freeing a PE to perform ALU operations.

For longer distance block moves, some MPS embodiments may provide means for memory-to-memory transfers between DMRs without involving the PEs. A PE may indirectly access a DMR-type port in a neighbor DMR through special SM addresses associated with such ports. This may permit a PE to create a new pathway for sending a message and later to tear such a pathway down, or alternatively to receive a message. A PE may also save a block of data to be transferred in an SM buffer in a neighbor DMR and then direct the neighbor DMR to begin a DMA operation through special SM addresses associated with such operations. This may permit the PE to proceed with other tasks while the neighbor DMR coordinates the DMA transfer of the data.

Various embodiments of the MPS may offer an advantageous environment for executing useful algorithms. Algorithms of interest (e.g., for analyzing image data) may be broken up into flow diagrams of ALUs. Each flow diagram may be mapped onto the MPS array as a tree, a lattice, or any arbitrary network, including multiple feedback/feed-forward paths. The finite precision of one ALU may be expanded to obtain multi-word precise results by combining several PEs and DMRs. When mapping a flow diagram to the MPS, communication delays between PE/DMR nodes that are proportional to the distances between nodes may arise. Also, a mapping may require more memory at each node if communication queues are large or if reconfiguration is frequent. These factors may be compensated for by careful programming, which may take communication delays, queuing, and reconfiguration into account.

Systolic algorithms represent a class of algorithms that may map particularly efficiently to various embodiments of the MPS. Systolic algorithms have been developed for a variety of applications in matrix arithmetic, image processing, and signal processing. In a systolic algorithm many processors may cooperate in a synchronized way to perform a difficult computation. In an ideal algorithm implementation, each processor may perform the same operation (or small loop of operations) over and over for as long as the algorithm is needed, and data may flow through the network of processors by neighboring connections with balanced production and consumption of data-words. If each intermediate result data word produced is then immediately consumed by a subsequent calculation, then the amount of memory required may be minimized. The advantages of a systolic algorithm may include the ability to use streamlined processors, to minimize memory requirements, and to achieve a high arithmetic operation rate using standard, low cost VLSI technology.

An MPS embodiment may have many processors per chip and an overall MIMD architecture, which may be configured to emulate the operation of other classes of systems, such as SIMD systems and distributed MIMD systems. In some embodiments, an MPS may run different algorithms in different areas of the chip at the same time. Also, to save power, in some embodiments a programmer can selectively enable and disable the clock to at least some PEs and DMRs. Thus unused PEs and DMRs may be disabled.

PE/DMR Fabric

Figure 5:
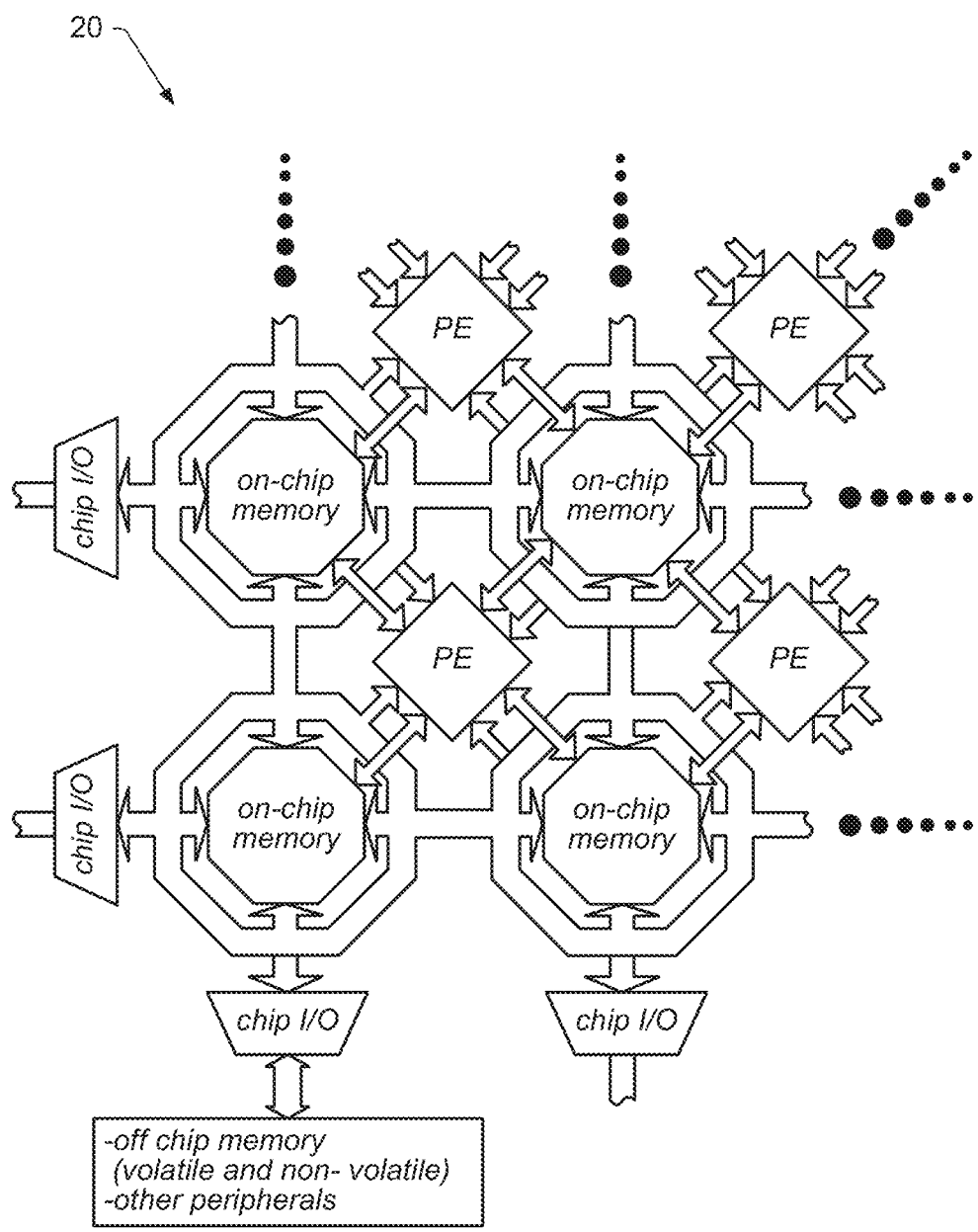
FIG. 5 is a more detailed diagram illustrating one embodiment of the MPS fabric.

FIG. 5 is a more detailed diagram illustrating one embodiment of the MPS fabric. In FIG. 5 each PE is surrounded by four DMR with which it may communicate memory requests and messages. Each DMR is surrounded by four other DMR except where it is near the edge of the fabric where it may be adjacent to a chip I/O port. Each DMR may communicate with neighboring DMR or chip I/O ports to setup communication pathways and send/receive messages on said pathways.

MPS Operation

Figure 6:
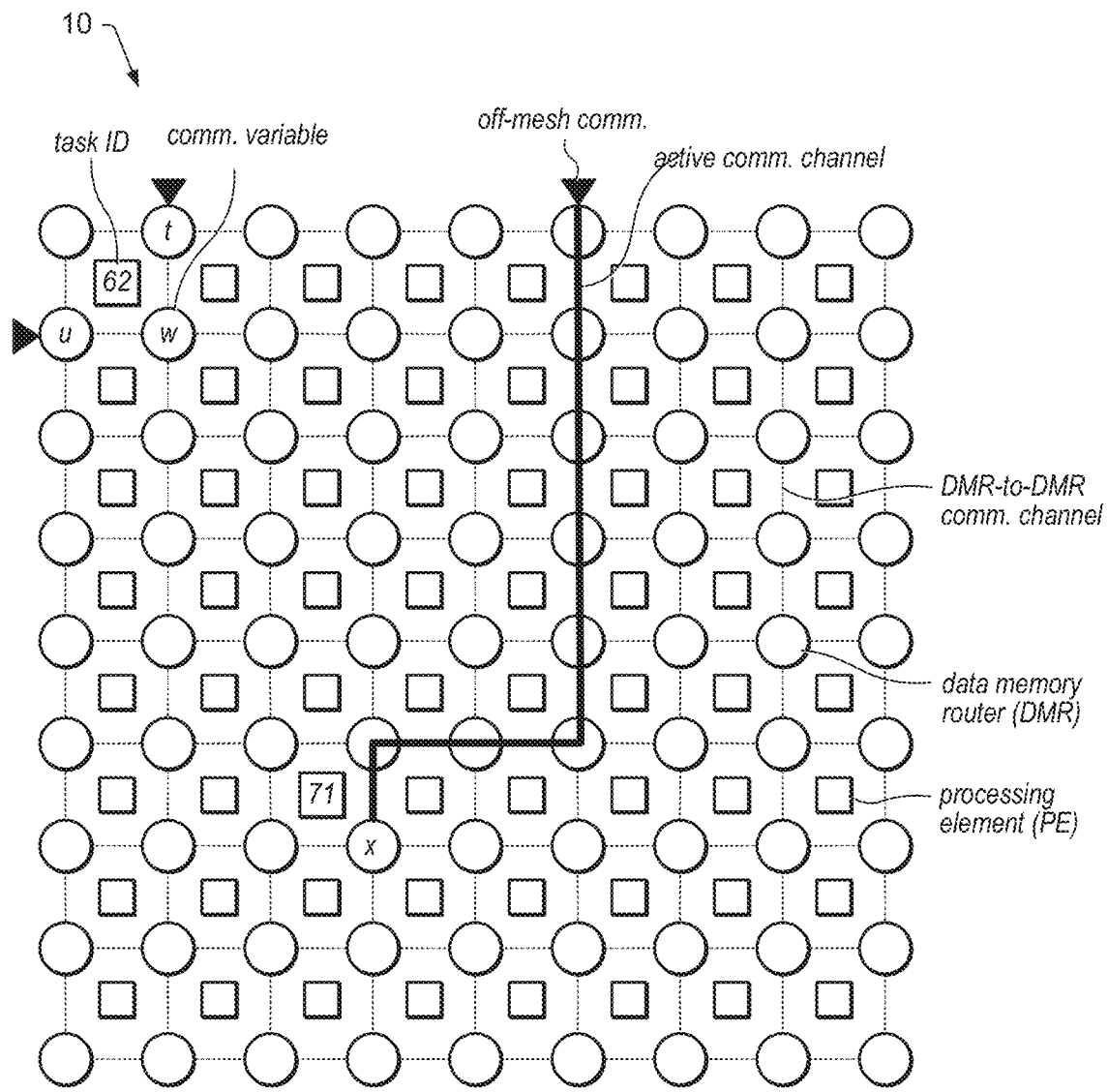
FIG. 6 illustrates an example MPS composed of PE (squares) uniformly interspersed with DMR (circles) in accord with the architecture example of FIG. 5.

FIG. 6 illustrates an example MPS composed of an 8×8 array of PE (squares) uniformly interspersed with a 9×9 array of DMR (circles) in accord with the architecture example of FIG. 5. Programs may be compiled into tasks that are assigned to PE. The first example program has been compiled with taskID=62, and assigned to a specific PE in the upper left corner of the array. The variables u, v, w are declared communication variables in the program source code, and assigned to specific memory addresses in the adjacent DMRs; u and v are buffers for the I/O ports, and w is a buffer for on-chip network communications with its associated DMR. The second example program has been compiled with taskID=71, and assigned to a specific PE in the interior of the array. The variable x is a declared communication variable and assigned to the DMR shown. A communication pathway associated with variable x runs from its assigned DMR via other DMR to an I/O port at the top row. As shown, the two example programs do not communicate with each other, but they can easily be made to communicate by addition of another communication variable to the task 71, and a pathway between its DMR and variable w in the DMR adjacent to task 62.

Dynamically Configurable Processor

FIG. 7 is a block diagram illustrating an example of a processing element (PE) that may be dynamically configured. PE 300 may be illustrative of the dynamically configurable processor (DCP) shown in FIGS. 3-6. PE 300 is dynamically configurable because it has a way to reprogram its instruction memory; in FIG. 7 this is through the load path from a serial bus interface. A serial bus may be a secondary interconnection network that connects all of the DMR and PE memory with a bus controller, where the bus controller may be accessed by one or more PE and by a chip I/O port. To reprogram a PE it may be put in a wait state, then its instruction memory re-written with a new program, the program counter set, and then it may be removed from the wait state to begin executing the new program. PE 300 includes instruction processing unit (IPU) 310 coupled to control at least one arithmetic logic unit (ALU) 320. PE 300 also includes a plurality of data input ports 301 coupled to a plurality of multiplexers (also referred to herein as muxes), which are in turn coupled to select at least a first and second operand input for ALU 320. PE 300 further includes a plurality of data output ports 302 coupled via a mux to receive result data from ALU 320, as well as a plurality of address ports 303 coupled to receive address data from instruction processing unit 310.

Address ports 303 may be configured to convey addresses for reading and writing the memories in neighboring DMRs. Data input ports 301 and data output ports 302 may be configured to convey data from and to neighboring DMRs. In the illustrated embodiment of PE 300, data input ports 301, data output ports 302, and address ports 303 each include four ports, consistent with the example architecture of FIG. 5.

In the example of FIG. 7, a single ALU 320 is shown, typical of the prior art as described in U.S. Pat. No. 7,415, 594. However, alternative embodiments are contemplated in which there are more ALUs per PE which thus have the potential for much higher processing throughput. Examples are shown and discussed later in this specification.

PE 300 may be configured to perform arithmetic/logical unit operations on data words, where the selected operation depends on the current instruction being processed by IPU 310. To support flexible programming, IPU 310 may include at least one instruction memory 312 including a plurality of addressable locations, instruction decoder 314, and address generator 316, each interconnected via a variety of interconnect mechanisms. In other embodiments, it is contemplated that IPU 310 may contain more than one instruction memory or may contain additional functionality. It is further contemplated that in other embodiments, the functionality illustrated in IPU 310 may be partitioned into different types of functional units or implemented in a single functional unit.

IPU 310 may be configured to receive program data for storage in instruction memory 312 via the program load path coupled to data input ports 301. Instruction memory 312 may also be written and read through a global serial bus (not shown). Depending on the decode of a particular instruction by instruction decoder 312, IPU 310 may be configured to control the various muxes coupled to data input ports 301 and data output ports 302, to guide data to and from neighboring DMRs. IPU 310 may further be configured to convey addresses generated by address generator 316 via address ports 303 to neighboring DMRs, for example to read or write RAM located therein. Address generator 316 may also include a program counter register (not shown) configured to generate a next instruction address to be fetched from instruction memory 312 and decoded by instruction decoder 314.

In one embodiment, PE 300 may not include a data register file, data cache, or any local storage for data operands or result data. In such an embodiment, PE 300 may be configured to utilize a memory included in a DMR to which PE 300 is immediately connected as a fast storage medium from which data operands may be read and to which result data may be written. In some embodiments, a given PE may obtain different data from different neighbor DMRs simultaneously or at different times. As described in greater detail below, in some embodiments a given PE may also be configured to read and write data in DMRs to which the given PE is not immediately connected, by establishing a pathway from such remote DMRs to a neighbor DMR of the given PE.

Instructions implemented by PE 300 may support arithmetic and logical operations, as well as meta-instructions. PE instructions may be long enough in bits to address memories for two operands and one result, which may allow these values to be read and written in one clock cycle.

It is noted that other embodiments may implement additional instructions, or a different set of instructions. In some embodiments, during execution of a given instruction requiring one or more data operands, a given PE may be configured to directly access memory in a neighboring DMR to access the required operands. PE 300 may be configured to execute meta-instructions. As used herein, a meta-instruction refers to an instruction that may perform an operation on instructions stored in PE instruction memory, such as instruction memory 312. A basic meta-instruction may be to load instruction memory 312 from RAM in a neighboring DMR (i.e., to load an overlay). By loading instruction memory from DMR memory, the partitioning of memory between data and instructions may be determined by software programming. Therefore an application programmer may optimize his software for best utilization of the available memory. In some embodiments, PE 300 may include other meta-instructions that may modify IPU instruction memory, or save instruction memory in DMR memory for test, error analysis, and/or error recovery, for example.

ALU 320 may be configured to perform arithmetic for at least a fixed-point number system, including the operations defined by the instructions supported in a particular PE 300 embodiment. For example, in one embodiment, ALU 320 may be configured to perform fixed-point add, subtract, multiply, multiply-accumulate, logical, and shift operations. In some embodiments, ALU 320 may be configured to retain the carry bit resulting from a previous computation, for supporting extended precision arithmetic. In other embodiments, ALU 320 may be configured to perform floating point arithmetic or special-purpose operations chosen for implementing a particular algorithm.

Figure 8:
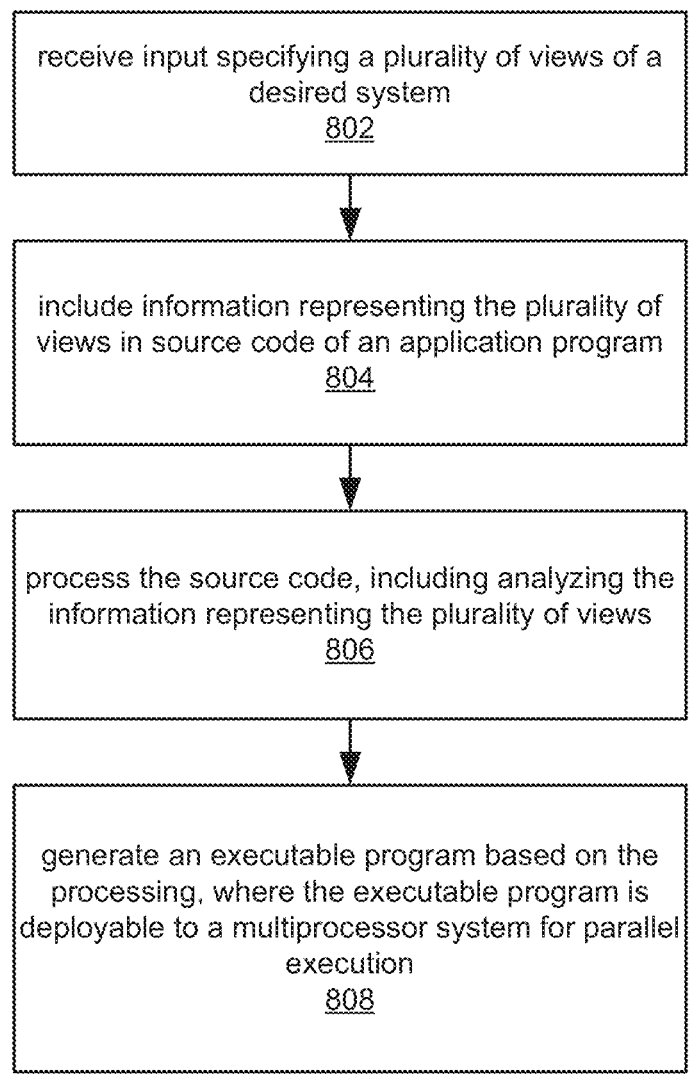
FIG. 8 is a flowchart of a method for developing application software targeted for parallel execution on a multi-processor system, according to one embodiment.

FIG. 8—Flowchart of Method for Developing Software for Parallel Execution

FIG. 8 illustrates a method for developing software targeted for parallel execution on a multiprocessor system, according to one embodiment. The method shown in FIG. 5 may be used in conjunction with any of the computer systems or devices described herein, among other devices. In various embodiments, some of the method elements shown may be performed concurrently, in a different order than shown, or may be omitted. Additional method elements may also be performed as desired. As shown, this method may operate as follows.

As shown in x802, in one exemplary embodiment, input may be received specifying a plurality of views of a desired system, e.g., of an application targeted for deployment and execution on a multiple processor system. Each view may represent or specify a respective aspect of the system, and the views may collectively provide information usable by a compiler (or other software tool) to generate an executable program that is deployable to the multiprocessor system for efficient parallel execution.

The input may be received in any of a variety of forms, and via any of a variety of tools. For example, in some embodiments, the input may be provided by a user, i.e., may be user input. In other embodiments, the input may be received from another system or process, from a storage medium, and so forth, as desired. Moreover, the input may be provided locally, or may be received over a network, such as a local area network (LAN) or a wide area network (WAN), such as the Internet. In one exemplary embodiment, the user may specify the views in a spreadsheet. In another exemplary embodiment, the user may enter the input to a wizard, i.e., a graphical user interface (GUI) that leads the user through the specification process, e.g., via prompts, helpful suggestions, etc. In a further embodiment, the user may use a checklist to manage the input/specification process, where each item to be specified, e.g., views, sub-views, etc., is represented in the checklist, and where the checklist indicates whether each checklist item has been specified (or not). In another exemplary embodiment, one or more templates or forms may be provided, which the user may populate with information specifying the views.

Each view may include or be a representation of a respective aspect of the application's operation or execution. The multiple views may include a memory view, a communication view, a control view, and a processing view. Other views may also be defined or specified as desired. In one embodiment, each view may include or specify multiple sub-views (or "facets") specifying more detailed attributes of the view. For example, each view may include size, behavior, and accessibility sub-views (or facets), where each sub-view may have a specific meaning in the context of the view of which it is a part.

Thus, for example, the memory view may specify the size (or amount) of memory required or available for use by the application, i.e., the memory structure size used by the application to process data; the behavior of the memory, i.e., the way the memory structure behaves in time; and the memory accessibility, i.e., the accessibility of the memory structure, e.g., by the application and/or system.

Similarly, the input may define or specify the communication view, including defining respective sub-views of the communication view, e.g., communication size, behavior, and accessibility, the control view, including control size, behavior, and accessibility, and the processing view, including processing size, behavior, and accessibility.

Note that in some embodiments, some of the views or sub-views may be defined or specified automatically by specification of the other sub-views or views, e.g., by the sub-views of the same or other views. Thus, for example, the communication behavior may be automatically specified once the memory size, behavior, and accessibility are specified. Considered another way, in some embodiments, the views may be "over-specified" or "over-determined" similar to over-determined systems of linear equations, where the number of equations exceeds the number of variables.

It should be noted that the particular terms or labels used herein are exemplary only, and that any names may be used for the novel components, information, and processes disclosed herein as desired. For example, the views or aspects may also be referred to as models, etc., and the sub-views disclosed herein may be referred to as sub-models, facets, properties, etc., and so forth, as desired.

Once the views of the system have been specified or defined, information representing the views may be included in the source code of the application, as indicated in x804. This inclusion may be performed in any of a wide variety of ways. For example, in some embodiments, the information may be included in one or more header files of the application. In other embodiments, the information may be included in one or more dynamic linked libraries (DLLs) or macro definitions, among other application program elements or components. More generally, the information representing the views may be incorporated into the application source code in any way, and in any form, as desired.

In x806, the source code may be processed, e.g., by a compiler or other tool, including analyzing the information representing the multiple views specified or defined for the system. For example, in one embodiment, the compiler may be configured to recognize the information representing the multiple views in the application source code, and may extract and analyze the information. In other embodiments, the compiler may analyze the information in situ.

As indicated in x808, an executable program may be generated based on the processing, where the executable program is deployable to a multiprocessor system for efficient parallel execution. In other words, the compiler may generate the executable program based on the processing of x806, including the analysis of the specified views.

Thus, embodiments of the present techniques may address various shortcomings of prior art approaches to software development noted above, allowing users to specify various requirements or constraints regarding operation of the system, e.g., operation of the application on the multiprocessor system, where these specified requirements or constraints may be used by a compiler (or other tool) to generate executable code that may be executed efficiently on the system.

The following presents various exemplary embodiments of the above techniques:

1. A method for developing application software for parallel execution in a multiprocessor system, the method comprising: a computer performing: specifying, in response to first input, a plurality of views of a desired system, wherein the plurality of views comprise: a memory view; a communication view; a control view; and a processing view; including information representing the plurality of views in source code of an application program; processing the source code of the application program, including analyzing the information representing the plurality of views; and generating an executable program based on said processing, wherein the executable program is deployable to the multiprocessor system for parallel execution.

2. The method of claim 1, wherein said specifying the plurality of views comprises: specifying for each view: size; behavior; and accessibility.

3. The method of claim 1, wherein the input comprises user input received to at least one of: a wizard; a graphical user interface; a spreadsheet; or a data file.

4. The method of claim 1, wherein said including the information representing the plurality of views in the source code comprises including the information in one or more of: one or more header files of the application program; macro definitions for the application program; or one or more dynamic linked libraries (DLLs).

5. The method of claim 1, wherein said processing and said generating are performed by a compiler.

6. The method of claim 1, wherein the multiprocessor system comprises a HyperX architecture.

Further Embodiments

The following presents descriptions of further exemplary embodiments of the above techniques, although it should be noted that the embodiments disclosed are exemplary only, and are not intended to limit implementations of the techniques to any particular form, function, or appearance. Two exemplary embodiments are presented as specific (non-limiting) use cases: an imaging filter, and a Finite Impulse Response (FIR) filter.

A System's View and Process Defined

In a system, real-time or otherwise, data is usually received as a stream (either real or conceptual), whether from a radio receiver, image sensor, or other input collection device. It is desirable that the data that is received be processed in a way that is natural to the algorithm and its representative data structure. This may necessitate the ability to handle sample-, block-, or a hybrid-form of data structure for processing. This may also mean that the communications and memory architecture of the processing system may need to be real-time dynamic and adaptable to support various algorithmic and data structure systems.

Exemplary Use Case: Imaging Filter

As one example, consider an exemplary imaging filter, characterized by equation 1:

$$y[r, c, t] = \sum_{r=-M}^{r=M} \sum_{c=-N}^{c=N} h[r, c, t] x[r, c, t] \qquad \text{Equation 1}$$

where t is time, r is a row index, c is a column index, x[r, c, t] are input pixels, h[r, c, t] are filter coefficients, and y[r, c, t] are output pixels The summations are across 2M+1 rows and 2N+1 columns, so the filter's dimensional memory size is (2M+1) multiplied by (2N+1); and minimal latency is desirable.

Using an Imaging Filter System to Illustrate the Method of FIG. 8

Figure 10:
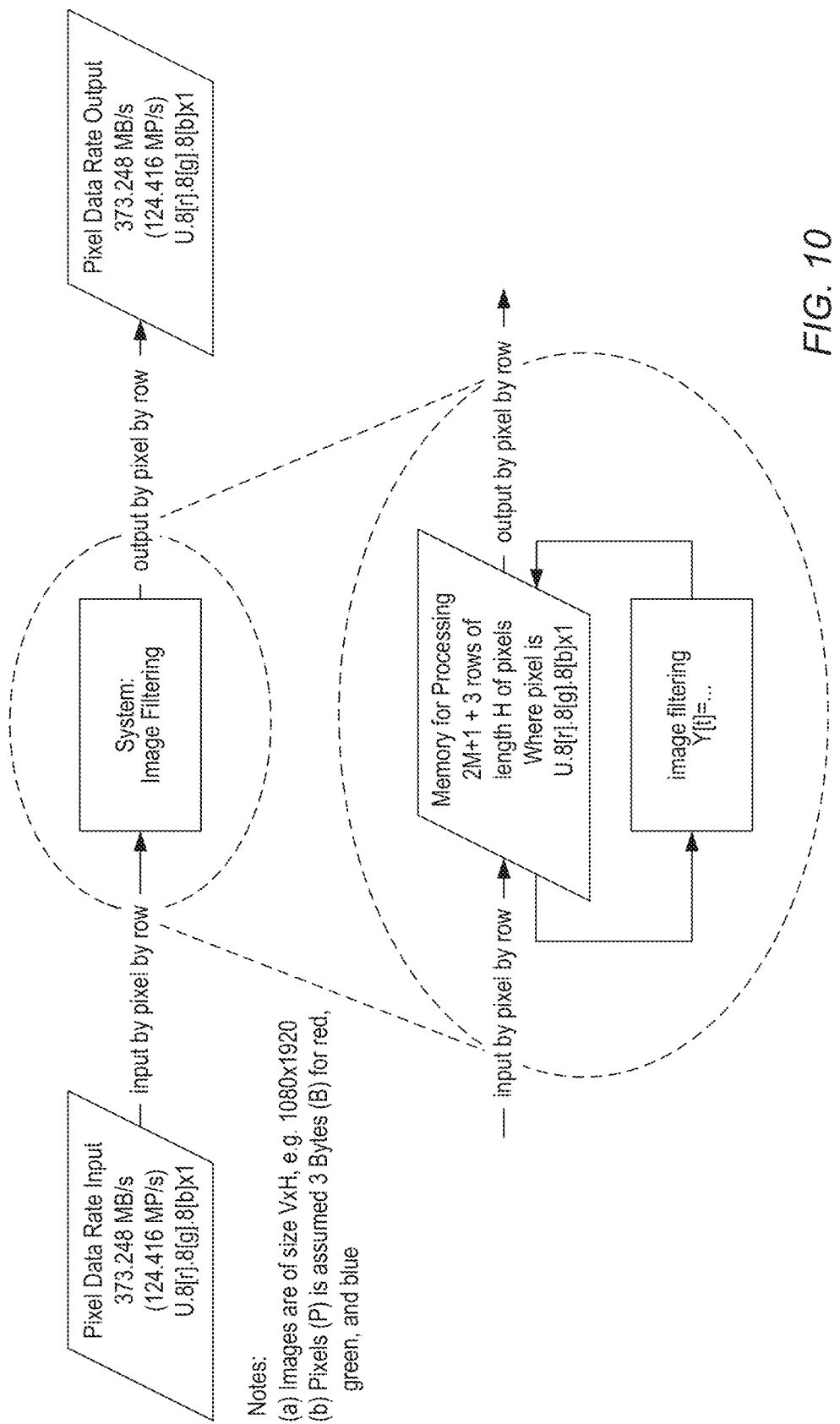
FIG. 10 illustrates an image filtering block diagram with a single process.

An exemplary imaging filtering process is pictorially illustrated in FIG. 9A. In this approach, a data stream of pixels (pixel data) is usually received by row. Once enough rows of data are received to satisfy data requirements of the filter and/or boundary conditions, as illustrated, a 2-dimensional filter may be run horizontally across the data to create a filtered image. The approach of FIG. 9A is represented in block diagram form in FIG. 10, which illustrates an image filtering block diagram with a single process.

To process the image data faster, a common scheme is to divide the image vertically, where data for each vertical segment is received (to processing resources) by pixel, by row, to perform the filtering in parallel, as illustrated in FIG. 9B. The parallel approach of FIG. 9B is represented in block diagram form in FIG. 11, which illustrates an image filtering block diagram with multiple processes.

An exemplary program implementing an embodiment of this technique for processing threads (code example of a filter kernel) in a MPI supported ANSI C language based software programming model may be written as follows:

```
//* filter_kernel.c
//* example hx3xxx pseudo code for 2D filter
#include <mpx.h>
#include <math.h>
#include "filter_system.h"
// initialize variables
int 2d_lin_buffer[(ROW+3)*COL];
// initialize 2D circular line buffer on 2d_buffer
void init_2D_circ_lin_buf( .... )
{ .... }
// update 2D circular line address on 2d_buffer
void update_2D_circ_lin_address( .... )
{ .... }
// 2D filter function with calculations written through
// line based pointers for efficiency. This is unnatural.
// Performs function while receiving next line of data and
// sending out previously calculated results.
void 2d_filter( .... )
{.... }
mpx_cell filter_kernel( .... )
{ // begin mpi_cell..
    // initialize
    init_2D_circ_lin_buf( .... );
    while(1)
    { // begin while
        MPX_Recv( .... ); // non-blocking line receive
        2d_filter( .... ); // perform filter across line of data
        MPX_Send( .... ); // non-blocking line send of results
        update_2D_circ_lin_address( .... );
    } // end while
} // end mpx_cell
```

Code Portion A: Filter_Kernel.c—Code Example of a Filter Kernel

The system made up of the "filter_kernel.c" processing threads may be written as follows (code example of a filter system):

```
//* filter_system.c
//* example hx3xxx pseudo code for 2D filter system
#include <mpx.h>
#include <math.h>
#include "filter_system.h"
mpx_cell filter_system( .... )
{ // begin mpx_cell..
    // system defined through MPX_PARALLEL
    if (MPX_RANK == MPX_PARALLEL)
    { // begin MPX_PARALLEL
        distribution_and_collection: di_co_sys( .... );
        filter_thread_00: filter_kernel( .... );
        filter_thread_01: filter_kernel( .... );
        filter_thread_02: filter_kernel( .... );
        .....
    } // end MPX_PARALLEL
} // end mpx_cell
```

Code Portion B: Filter System.c—Code Example of a Filter System

The "void 2d_filter( . . . )" function may be written as in the following examples:

```
// apply filter across line of data
    for( col = begin; ... )
    { // begin col = begin..
        result[ col ] = 0;
        for( i = 0; ... )
        { // begin i = 0..
            for( j = 0; ... )
            { // begin j = 0..
                // operations
                result[ col ] += (long) ( filter[ i ][ j ]...
                 * data[ i ][ address_line[ i ] - offset + j ] );
            } // end for j = 0..
        } // end for i = 0..
    } // end for col = begin..
```

Code Portion C: 2d_Filter Function Implemented as an M by N Filter

```
// apply Laplacian filter across line of data
for ( col = begin; ... )
{ // begin for begin = 0..
    // operations..
    temp = in_data[ address_line[ center ] + col - Lap ]...
         + in_data[ address_line[ center ] + col + Lap ];
    temp += (long) ( in_data[ address_line[ center - Lap ] + col ]...
         + in_data[ address_line[ center + Lap ] + col ] );
    temp -= (long) ( 4 * in_data[ address_line[ center ] + col ] );
    result_data[ col ] = abs(temp);
} // end for col = begin..
```

Code Portion D: 2d_Filter Function Implemented as a Laplacian Filter

```
// apply Laplacian filter across line of data
address_center = address_line[ center ];
address_n_Lap = address_line[ center - Lap ];
address_p_Lap = address_line[ center + Lap ];
for ( col = begin; ... )
{ // begin for begin = 0..
    // operations..
    temp = in_data[ address_center + col - Lap ]...
         + in_data[ address_center + col + Lap ];
    temp += (long) ( in_data[ address_n_Lap + col ]...
         + in_data[ address_p_Lap + col ] );
    temp -= (long) ( 4 * in_data[ address_center + col ] );
    result_data[ col ] = abs(temp);
} // end for col = begin..
```

Code Portion E: Simplified Void 2d_Filter Function Implemented as a Laplacian Filter It should be noted that the code portions/programs presented herein are exemplary only, and are not intended to limit the embodiments to any particular programming language.

Logically, the MPI with ANSI C software programming model may support full requirements of a mixed memory and adaptable communications scheme. The execution model may provide the capability to meet software programming model requirements. Additionally, the software programming model may support scalable code that can target variable real-time performance.

Figure 12:
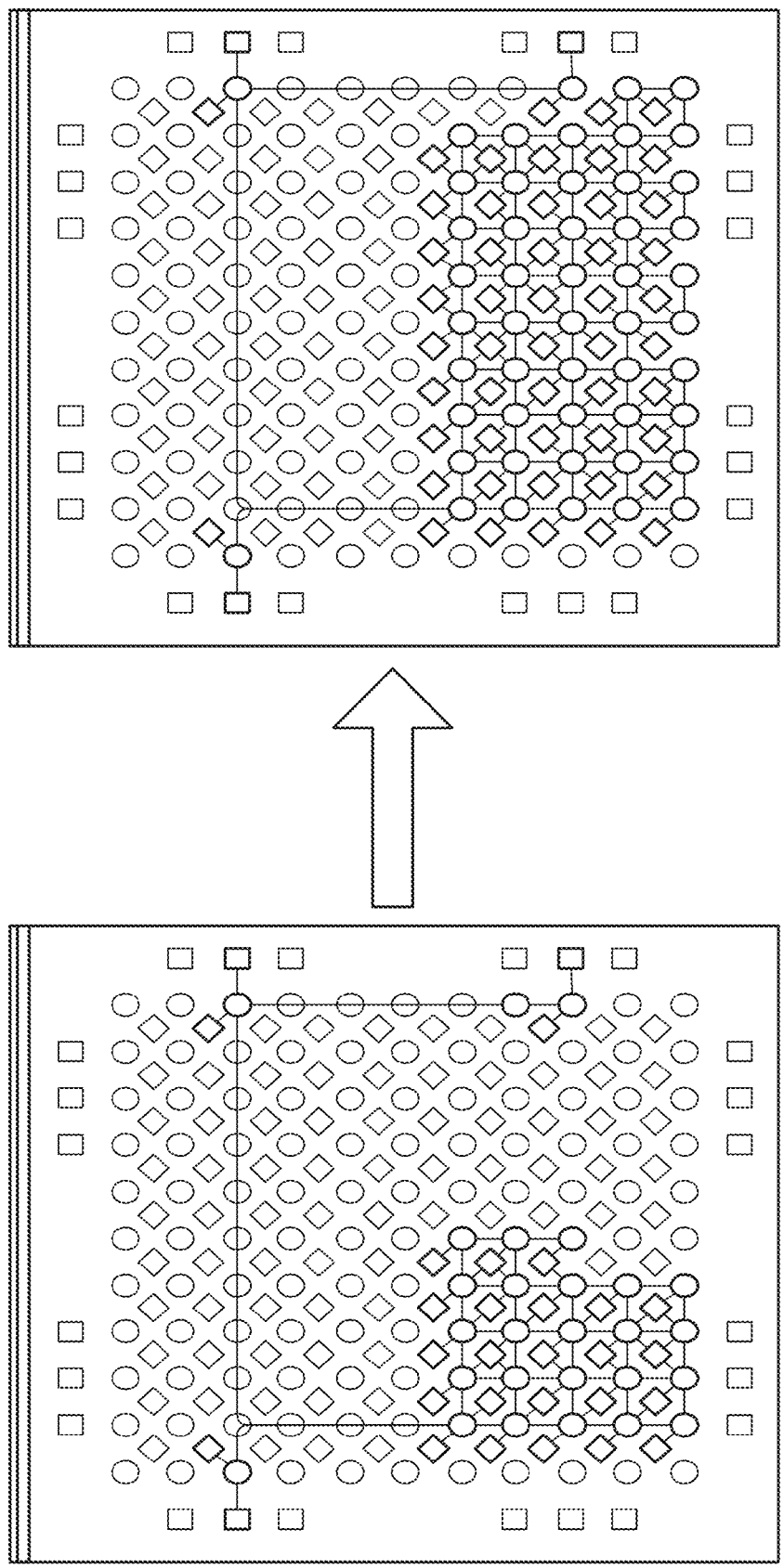
FIG. 12 shows two different resource layouts on an MPS for an example video 2D filter system.

An example of the result realized on a memory-network processor, such as, for example, an exemplary hx3XXX processor (provided by Coherent Logix, Incorporated) as illustrated in FIG. 12. More specifically, FIG. 12 shows an example 4K video 2D filter system resource layout shown on an hx3100 processor at 30 fps (left image), and then at 60 fps (right image) without changing a line of C code. Here, the number of software threads is increased and is able to use additional hardware threads to increase frame rate throughput.

As noted above, one issue with current approaches is that, with software programming models supporting extrapolation of target hardware features, they do not allow efficient description of the system. To properly describe the system, all important aspects of its behavior and interactivity should be captured in some way within the respective control, communication, memory, and processing models of the programming model. The latter two, memory and processing models, are not usually addressed but rather are assumed to be implicitly elevated from the execution model.

To efficiently define any system may thus require effectively defining the overall system. In this example, the discussion will focus on describing the system from the perspective of the memory structure properties and its interactivity with communication properties and processing from the system requirements. As described above with reference to the method of FIG. 8, this may involve defining memory structure properties: the structure size that is used to support communication, the structure size that is used to support processing, the structure behavior to support processing, the structure behavior to support communication, the structure accessibility to support processing, and the structure accessibility to support communication. Following this, communication, control, and processing properties may be derived or explicitly defined.

Figure 11:
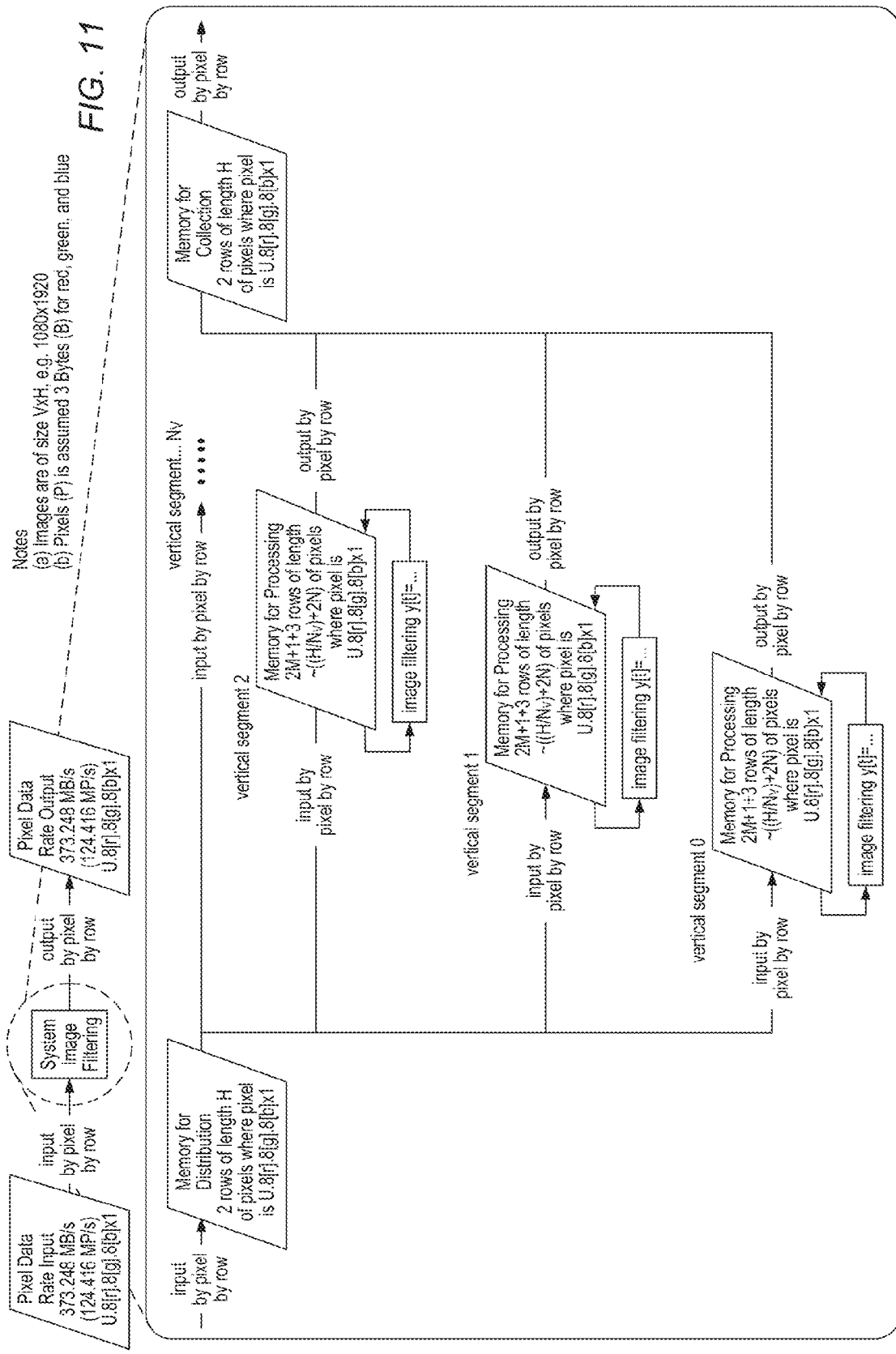
FIG. 11 illustrates an image filtering block diagram with multiple processes.

For the imaging filter example discussed above, this may be done in the following manner:

Defining Memory Structure Size:

As indicated in FIG. 11, in this imaging filter example, a circular line buffer addressing scheme may need to be created to support the memory structure most natural for the system. The memory structure may be defined by the size of the filter, that is, the number of rows required for the filter processing or current data (2M+1 in this case), plus an extra row to capture the current results of processing, plus an extra row to concurrently be receiving the next line of data, plus an extra row for sending previously calculated results of the filter processing. Thus, for this exemplary application, the memory structure size may be defined or specified as the product $(2M+4)*(2N+H/N_v)$ of pixels.

Defining Memory Structure Behavior:

In addition to the size of the structure, the behavior of the structure in time needs to be clearly defined. In this particular case, memory behavior is defined in time with respect to previously received data having been processed and new data being available—having arrived. Specifically, in this exemplary embodiment, there is a section of memory that may be denoted as "current data" that is intended to be used for current processing, which is "2M+1" rows by greater than "2N+1" columns in size, there is a section of memory that accepts the next line of data, there is a section of memory that holds the previously calculated results, and lastly, there is a section of memory that collects current results from processing. After the current processing is finished and the previously calculated results have been sent out, the memory behavior may be updated so that the next line of data just received now becomes the first line in the current data. Then current results become the previously calculated results to be sent out and the current results is reassigned its location. This revolving use of memory sections may thus define or characterize the behavior of the memory structure.

Defining Memory Structure Accessibility:

Each of the memory sections needs to have its accessibility defined. In this particular exemplary case, for current data, the data needs to be accessible in the form of a standard 2-dimensional array. According to the memory structure behavior described above, each time a new line of data has arrived and becomes the new first row of data and the oldest or last row of data is dropped, the 2-dimensional access to physical address may be updated to support the natural writing and access of data from the user/programmer perspective. The other three sections of memory (mentioned above) may effectively implement one dimensional arrays of data supporting receiving of data, results of filtering, and sending of results.

Defining Communications Properties (Size, Behavior, Accessibility)

Once the memory structure size, behavior, and accessibility have been defined, the inter- or intra-communication, control, and processing properties may be either derived or explicitly defined based on interactivity within the system or another system. In this particular case, the input properties of the system may be derived from the memory structure size, behavior, and accessibility definitions. Other systems may require more explicit definition, e.g., for the case of an interleaver and/or de-interleaver in a communications radio.

In one embodiment, the next step may be to effectively represent the system properties in the software programming model. There are any number of ways to do this, including, but not limited to, creating or expanding an API such as MPI to support ANSI C, creating specific class structures in C++, etc. However, the specific lexical representation is not important. What is important is that the programming model recognizes these (dynamic) system definitions, i.e., that the tool flow can interpret the system definition and then effectively map the system to the target execution model and underlying hardware architecture.

The example code of Code Portion A, filter_kernel.c, approaches the control model, the communication model, and supporting memory structures and processing explicitly, and may be required to be interpreted as such. This does not allow dynamic interactivity to be defined between control, communications, and memory structure in such a way as to intuitively represent a system, to define the system, or to interpret the system in an efficient way.

Continuing with the imaging filter example, the filter_kernel.c may be rewritten as follows:

```
//* filter_kernel.c
//* example pseudo code for 2D filter incorporating system
// property defintion
#include <mpx.h>
#include <math.h>
#include "filter_system.h"
// initialize variables
mpx_2d_lin int buffer[(ROW+3)*COL];
// 2D filter function with calculations written naturally as
for(i,j)
// and performs function while receiving next line of data and
```

```
// sending previously calculated results.
void 2d_filter( .... )
{.... }
mpx_cell filter_kernel( .... )
{ // begin mpi_cell..
    while(1)
    { // begin while
        MPX_Recv( .... ); // non-blocking line receive
        2d_filter( .... ); //perform filter across line of data
        MPX_Send( .... ); // non-blocking line send of results
    } // end while
} // end mpx_cell
```

Code Portion F: Filter_Kernel.c—Updated Code Example of a Filter_Kernel Incorporating System Property Definitions According to One Embodiment As may be seen, in the above updated code example of Code Portion F, the program statement "mpx_2d lin int buffer[(ROW+3)*COL];" declares a variable, specifically, a memory structure, now supported by the programming model, that takes on the size, behavior, and accessibility properties discussed above.

Accordingly, the "void 2d_filter( . . . )" function of Code Portion A may now be written in natural form, and may achieve higher operation efficiencies in its processing, as presented in the following two examples:

```
// perform filter across line of data
for( col = begin; ... )
    { // begin col = begin..
        result_data[ col ] = 0;
            for( i = 0; ... )
            { // begin i = 0..
                for( j = 0; ... )
                { // begin j = 0..
                    // operations
                    result_data[ col ] += (long) ( filter[ i ][j ]...
                        * in_data [ i ][ col - offset + j ] );
                } // end for j = 0..
            } // end for i = 0..
    } //end for col = begin..
```

Code Portion G: Updated Code Example of a Void 2d_Filter Function Implemented as an M by N Filter

```
// apply Laplacian filter across line of data
for ( col = begin; ... )
    { // begin for begin = 0..
        // operations..
        result_data[ col ] = abs( (4 * in_data[ center ][ col ])...
                        - in_data[ center ][ col - Lap ]...
                        - in_data[ center ][ col + Lap ]...
                        - in_data[ center - Lap][ col ]...
                        - in_data[ center + Lap][ col ] );
    } // end for col = begin..
```

Code Portion H: Updated Code Example of a Void 2d_Filter Function Implemented as a Laplacian Filter Subsequently, the program statement "MPX_Recv( . . . ); // non-blocking line receive" may provide a single update to automatically update the behavior and accessibility properties. This sets up the next line of data to be received, the current data for processing, and current results to be collected.

Within the tool flow, the compiler may be designed to interpret the system behavior and more effectively map hardware resources to support system functionality defined.

The above imaging filter example was predominantly described from the memory definition (memory view) perspective. This should not be interpreted as a limitation. Additionally or alternatively to the memory model of a system being described in terms of size, behavior, and accessibility, the control, the communications, and the processing views (and sub-views) may be similarly used to describe or define the system.

Thus, within the software programming model, to support an effective system description all models may need to support the process of describing or implicitly interpreting size, behavior, and accessibility of processing, memory, communication, and control, and their inter- and/or intra-activity.

Exemplary Use Case: Finite Impulse Response Filter

As another example, consider an exemplary Finite Impulse Response (FIR) filter, characterized by equation 2:

$$y[t] = \sum_{i=0}^{i=N-1} c_i x[t-i] \qquad \text{Equation 2}$$

where t is time, $c_i$ are coefficients, $x[t]$ are input samples, N is the filter length, and $y[t]$ are output samples.

Using a FIR Filter to Illustrate the Method of FIG. 8

Figure 13:
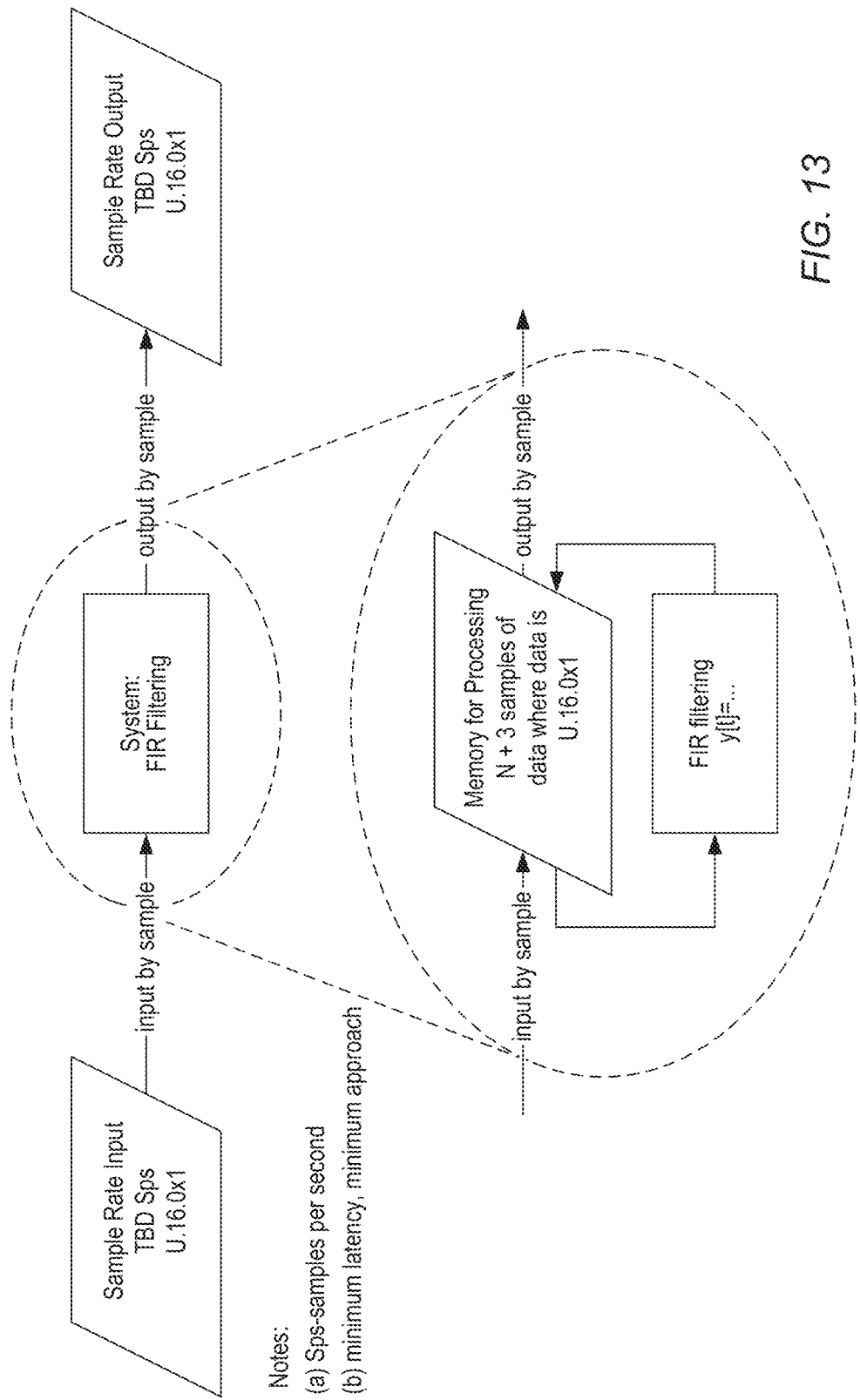
FIG. 13 is a block diagram illustrating a FIR filter using a single process.
Figure 14:
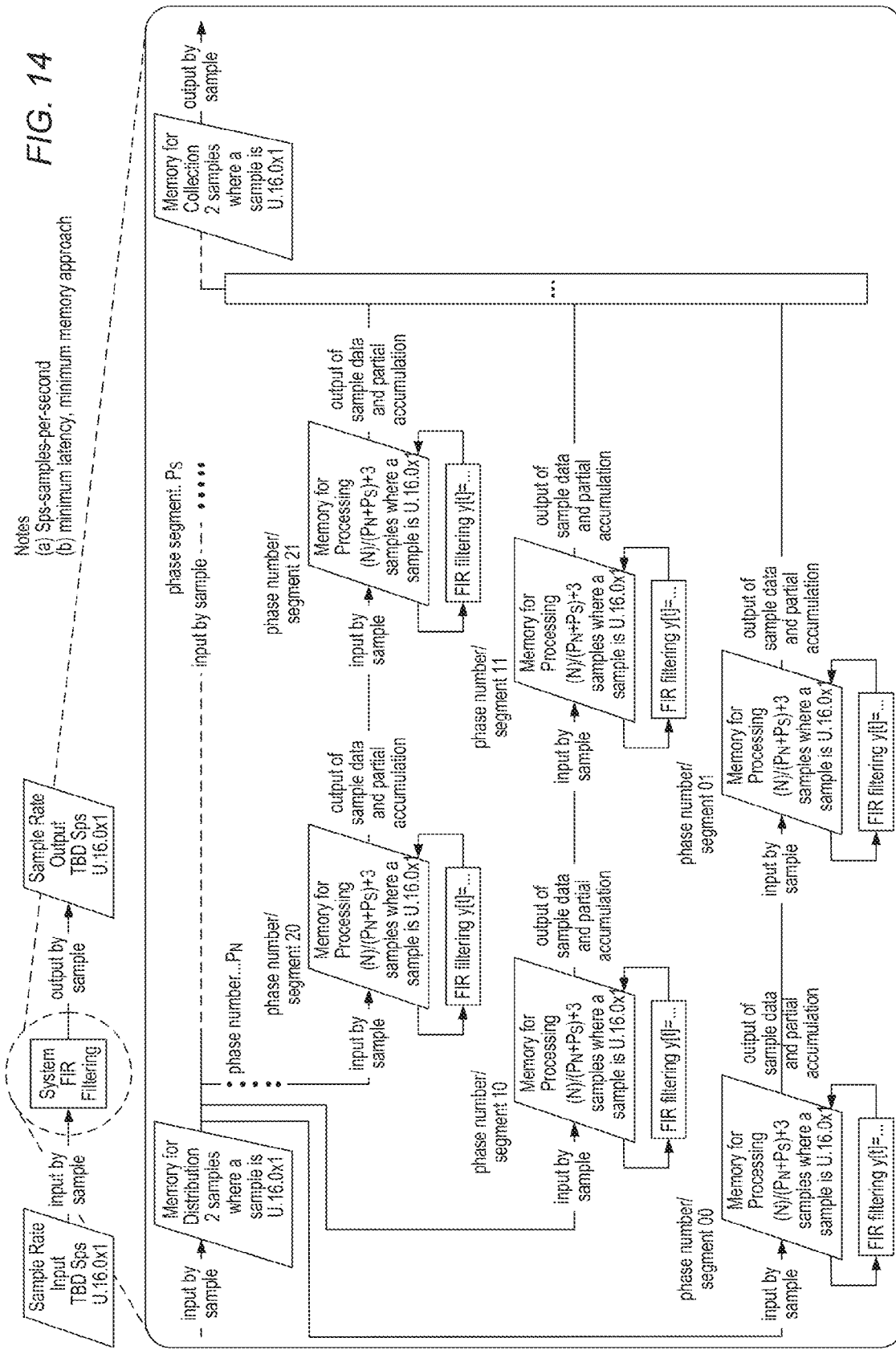
FIG. 14 is a block diagram illustrating a FIR filter using multiple processes.

In this type of system (FIR filter), a data stream input is typically received sample by sample, i.e., one sample at a time. A FIR filter is characterized by its length, which is equal to the number of input samples it uses to produce an output sample. Once enough samples of data are received to satisfy data requirements (e.g., length) of the FIR filter, the FIR filter computation is run across the data to create filtered data sample output. To process the data faster, a common scheme is to divide the filter processing into phases and/or pipelined segments. A single FIR filter process in block diagram form is illustrated in FIG. 13. A FIR filter using multiple processes showing phase and pipeline parallelism in block diagram form is illustrated in FIG. 14.

A program to describe the thread processes illustrated in FIGS. 12 and 13 using MPI supported ANSI C language based software programming model may be written as follows:

```
//* fir_filter_kernel.c
//* example hx3xxx pseudo code for FIR filter
#include <mpx.h>
#include <math.h>
#include "fir_filter_system.h"
// initialize variables
int 1d_sample_buffer[ length_fir_filter + 3 ];
// initialize 1D circular sample buffer on 1d_sample_buffer
void init_1D_circ_sam_buf( .... )
{ .... }
// update 1D circular sample address on 1d_sample_buffer
void update_1D_circ_sam_address( .... )
{ .... }
// FIR filter function with calculations written with sample
based pointers
// for efficiency. This is unnatural. Performs function while
receiving
// next sample of data and sending out previously calculated
sample result.
void fir_filter( .... )
{.... }
mpx_cell fir_filter_kernel( .... )
{ // begin mpi_cell..
    // initialize
    init_1D_circ_sam_buf( .... );
    while(1)
    { // begin while
        MPX_Recv( .... ); // non-blocking sample receive
```

```
        fir_filter( .... ); //perform filter on current data
        MPX_Send( .... ); // non-blocking sample send of results
        update_1D_circ_sam_address( .... );
    } // end while
} // end mpx_cell
```

Code Portion I: Fir Filter_Kernel.c—Code Example of a Fir Filter Kernel

Accordingly, the system in Code Portion J represents a syntactical representation of FIG. 14 illustrating both pipeline and algorithmic phase parallelism of a FIR filter made up of the "fir_filter_kernel.c" processing threads, and may be written as follows:

```
//* fir_filter_system.c
//* example hx3xxx pseudo code for FIR filter system
#include <mpx.h>
#include <math.h>
#include "fir_filter_system.h"
mpx_cell fir_filter_system( .... )
{ // begin mpx_cell..
    // system defined through MPX_PARALLEL
    If (MPX_RANK == MPX_PARALLEL)
    { // begin MPX_PARALLEL
        distribution_and_collection: di_co_sys( .... );
        fir_filter_phasesegment_00: fir_filter_kernel(.... );
        fir_filter_phasesegment_01: fir_filter_kernel(.... );
        fir_filter_phasesegment_10: fir_filter_kernel(.... );
        ....
    } // end MPX_PARALLEL
} // end mpx_cell
```

Code Portion J: Fir_Filter_System.c—Code Example of a Fir Filter System

Figure 15:
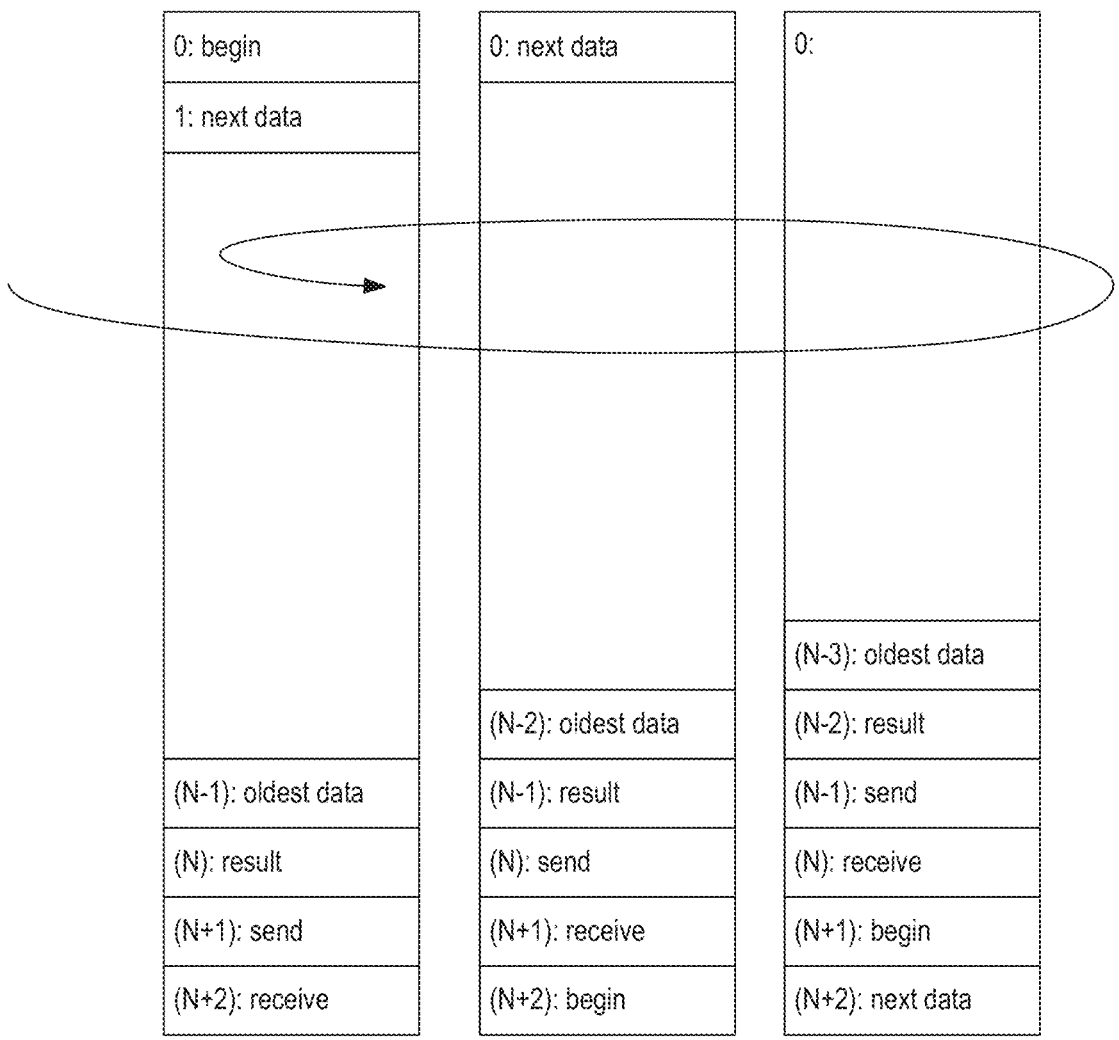
FIG. 15 illustrates a memory structure for a sample buffer.

The following Code Portion K implements the FIR computation using a circular buffer in a manner consistent with FIG. 15.

The "void fir_filter( . . . )" function may be written as follows:

```
// apply FIR filter to current sample data
    // calculate filter using circular data buffer
    //    "1d_sample_buffer"
    // assumptions:
    // a. "begin" and "result" are indices into 1d_sample
    //    buffer[N+2] and are known to be in the range 0
    //    to N+2. "begin" is the index of the newest
    //    sample and (result-1) is the index of the oldest
    //    sample.
    // b. "filter[N]" array variable contains filter
    //    coefficients//
    // intialize variables
    int i;
    int end;
    int ind;
    long temp_result;
    // process part 1
    // calculates the filter from newest sample to oldest
    // sample or the end of the data buffer
    // "1d_sample_buffer"
    // determine the "end" condition for the
    // processing of part 1
    if (begin > 3) {
        end = N+3;
    }
    else {
        end = (N + begin)
    }
    // processing of filter for "process part 1"
    ind = 0;
    for( i = begin; i < end; i=i+1 )
    { // begin for i = 0..
        temp_result += (long)1d_sample_buffer[ i ] *
filter[ ind ];
        ind += 1;
    } // end for i = 0..
    // process part 2, if necessary
    // calculates the remaining data for the filter
    //continuing from newest to oldest if process 1 did
    //not perform all the processing
    if (begin > 3)
    { // begin if begin..
        for( i = 0; i < (result); i=i+1 )
        { // begin for i = 0..
            temp_result += (long)1d_sample_buffer[ i ] *
filter[ ind ];
            ind += 1;
        } // end for i = 0..
    } // end if begin..
    1d_sample_buffer[result] = temp_result;
```

Code Portion K: Fir_Filter Function

In this implementation, the "1d_sample_buffer" may operate like the structure in memory over time illustrated in FIG. 15.

As noted above with respect to the imaging filter example, logically, the MPI with ANSI C software programming model may support full requirements of a mixed memory and adaptable communications scheme. The execution model may provide the capability to meet software programming model requirements, and the software programming model may support scalable code that can target variable real-time performance.

As also noted above, in current approaches the software programming models supporting extrapolation of target hardware features do not allow or facilitate efficient description of the system.

In this exemplary FIR filter example, the discussion will focus on describing the system from the perspective of the communication structure properties and its interactivity with memory properties and processing from the system requirements. This involves defining communication structure properties: the structure size that is used to support communication, the structure size that is used to support processing, the structure behavior to support processing, the structure behavior to support memory, the structure accessibility to support processing, and the structure accessibility to support memory. Once this communication view is defined, memory, control, and processing properties may be derived or explicitly defined. In one exemplary embodiment, this may be done in the following manner:

Defining Communication Structure Size:

As indicated in the FIR filter example of FIG. 14, a circular sample buffer addressing scheme may be created to support the memory structure most natural for the system. The communication structure size may be defined by the size of the filter, that is, the number of samples required for the filter processing or current data (N in this case), plus an extra sample to capture the current result of processing, plus an extra sample to concurrently be receiving the next sample of data, and plus an extra sample for sending previously calculated result of the FIR filter processing. Thus, for this exemplary application, the communication structure size may be defined or specified as: "N+3".

Defining Communication Structure Behavior:

In addition to the size of the communication structure, the behavior of the structure in-time needs to be clearly defined. In this particular case, communication behavior is defined in time with respect to previously received data having been processed and new data being available—having arrived. Specifically, in this exemplary embodiment, there is section (of communication memory) denoted as "current data" intended to be used for current processing that is greater than "N" samples in size, there is a section (or sample space) that accepts the next sample of data, there is a section (or sample space) that holds the previously calculated result, and lastly, there is a section that collects the current result from processing. After the current processing is finished and the previously calculated result have been sent out, the communication behavior may be updated so that the next sample of data just received now becomes the first sample in the current data. Then current result becomes the previously calculated result to be sent out and the current result is reassigned its location. This revolving use of communication (memory) sections may thus define or characterize the behavior of the communication structure.

Defining Communication Structure Accessibility:

Each of the communication sections needs to have its accessibility defined. In this particular exemplary case, for current data, the data needs to be accessible in the form of a standard 1-dimensional array. According to the communication structure behavior described above, each time a new sample of data has arrived or is received and becomes the new first sample of data and the oldest or last sample of data is dropped, the 1-dimensional access to physical address may be updated to support the natural writing and access of data from the user/programmer perspective. The other three sections of communication (mentioned above) may effectively implement a sample space of data supporting receiving of data, results of filtering, and sending of results.

Defining Memory Properties (Size, Behavior, Accessibility)

Once the communication structure size, behavior, and accessibility have been defined, the inter- or intra-memory, control, and processing properties may be either derived or explicitly defined based on interactivity within the system or another system. In this particular case, the input properties of the system can be derived from the communication structure size, behavior, and accessibility definition.

Again, the next step may be to effectively represent the system properties in the software programming model, and there are any number of ways to do this, including, but not limited to, creating or expanding an API such as MPI to support ANSI C, creating specific class structures in C++, etc. However, as noted above, the specific lexical representation is not important. Rather, what is important is that the programming model recognizes these (dynamic) system definitions, i.e., that the tool flow can interpret the system definition and then effectively map the system to the target execution model and underlying hardware architecture.

The example code of Code Portion I, fir_filter_kernel.c, approaches the control model, the memory model, and supporting communications structures and processing explicitly, and may be required to be interpreted as such, which, as explained above, does not allow dynamic interactivity to be defined between control, communications, processing and memory structure in such a way as to intuitively represent a system, to define the system, or to interpret the system in an efficient way.

Continuing with the FIR filter example the fir_filter_kernel.c can now be rewritten as follows:

```
//* fir_filter_kernel.c
//* example pseudo code for FIR filter incorporating
system
//    property defintion
```

```
#include <mpx.h>
#include <math.h>
#include "filter_system.h"
// initialize communication memory
struct com_fir {
    int com[N];
    int receive;
    int send;
    int result;
}
com_fir com;
// FIR filter function with calculations written naturally
as for(i)
// and performs function while receiving next sample of
data and
// sending previously calculated result.
void fir_filter( .... )
{.... }
mpx_cell fir_filter_kernel( .... )
{ // begin mpi_cell..
    // receive initilization of FIR filter properties of
generic FIR filter
    // kernel including type (size and amount) of input
and output for
    // MPX_FIFO_IN and MPX_FIFO_OUT
    MPX_Recv( .... );
    while(1)
    { // begin while
        // non-blocking sample receive or data sample
receive and partial
        // accumulation
        MPX_Recv( com.recieve,....,MPX_FIFO_FIR   |
MPX_NONBLOCKING ...
                                                  |
    MPX_FIFO_IN );
        fir_filter( .... );   //perform FIR filter across
current data in
                       // "com"
        // non-blocking send of resulting sample or sample
data
        // and partial accumulation
        MPX_Send( com.send,....,MPX_FIFO_FIR   |
MPX_NONBLOCKING ...
                                               |
    MPX_FIFO_OUT );
    } // end while
} // end mpx_cell
```

Code Portion L: Fir_Filter_Kernel.c—Updated Code Example of a Fir Filter Kernel Incorporating System Property Definitions, According to One Embodiment As shown in the updated code example of Code Portion L, the program statement "int com[N];" declares a variable that is used in the communication structure, now supported by the programming model that takes on the size, behavior, and accessibility properties discussed above. This is illustrated by the exemplary MPI constructs of "MPX_Recv (com, . . . , MPX_FIFO_FIR|MPX_NONBLOCKING|MPX_FIFO_IN);" and "MPX_Send(com, . . . , MPX_FIFO_FIR|MPX_NONBLOCKING|MPX_FIFO_OUT);" in Code Portion L.

The "void fir_filter( . . . )" function of Code Portion K can now be written in natural form, and may achieve higher operation efficiencies in its processing, as follows:

```
// apply FIR filter to current sample data
    int40 temp = 0;
    for( i = 0; i < FILTER_LENGTH; i++ )
    { // begin i = begin..
        temp += (long)com.com[ i ] * filter[ i ];
    } // end for i = 0..
    com.result = temp >> SCALE;
```

Code Portion M: Updated Fir_Filter Function

Figure 16:
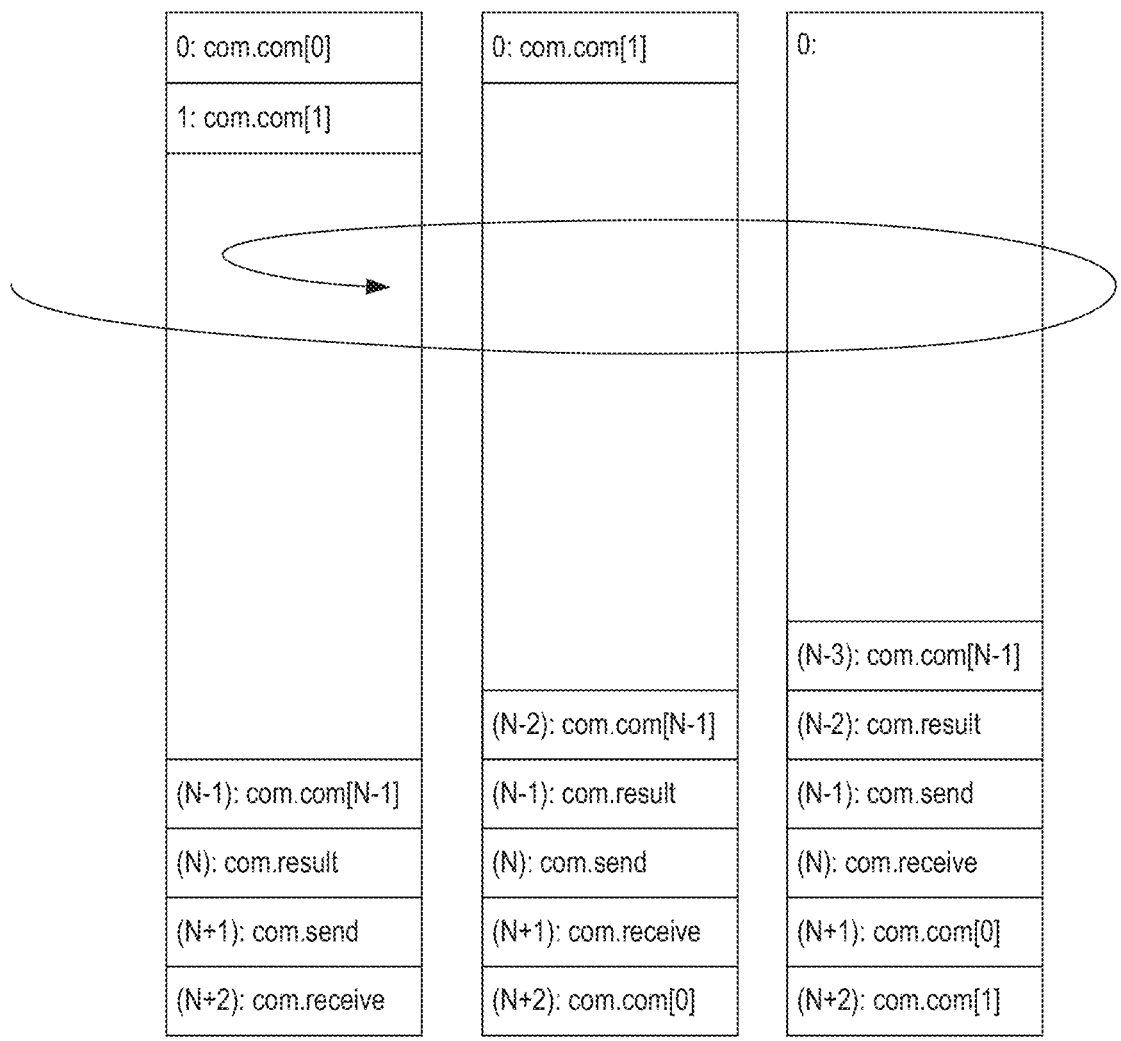
FIG. 16 illustrates a structure over time for the memory communication behavior.

Here the "com" communication memory may operate like the structure in memory over time illustrated in FIG. 16.

Finally, the program statement "MPX_Recv(com. recieve, . . . , MPX_FIFO_FIR|MPX_NONBLOCK-ING|MPX_FIFO_IN); // non-blocking sample receive or data sample receive and partial accumulation" may provide a single update to automatically update the behavior and accessibility properties. This sets up the next sample of data to be received, the current data for processing, current result to be collected.

Figure 17:
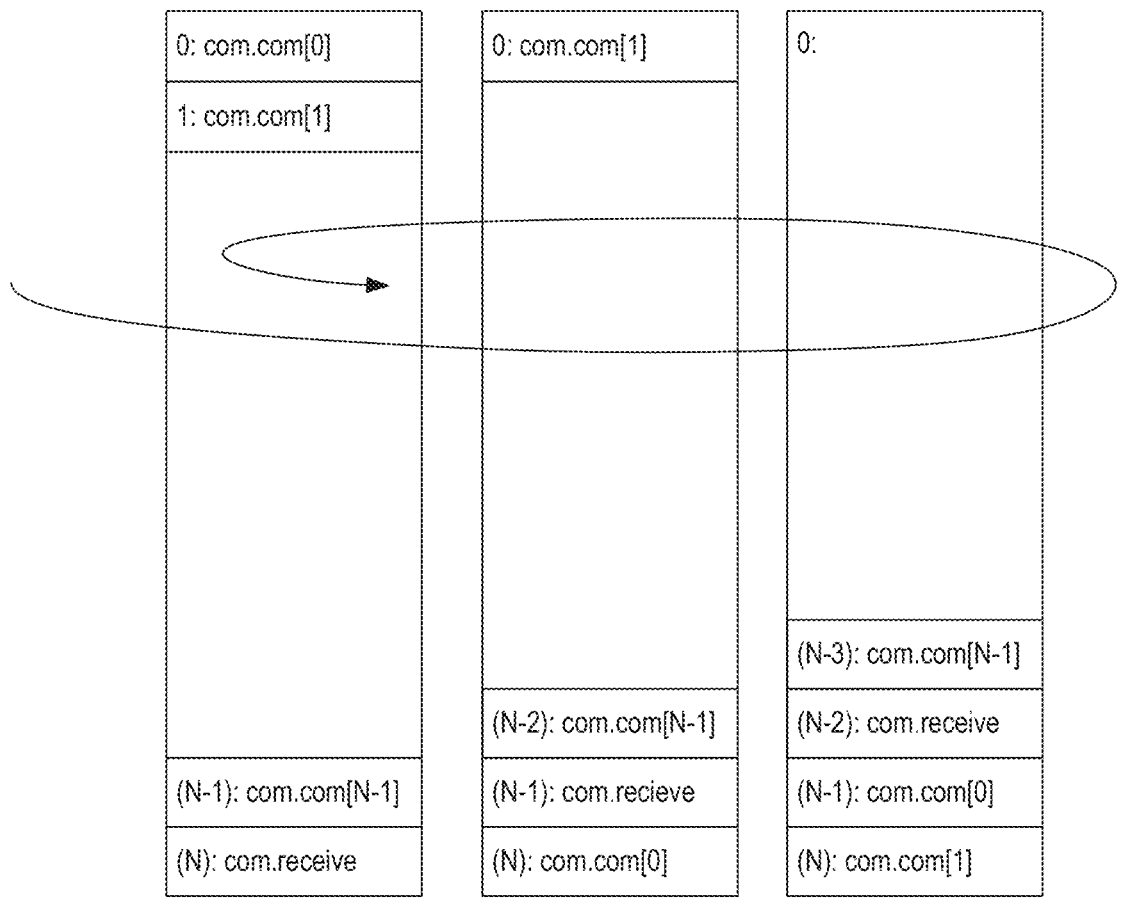
FIG. 17 illustrates a structure over time for the memory communication behavior for a part of a FIR filter.

In one exemplary variation of the above FIR filter example, a part of the FIR filter is performed in a thread and the partial accumulation of the FIR needs to be received for calculations, and once the calculations are complete, forwarded to another thread along with appropriate data samples. Exemplary Code Portion N shows a thread that receives the sample data and partial accumulation, followed by Code Portion O, which shows the partial FIR filter kernel and use of the representative communication memory structure, as illustrated in FIG. 17, which corresponds to the middle blocks of the FIR phase/segment shown in FIG. 14.

```
//* fir_filter_kernel.c
//* example pseudo code for FIR filter incorporating system
//   property definition
//   it receives partial_result, sampled data, and sends sampled
data
#include <mpx.h>
#include <math.h>
#include "filter_system.h"
// initialize communication memory
struct com_fir {
    int com[FILTER_LENGTH];
    int receive;
    int40 result_partial;
}
com_fir com;
// FIR filter function with calculations written naturally as
//for(i)
//   and performs function while receiving next sample of data and
//   sending previously calculated result.
void fir_filter( .... )
{.... }
mpx_cell fir_filter_kernel( .... )
{ // begin mpi_cell..
    // receive initilization of FIR filter properties of generic
    FIR filter
        // kernel including type (size and amount) of input and
        // output for MPX_FIFO_IN and MPX_FIFO_OUT
        MPX_Recv( .... );
        while(1)
        { // begin while
            // non-blocking sample receive or data sample receive and
            // partial accumulation
            MPX_Recv( com.receive |
com.result_partial,....,MPX_FIFO_FIR | ...
MPX_NONBLOCKING ...                                  |
MPX_FIFO_IN );
            fir_filter( .... );  //apply FIR filter across
                            //current data in "com.com"
        // non-blocking send of resulting sample or sample data
```

```
            // and partial accumulation
            MPX_Send( com.com[N-1] | com.result_partial,...., ...
                            MPX_FIFO_FIR | ... MPX_NONBLOCKING |
MPX_FIFO_OUT );
        } // end while
} // end mpx_cell
```

Code Portion N: Example of a Partial Filter Kernel Incorporating System Property Definition in the Context of a Communication Model Structure Supporting Sampled Data and Partial Accumulation Forwarding

```
// perform part of a FIR filter on current sample data
// supporting receiving partial accumulation and
// forwarding partial accumulation
    for( i = 0; i < FILTER_LENGTH; i++ )
    { // begin i = begin..
        com.result_partial += (long)com.com[ i ] * filter[i ];
    } // end for i = 0..
//not needed: com.result = temp >> SCALE;
```

Code Portion O: Part of a FIR Filter Kernel Written in Natural Form Supporting Partial Accumulation Code to receive samples only and send samples with partial accumulation results, as well as code to receive samples and partial accumulation to produce a final FIR filter result, may be written as variations of the two FIR code examples provided, and are not presented here for brevity, such specific implementations of the techniques disclosed herein being within the capabilities of those of skill in the programming arts. Many other filter types may also be restructured in a similar fashion, as well as other algorithms and processes. In other words, the above examples are exemplary and illustrative only, and are not intended to limit the scope of the invention.

Thus, embodiments of the techniques disclosed above may provide substantial efficiencies over prior art approaches regarding parallel execution of software on multiprocessor systems.

Compared to Code Portion M, Code Portion O does not have to rescale the accumulator to fit in an integer, As noted above with respect to the imaging filter example, within the tool flow, the compiler may be designed to interpret the system behavior and more effectively map hardware resources to support system functionality defined.

The above FIR filter example was predominantly described from the communication definition (communication view) perspective. Again, this should not be interpreted as a limitation. Additionally, or alternatively, to the communication model of a system being described in terms of size, behavior, and accessibility, the control, the memory, and the processing views (and sub-views) may be similarly used to describe or define the system.

Following the efficient capture of system design, to achieve more efficient operation from hardware, new programmable hardware features have been created to support the system properties defined. These features may include, but are not limited to, a processing element, datapath, address generation, control-flow, etc. These features are intended to achieve (substantially) maximum operations and energy efficiency in a given cycle of operation and reduce overhead (setup, index register updates, and the like) to near zero in many computation intensive applications.

Hardware Elements

The following describes various novel hardware architecture elements which provide an improved system.

The design of the hardware may be tightly coupled to perform in an energy efficient manner for targeted system applications. The circular data buffering may be done using modulo addressing and DMR FIFO techniques (described below) in conjunction with hardware repeat loops to make the addressing automated in the looping. HyperOps (described below) provide a way to control a high degree of parallelism without the high cost of optimization that conventional techniques require. Multi-datapath hardware (described below) allows for greater parallelism of the actual algorithm math section in a manner that is almost as efficient as a pure ASIC, non-programmable solution. Automatic repeat buffering lowers the fetch (and decode) power. Limited address space provides efficient addressing and read/write operations for both data and instructions. Data realignment and accumulator forwarding provide mechanisms to lower the data movement overhead and join multiple PEs together to operate additional resources to run an algorithm faster.

Goal

The goal of any engineering implementation of a hardware system is to provide the functionality required for the system at a minimum cost function. This cost function includes many aspects where some of the most important are actual hardware cost, time/cost to implement the entire system, cost of use (such as power and area) among many others. Many times, multiple options are available that break down the tradeoffs in various ways. In previous sections, various solutions presented included GPP, GPU, DSP, FPGA, many/multi-core and ASIC. The existing system implementations available using these types of hardware vary greatly in complexity, ease-of-use, programmability, flexibility, cost and power. Of the examples given, the most power efficient for a given system is the ASIC. However, it is also the most inflexible and typically is the most costly in terms of development time and cost. Others offer more flexibility with mostly a tradeoff in lower cost/time and increased power. The goal of the hardware described herein is to provide a hardware platform that is highly programmable by conventional means for specific types of compute loads while still approaching the power efficiency of a pure ASIC hardware solution.

Concept

To try and reach this goal, concepts are borrowed from essentially all of the other presented solutions Innovative modifications and organization of these concepts allow for a power efficient implementation that approaches the pure hardware solution in terms of power efficiency while still providing a high degree of programmability desired to allow for faster implementation (time-to-market). The software techniques used are coupled tightly to an architecture that provides hardware assisted performance and power optimizations.

The primary focus herein is to describe how the execution unit or Processing Element (PE) is architected to provide high throughput at low power. This is coupled with a memory and communication system in the Data Memory Router (DMR) that provides the fabric on which the data is streamed into and out of the PE for processing.

Processing Element

The processing elements (PEs) in the prior-art (GPPs, GPUs, Multi-Core, DSP, etc.) have instruction architectures that were either traditional fully-encoded instructions or a very long instruction word (VLIW) with multiple slots for the control of multiple operation units. As for the data-path in these architectures, some of the prior art includes multiple operational units that may operate in parallel with various degrees of independence. Some can support multiple instruction streams intermixed in a superscalar type implementation while others are single threaded.

The innovative PE architecture presented here is a hybrid of traditional fully-encoded instructions and VLIW style slots for sub-instructions. This is a very flexible and efficient instruction-architecture that may support a wide variety of data paths that have multiple operation units, such as multipliers, ALU units, address generators, etc. and mechanism for interconnecting them. Unlike the dynamic scheduling of a super-scalar architecture, which requires much hardware for scheduling the execution of the instruction stream, this architecture provides for static scheduling provided by the software tools (compilers and assemblers, etc.) that generate the instruction stream. While this static scheduling does have some limitations that makes it less optimal for random instruction streams of say a GPP, it is completely sufficient for highly structured real-time type algorithms for DSP and image processing and provides for a much improved runtime power efficiency when coupled with the proper optimizing compiler and software development tools.

The PE is made up of multiple pipeline stages in which separate operating units run. The primary operational units are the Instruction Fetch, Decode/Issue, Operand Fetch, Execution Unit and Write-back (coupled to Fetch). The nominal 9 stage pipeline used is shown in FIG. 18 with the operational units marked as to where they operate in the pipeline.

This pipeline structure is rather shallow by today's standards and that is with purpose. The design of individual units and features will be discussed in following sections with emphasis on the unique design points that allow for the low-power design. One will note that the information tends to spread across multiple sections because the design is such that the features and architecture across multiple functional units work together to produce the unique overall hardware design. The pipeline having fewer stages than most is part of the hardware optimizations that are done to increase performance and reduce power. With smaller, less complex hardware it can be built to run at high performance levels even with the shallow pipeline.

Execution Pipeline

Basic Pipeline

Figure 19:
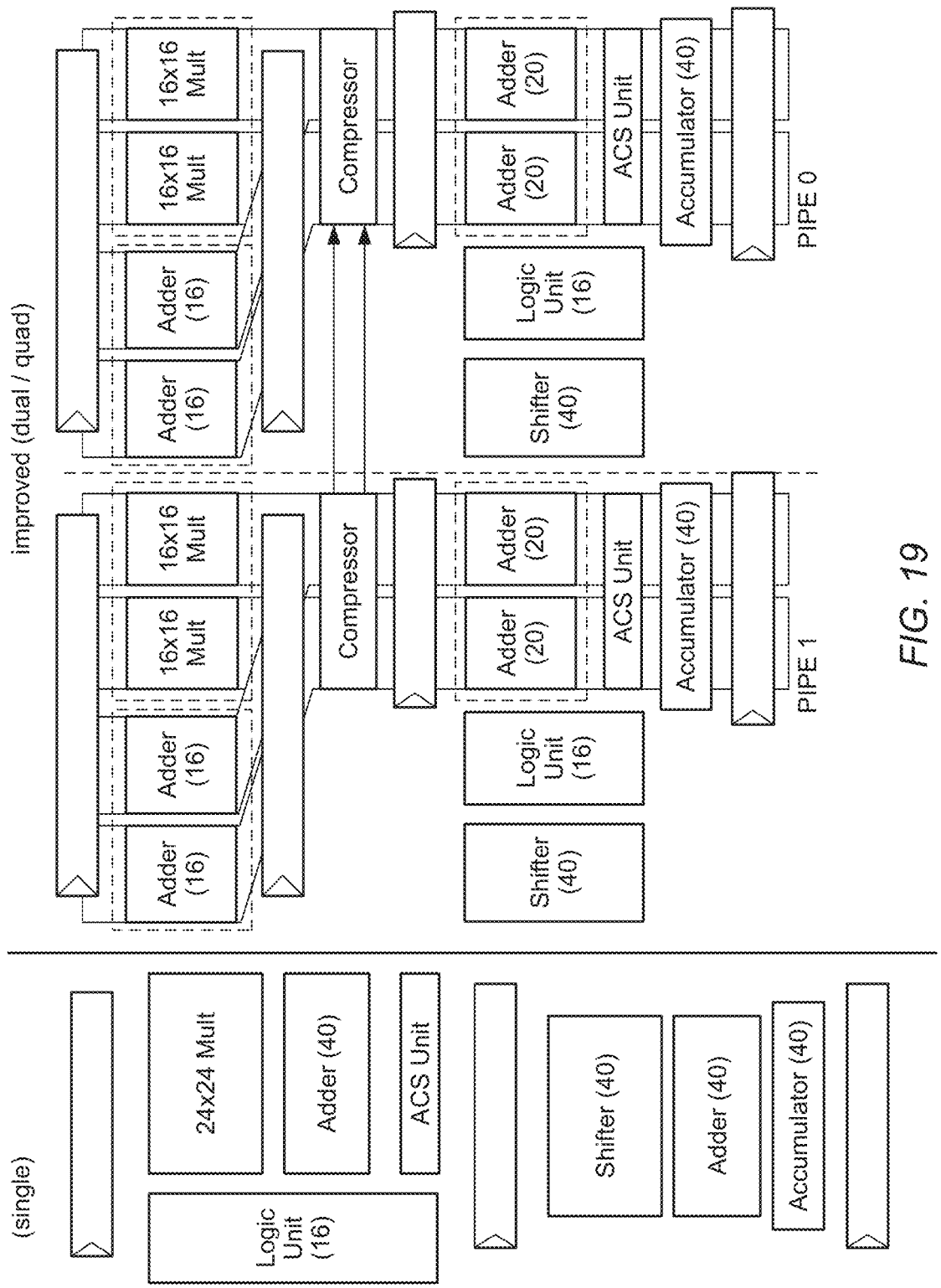
FIG. 19 illustrates block diagrams of embodiments of a single PE datapath architecture and an improved PE datapath architecture.

FIG. 19 an illustrative improved PE datapath architecture versus single datapath architecture. More particularly, FIG. 19 shows conceptual block diagrams of a somewhat standard single datapath (similar to the previous generation) and an improved PE datapath architecture (the instruction fetch, decode, and control logic is not shown). This improved datapath can be realized in about 60% more logic than a single datapath. In other words, the pipe0 or pipe1 in the improved datapath is 20% less logic than the single datapath with essentially equivalent or more operations capable per cycle. The single datapath has separate paths for logic operations and arithmetic operations. The multiplier may be 24b by 24b to support floating point mantissa multiplications. This may be followed with a 40b accumulator and an Add-Compare-Select (ACS) unit. All results may then be shifted and accumulated again. A limited amount of pipeline parallelism is possible on 8 bit data by dividing the accumulators in half and operating in single instruction multi-data (SIMD) mode.

The improved data path architecture contains dual independent pipelines as shown in the diagram as pipe0 and pipe1. Each of these pipes may have dual 16b by 16b multipliers. The pipes are joined by compressor circuits to achieve a range of multiplication results: quad 16b, dual 16b plus one 32b, dual 32b, or one 64b (it also supports a single 24b multiply for floating point math). For each pipe, the compressors may be followed by a stage of Shift, Logic, Add and ACS and then the final accumulator. In the simple, single datapath pipeline, only a single math operation (multiply or add/sub) may be performed per clock for 16b operations, a primary data size for a real-time DSP engine. With the new architecture, the hardware is divided up into more optimal structures to provide up to four of the same type of operations per clock for specific operations that are useful in this form for DSP algorithms. This architecture, along with the reduced amount of hardware per pipeline, provides a much more energy efficient way to do DSP and image calculations. The achievable energy efficiency is comparable to a pure hardware solution, but here it is achieved in a fully software programmable PE, which reduces development efforts. The dual/quad pipeline architecture enables many different combinations of operations per PE cycle; but the traditional assembly language instruction set may not support all of the inherent flexibility. Changes in the overall instruction encoding and programming model to fully utilize this increased flexibility will also be discussed.

Figure 20:
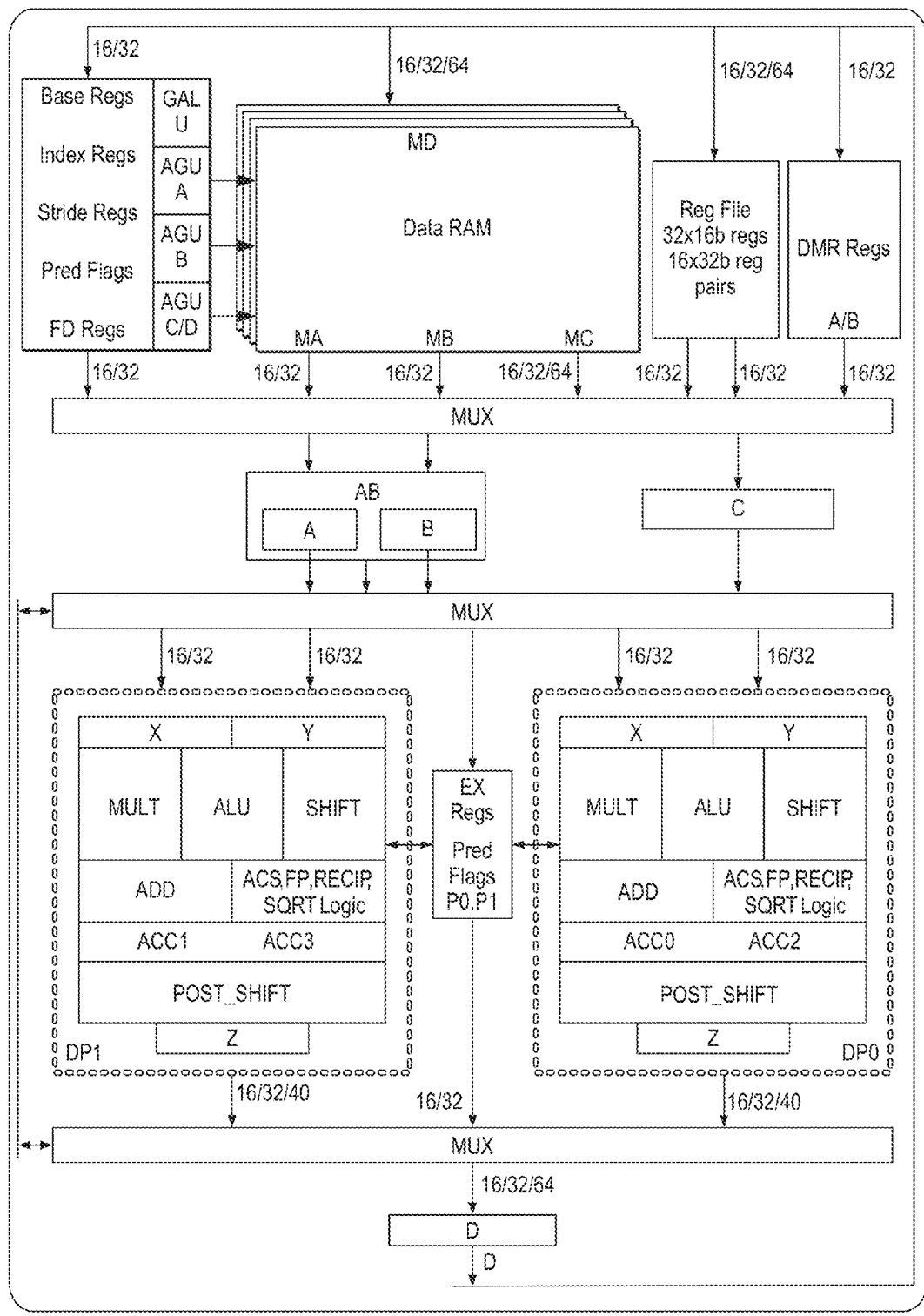
FIG. 20 is a block diagram illustrating one embodiment of a datapath.

Note that, in FIGS. 19 and 20, the data path coupling the two compressors (between pipe1 and pipe0) after the multipliers. This path provides for a single accumulation of multiplies for acceleration of operations like multiply-accumulate of a large number of operands as required for FIR filters, etc. This is an extremely efficient way of doing these operations as well as sum of absolute difference (SAD) type operations. This optimization greatly increases the power efficiency of this architecture over others. This is a few simple gates that provide the effectiveness of another full adder while simply doing another bit compression operation on the partial products from the multiplier arrays for MAC or the adder arrays for SAD type operations. Again, the ability to efficiently use these extra gates may require improved instruction encoding and control techniques to be discussed later.

Summarizing, the improved PE datapath features:
Two datapaths, each capable of (per cycle):
One/two 16 by 16 multiplies or one 32 by 32 multiplies
One/two 16 add/subtracts or one 32b add/subtract
40b barrel shift
32b logic operation
40b accumulation using one of two 40b accumulators
Together the datapaths can perform (per cycle):
One 32 by 32 multiply or multiply-accumulate
One 32b floating-point add/subtract/multiply
Four 16×16 multiplies with dual or single accumulation
Four sum of absolute difference with accumulation Based on the quad operations of the multipliers and adders in the two datapaths, there are many more functions that can be performed efficiently that are needed for DSP algorithms. An improved instruction set may be designed to expose the hardware at a fairly low-level programming model to allow for these operations to be implemented at the programming level instead of purely at the instruction encoding level (see HyperOp later). This provides another innovation with this architecture.

Operand Alignment

Fetches of operands from, and writes of results to, memory is one of the larger power consuming tasks of all architectures. With large local caches and complex caching systems, a lot of power can be dissipated in these operations, thus hurting overall efficiency. In most of the state-of-the-art systems, the memory subsystem allows for many different operand sizes as well as large address spaces, accessed through multi-level cache systems. The on-chip supporting memory for each PE in a many-processor IC chip is much more limited in size, and need not support as many operand sizes and alignment operations.

Operand size and alignment is discussed briefly here in order to describe data alignment multiplexers and their use in the PE architecture to support the HyperOps. Data operands and results will be discussed in a later section in more detail but for this discussion all that is needed is that the architecture provides, under various conditions and not necessarily at the same time, for the following options:
Fetch of 2 16-bit operands
Fetch of 2 32-bit operands
Fetch of combination of 16-bit and a 32-bit operand
Fetch of an additional 64-bit aligned operand
Write of single 16-bit result
Write of single 32-bit result or two 16-bit results
Write of two 32-bit results or 64-bit result To keep the memory interface simple, all of the above operations should be aligned on the data size boundary for the physical memory. This would seem to limit the viability of their use in certain algorithms. To address this limitation, operand (and result) alignment multiplexers are added to the dual/quad pipeline architecture described above. Alignment multiplexers may have very limited use in the single pipeline architecture with assembly language programming model, but they mate well with the flexibility of the dual/quad pipeline architecture with the HyperOp programming model.

FIG. 20 shows a data path example with dual high throughput operational units designated data pipeline 0 (DP0) and data pipeline 1 (DP1) with the expansion of some additional flow registers for this discussion. These are the extra pipeline registers X, Y for input and Z for output. Also shown are the nominal operand stages A, B, C and the destination stage D.

The A, B, and C registers are used to store operands up to 64 bits wide as previously discussed as being available. The HyperOps uses the muxing between the A, B, and C registers and the X and Y registers of the two datapaths to control the operands and the word alignments required for each operation performed by the datapath. The operand fetching into the A, B, and C registers during HyperOp processing is under program control to allow for the aligned accesses to memory to provide operands in a re-aligned manner (and thus what appears unaligned, if necessary) to the datapath math units. This innovation allows for the simpler, low-power memory structure and addressing modes so as to provide a manner in which to feed sufficient operands to the complex datapath/HyperOp combination to provide peak throughput independent of how the operands are stored in memory.

Similar to the operand discussion is the result one. The datapath results are put into either of the accumulators or the Z register during HyperOp execution. These can then be either moved to D for writeback elsewhere or fed back on the illustrated path to be used as additional operands in subsequent instructions. As with the operands, re-alignment of the results can occur here to provide for aligned writebacks to memory/registers for un-aligned data. Again these operations are independently controlled by the HyperOp instructions.

Dual Accumulators Per Pipeline

In many architectures that support an accumulator for adding together long strings of similar math operations into a single sum there is a single accumulator. In addition, sometimes all operations modify this accumulator with the results (again, our previous generation). While this structure works fine for architectures that are primarily single, scalar operations per cycle, with the addition of an extra datapath and the ability to operate on multiple operands per cycle with HyperOps it becomes necessary to extend this concept. The current design point contains two independent accumulators per datapath. Each operation can choose which, if any, accumulator will be updated. These can therefore be used to either store intermediate values for later processing through the muxing structure previously discussed or to allow for multiple data streams to be processed in an interleaved form without the additional cycle or power overhead of saving and restoring the accumulator values. These features of the dual accumulator structure when coupled with the other features such as dual datapaths and operand/result alignment provide a mechanism to keep the pipeline more fully utilized, which in turn reduces the overall power per operation for the design.

Accumulator Forwarding

Figure 21:
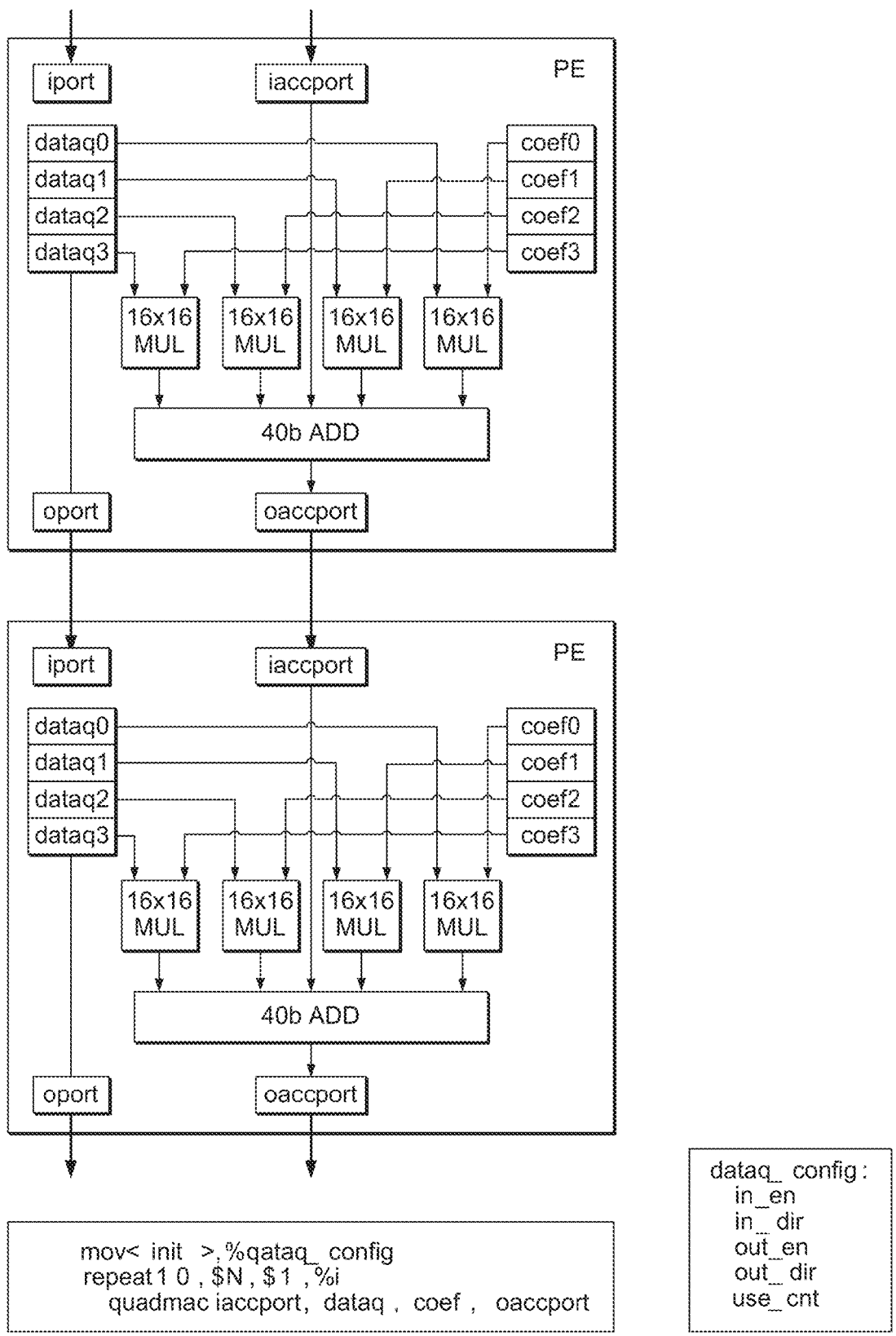
FIG. 21 is a block diagram illustrating one embodiment of two PEs performing accumulator forwarding.

Another feature related to the accumulators provides another way to speed up inner loops of some algorithms and increase parallel execution across multiple PEs in a chip. For example, this is needed in order to minimize the overhead on computational loops that should be spread across multiple PEs in order to provide enough data processing bandwidth, as in a multi-tap high-bandwidth FIR filter. This can be achieved with "accumulator forwarding" between PEs, which is shown in FIG. 21.

This figure illustrates two PEs, but this is easily extendable to as many as required to reach the desired bandwidth. A path is provided such that when one accumulator is updated the updated value is forwarded on a fabric extension of the DMR to another PE. Here, this arriving accumulator value is used to add to the local calculation and put in the new, local accumulator. This new accumulator value can again be forwarded to another PE for additional calculations.

Also shown in the diagram is the use of the C register to hold four coefficient values for a local MAC (or any other) calculation. This can provide four taps of a FIR filter for instance. Each PE in the chain can provide an additional four taps. Thus, by way of example but not to be limited by it, eight PEs could implement a 32 tap FIR filter at full clock rate at one sample per clock. To implement this same filter on a single PE would limit its bandwidth to one sample every eight clocks.

The data is passed through between the DMRs with FIFO structures to move the data stream forward through the filter. The realignment buffers mentioned in an earlier section are used to select the proper coefficients for the current set of data that each local PE is processing. The data movement is in lockstep with the execution, such that triggering occurs on the arrival of data to do the next computation in a manner consistent with the algorithm. In this way, a filter may be implemented using only the same data movement and the same computations that are required by a pure hardware structure implementing a similar filter. This makes the power dissipation of this programmable solution comparable to an ASIC performing the same function.

Based on this case, a single quad multiply-accumulate instruction may be fetched to run the inner loop of this algorithm. In a later section more details will be provided, but this instruction (along with others, if needed) may be stored in a local instruction buffer by the instruction fetch and dispatch unit. While in the loop, no additional instruction fetches are needed, and for a single instruction no additional decoding is needed; potentially saving a lot of power dissipation.

For example, in the case of a FIR filter using multiple PE with the dual/quad architecture, each PE in each cycle may process up to four input samples with a single instruction. This instruction is executed over and over without the control lines toggling. When the system detects this repeated instruction(s), the instruction memories may be put into a power savings mode as no fetching from memory is occurring. For some of the tight loop DSP algorithms like a FIR filter, the data movement and calculations and some minor control toggling in this programmable system is similar to an ASIC hardware implementation, thus achieving close to the same low dynamic power dissipation.

Address Generation in Instruction Fetch/Decode

In FIG. 20, the address generator section containing the address generation units (AGUs) was shown but not detailed. The address generator section of the PE architecture generates addresses for the various addressing modes supported by the hardware. Its unique features will be described further in this section.

The address generator section may have multiple programmable math units for use for generation of addresses. Each of these units is an Address Generation Unit (AGU). In addition, there may be one or more extended math and logical unit (GALU) that can be used for doing additional computations in the address computation portion of the pipeline. These calculations are useful for extending the functionality and performance of the pipe and for removing pipeline delays in table lookup type operations as well as others. In FIG. 20 the example Address Generator section contains three AGU and one GALU and a set of support registers.

For typical operations in a standard encoding method, the AGUs are used to generate addresses for either two source operands and a destination, or for a subset of these and some address or extended math operation. The units are coupled tightly with the encoding. For extended operations via the HyperOp encodings, these units are more decoupled and can be independently controlled by the instruction stream. This allows for more flexibility and more parallelization of operations. The optimizations may be performed at compile time so that real-time reordering is not required and thus there is no operating power penalty of such optimizations.

Figure 22:
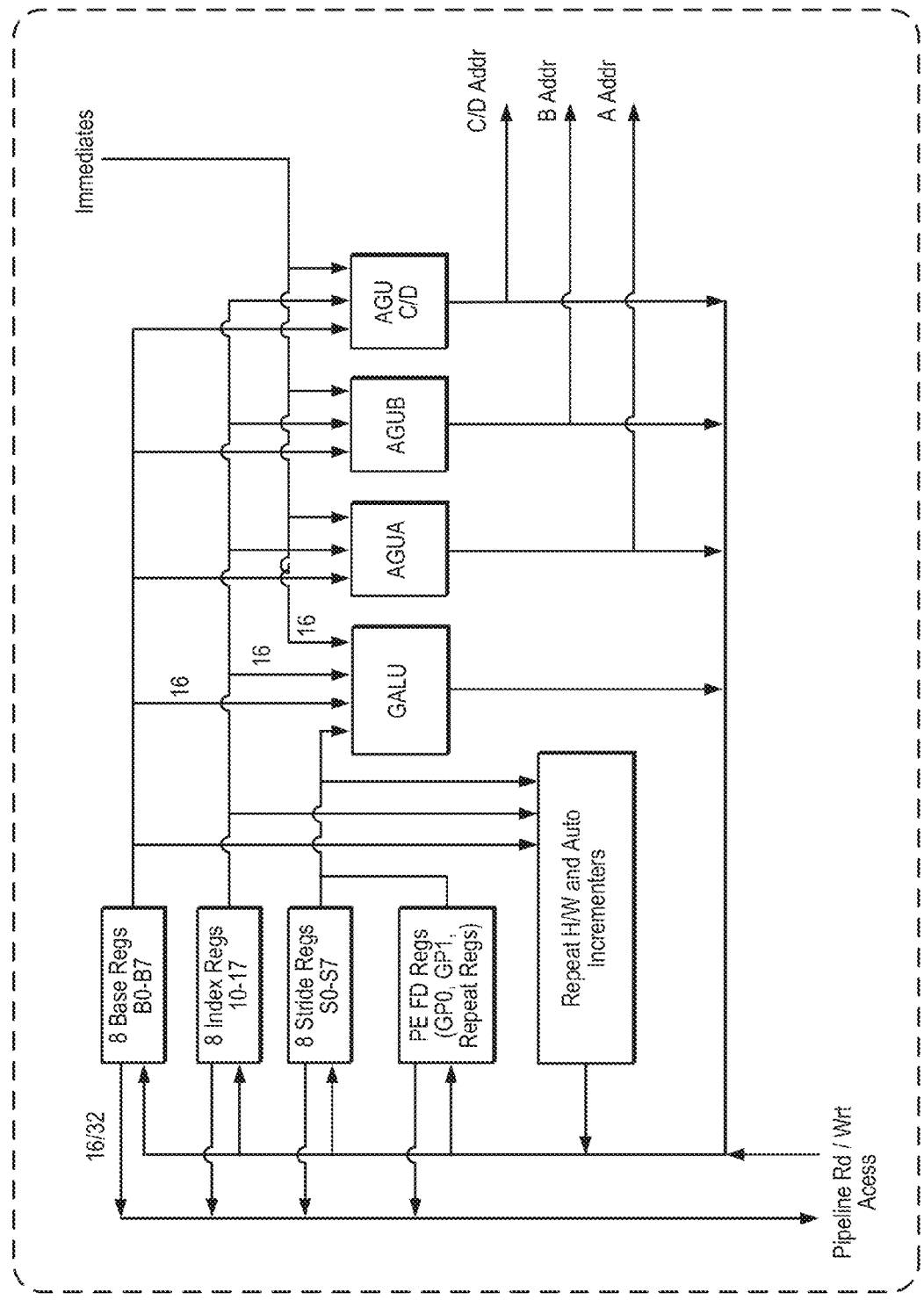
FIG. 22 is a block diagram illustrating one embodiment of address generation logic of a PE.

A more detailed block diagram of this hardware is shown in FIG. 22. This diagram makes the couplings of the multiple AGUs clear along with the registers available for use in this section. The exemplary hardware can be detailed as:

3 standard AGUs for address type computation
1 extended AGU for additional math/logical support (GALU)
8 base registers B0 . . . B7
   B0 in addressing modes yields a value of zero
   B0 is used as Stack Pointer (SP relative addressing modes)
8 index registers I0 . . . I7
   I0 in addressing modes yields a value of zero
   I0 can be used as a temp register for other AGU arithmetic
8 stride registers S0 . . . S7
   Sn used with In or Bn 4 additional incrementers for secondary indexes or base registers
   Index registers I4 . . . I7
   Base registers B4 . . . B7
   Increment by Stride registers S4 . . . S7

The last three items may not only used in address computations and quick math in the early Instruction fetch part of the pipe but are coupled to the hardware repeat operations described later to provide zero overhead looping for critical loop computations.

Figure 23:
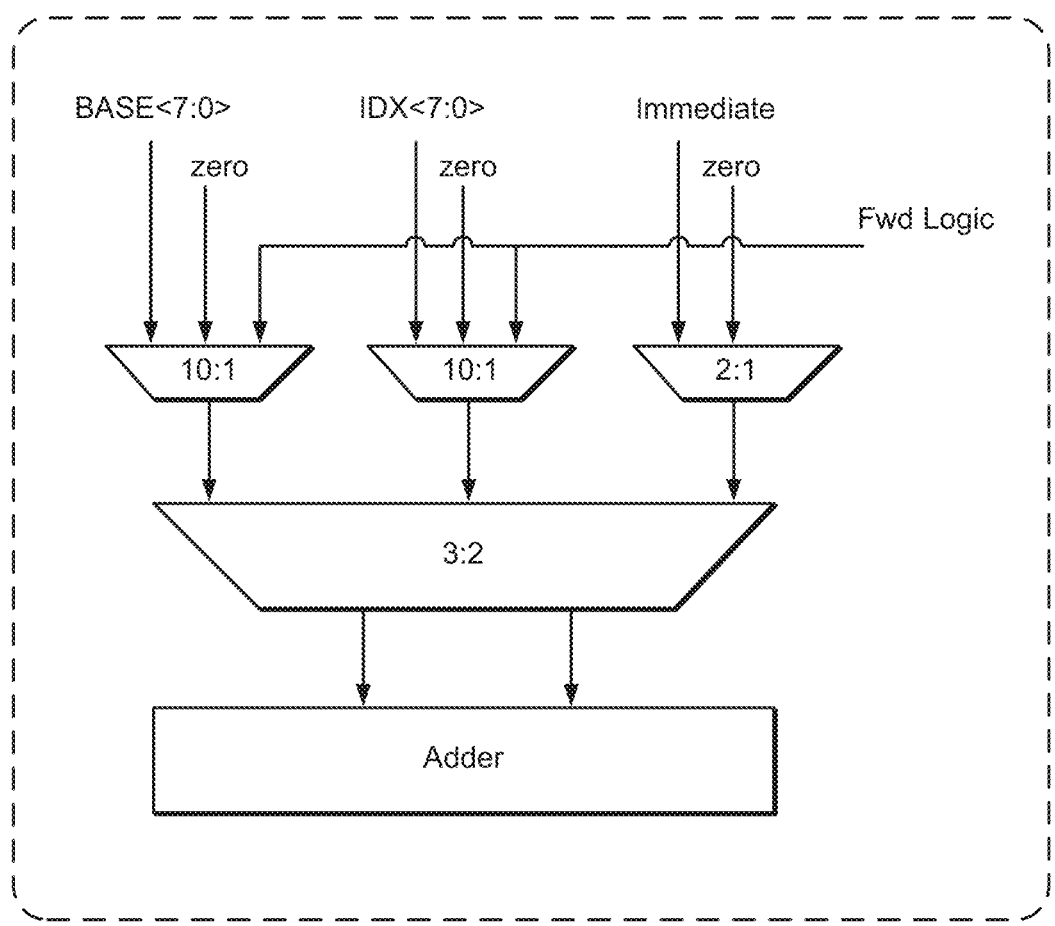
FIG. 23 is a block diagram illustrating one embodiment of an address generation unit (AGU)

FIG. 23 is a block diagram illustrating a more detailed view of a single AGU. Features for each of the AGUs may include:

1) Additional address computations available on more registers,
2) A new block for extended quick AGU operations. (There may be only one of these. The inputs use existing multiplexers and fields from the A and B source address decode),
3) Condition code outputs of the adder will allow for a quick branch capability. (This provides zero overhead conditional branching when the decision math is performed by the AGU instead of in the main datapath, which inserts additional pipeline delays),
4) Modulo index math (for circular buffering),
5) Multi-strided index math (for multi-dimensional array to flat memory mapping), and
6) Complex math for accelerated table lookup.

In addition to using a single AGU for an address computation, multiple AGUs can be combined by certain instructions in order to perform more complex address computations. In this way the HyperOps can allocate the AGU to do complex math on addresses to provide more flexibility in how memory addresses are used. These more complex addressing modes can include such things as circular addressing (covered in more detail in a later section), modulo addressing, multi-strided indexing for use with 2D and 3D addressing, complex table lookup addressing, sin/cos special addressing, etc. Because of the flexibility in having adder and logic capability in this section of the hardware pipeline, it is possible to perform complex address math for specific algorithms with more efficiency than could be possible if this address math were to be performed in the normal execution pipeline. Because the AGU are separate hardware from the main datapath ALUs, the address computations may be performed concurrently with data computations.

AGU Branching

Another ALU functionality in the AGU pipeline area is early branch calculations that enable zero-overhead branching. When the math to calculate branch decisions is performed in the normal execute section of a pipeline it takes place very late within the pipeline timing structure. This means that if the branch is incorrectly predicted then several instructions are fetched and should be speculatively executed (instructions not allowed to change permanent state by writing results) while the branch decision is finalized. If the decision is incorrect then these results are invalidated and not used and the power and time for them has been wasted. Because the AGU math occurs much earlier in the pipe than the branch decision that is performed, no incorrect instructions are fetched and no speculative execution occurs. Thus the branch does not waste any execution cycles or power on non-useful instructions.

Circular Addressing

In order to support the complex streaming data structures for the acceleration of the DSP algorithms, extended addressing modes are desirable. One such mode is circular addressing. This type of addressing allows the math to be written in a more simple form and much of the complexity transferred from the datapath to the AGU section where it can be performed more efficiently and at a better time slot of the pipeline for performance. How the hardware is utilized to accomplish this may be understood through the following example.

Assume that a pair of two index incrementers from two AGUs are combined to generate circular addressing for one index, e.g. {i6, s6} and {i7, s7}.

Figure 24:
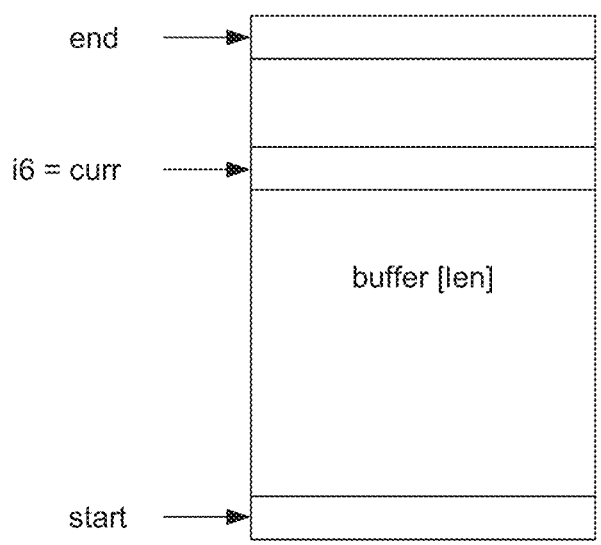
FIG. 24 is a conceptual illustration of one embodiment of a circular buffer.
Figure 25:
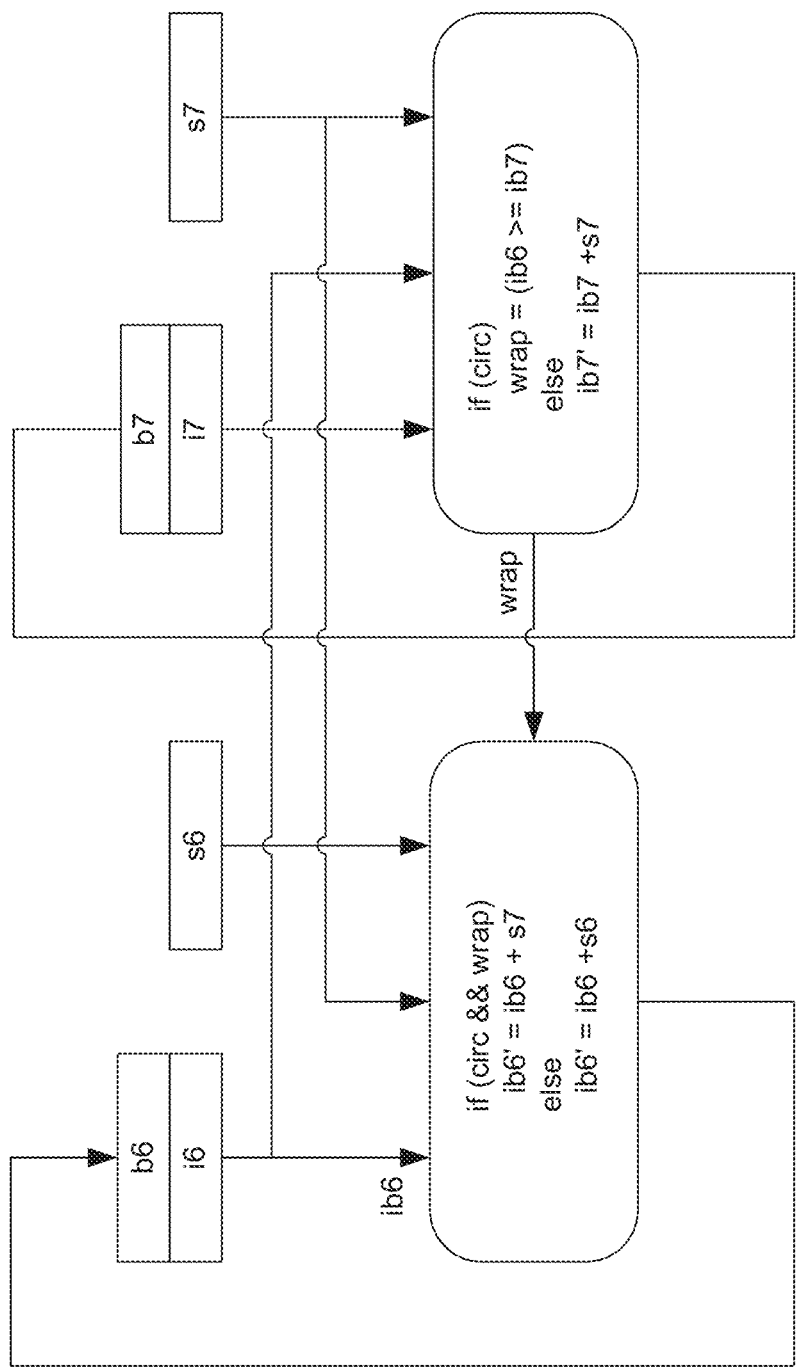
FIG. 25 is a block diagram illustrating one embodiment of the control of the circular buffer of FIG. 24.

Assume a circular buffer shown in FIG. 24 where:
   i6 holds the current array index
   s6 holds normal stride
   i7 holds last valid circular array index
   s7 holds stride for wrap situation This can be achieved by coupling two incrementers as illustrated in FIG. 25. This implements a full by-N modulo wrap for the address as long as the math is such that it will only wrap at most once per address calculation. This restriction may be maintained by the software. As there are four incrementers, we can implement two circular buffers with such an approach: {i4,s4,i5,s5} and {i6,s6,i7,s7}.

In a typical GPP architecture, the algorithm and math for addressing and managing the dataflow is quite a large part of the total computational load. The PE architectural features described above, together with compile time management of dataflow, greatly reduce the total computational load, and thus the power dissipation, for an application.

Instruction Format and Encoding

Figure 26:
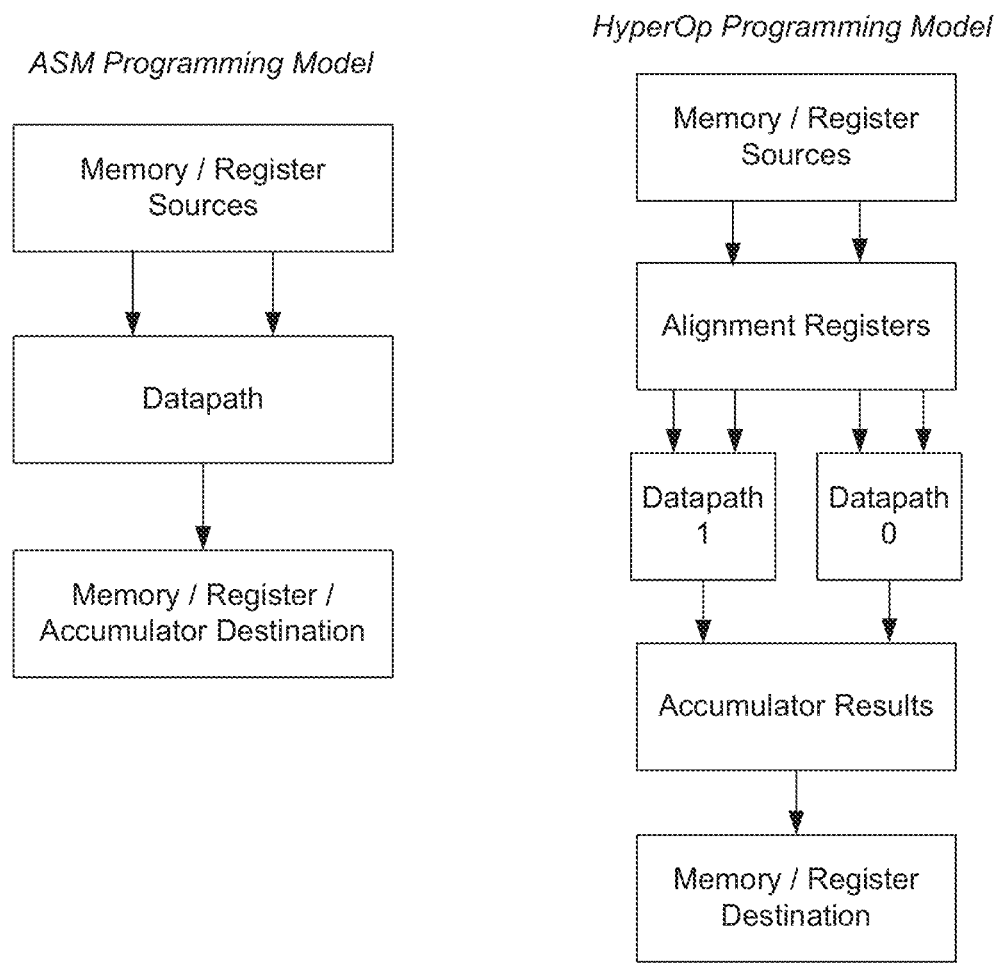
FIG. 26 shows two block diagrams illustrating a conventional programming model and a HyperOp programming model.

The instruction set of this architecture is broken down into two distinct subsets:
   64b conventional assembly instructions
   128b HyperOp instructions These two subsets have associated models for programming shown in FIG. 26. The conventional assembly mode (ASM) may be a single instruction stream mode encoded into fixed-length 64-bit instructions—typical of the state of the art. The ASM encoding may support several formats for different instruction types with the dominant form being a 3 operand (2 source, 1 destination) format with a single datapath operation. There is less parallelism supported in this mode than in the 128-bit HyperOp mode. However there may be particular instruction encodings for SIMD instructions that control operations on either two halves of a single pipeline or on two (or more) pipelines. There may also be encodings for a very limited set of instructions that will run quad datapath operations for performance and power optimizations.

An alternative instruction subset is the HyperOp mode. This is discussed in the following section. Instructions from the two encoding models may be mixed in a stream of instructions in whatever form and sequence that provides the best operation for a given algorithm, which may be determined by an optimizing compiler.

HyperOps

A set of instructions called HyperOPs control the dual/quad pipeline in a fine grained way for high flexibility. Instruction encoding style is somewhere between "traditional" assembly (ASM) style and very long instruction word (VLIW) style. This provides for:
   Isolated, independent control of both datapath pipes in the execution unit
   Isolated, independent control of location of source operands
   Isolated, independent control of location of result writeback Separate control of up to three of the AGUs per clock.

Control of the hardware repeat model

Control for predicated execution (more efficient than branching in many cases)

A wide range of pipelining and concurrent parallelism is possible to program with the improved dual/quad datapath illustrated. Independent control of datapath elements and decoupling of data (operand) fetches and result(s) writeback from datapath execution provides tremendous flexibility in operation, unlike the rigidness of a traditional SIMD machine. The HyperOp instructions provides for fine grained control of the data path pipelining and concurrent parallelism. Each pipe may run multiple operations per clock depending on the HyperOp used.

The basic motivation for HyperOps was from analyses of assembly code for a wide range of application software, with examples from RF waveform processing to MPEG image compression and encryption. Assembly (ASM) code often ran more efficiently than "C" code; but many cases arose where it was less than optimal and ran inefficiently. We are defining efficiency with respect to the number of PE cycles used to perform the mathematical operations involved in an algorithm. Inefficiencies arose where data streams had to be interpreted according to some hierarchical format, processed (such as with a 2D filter) and then re-packaged according to the same or another hierarchical format. In other cases the time it took to convert between variable types {short, integer, float, long} was excessive. In these cases, loops are often used to scan data stored in arrays of various dimensions and possibly variable sizes. Where loop address calculations are performed on the same hardware used to process the data then the address calculations induce loop delay (overhead).

In addition, the new dual/quad architecture provides more independently operating units and thus greater flexibility and greater opportunities for parallel operations or fast sequential operations contained in the pipeline(s). HyperOp instructions provide a way to control this hardware without limiting it to the ASM format. The notion of independent slots is borrowed from the very long instruction word (VLIW) encoding style used in the industry. In the VLIW style, certain fields within the instruction are designated "slots" to control particular functional units. The coding independence of the slots corresponds to the independence of the functional units. A VLIW style instruction might not have every functional unit doing something but programmers would generally want most slots doing something useful for most of the instructions in a program. This hybrid of ASM and VLIW encoding style allows:

Programmable datapath parallelism

Independent control of datapath elements

HyperOp instructions give finer grain control of the execute pipe operations, registers, and muxing such that instructions can be parallelized and accelerated in ways than cannot happen with standard encoding schemes. This provides for independent control of 3 AGUs and 2 Datapath execution units in the current implementation. The pipeline registers that are tied to the operands as they pass through a conventional pipeline using a conventional encoding method are exposed to the programmer in this mode. This allows tight loops with intermediate results that don't need to be stored to memory to run much more efficiently and allows for the decoupling of operand movement and alignment from the execution pipeline to provide greater flexibility in the pipeline optimization by the compiler. Error! Reference source not found. These registers are labeled X, Y, and Z on the PIPE portions of the diagram in FIG. 20.

These are always present and used for pipelining the hardware even with conventional instructions. However, in HyperOp mode they are directly controlled by the instruction encoding along with the muxing hardware shown in order to provide very fine-grained control of the dataflow for optimization of performance and power.

This could be extended easily to additional hardware with additional bits of encoding. FIG. 20 is merely one example PE architecture.

An example of the format of bit-fields for HyperOp instructions to control five execution units is shown in FIG. 27, illustrative for the general encoding of similar instruction sets. A few high numbered bits may signal special instruction formats that differ from that shown in FIG. 27. The first field (No. 127) is used to signal the PE that the instruction is either a 128-bit encoding for a multipart instruction or a 64-bit encoding for a single-part instruction. The "condExec" field is used to allow for conditional execution of certain fields of the instruction based on conditions that have been calculated and stored as state in the PE. The three "typ" fields are used in conjunction with the AGU fields as part of the control information. The two sets of fields for the address generation units (G0, G1, and G2) control the operations being performed on each of those units. The final (lowest bit numbered) two fields are each 20-bit fields to control the operation that is being performed on each of the two pipelined datapaths in the execution unit.

Note that independent control is possible for up to five execution units. Each unit is capable of performing 1 or more operations per clock in throughput. A typical HyperOp can control around 8 to 12 basic operations per clock. If all of the repeat hardware is also in use and we count the loads and stores of each 16-bit data word as an 'op', it is possible to get around 36 ops/clock using this HyperOps instruction format. With a 1.5 GHz clock and 256 PE design point this is almost 14TOPS (tera operations per second).

This is a highly efficient way to control instruction level parallelism and leave the scheduling and optimization of that parallelism in the domain of compilers and software development tools. This minimizes the hardware greatly over superscalar type schemes that, while they do require compiler optimizations to reach peak performance, also require much larger amounts of hardware and power at runtime to fully re-order and optimize the operands, operations, and results.

An example of parallel assembly language for a "FIR" filter might help illustrate how this works. This parallel assembly language example corresponds to the ANSI C code Example provided in Code Portion M. The "||" symbol separates operations that are to be done in parallel via a HyperOp encoded instruction.

```
// perform FIR filter on current sample data and produce
  sample out
    // %b1 points to structure com.com
    // %b2 points to the coefficient array filter
    // %d1 points to structure com.result
    // %i1 is index i
    { repeat1 $0, FILTER_LENGTH - 1, $4, %i1, ACC0 = 0;
      |A| ldi com.com, %b1; |B| ldi filter, %b2; |C| void;
      |D| void; |G| void; }
    { |A| ld64 0[%b1 + %i1], %AB; |B| void; |C| ld64 0[%b2 +
%i1], %C;
      |DP0| qmadd16 %AB, %C, %ACC0; |D| st32 %ACC0, %d1;
      |G| void; }
```

Code Portion P: Parallel Assembly Language Code for a FIR Filter Function Corresponding to Code Portion M in jANSI C Fetch/Flow Control The hardware also may comprise a fairly standard instruction fetch unit that keeps the pipeline fed with instructions via prefetch methods. There is flow control attached to this fetch unit and coupled into the instructions to provide efficient ways to deal with certain control conditions. These include:

Repeat hardware for acceleration of loops in a low overhead manner

Repeat buffering

Conditional execution (multi-level)

Instruction Fetch/Buffering

Figure 28:
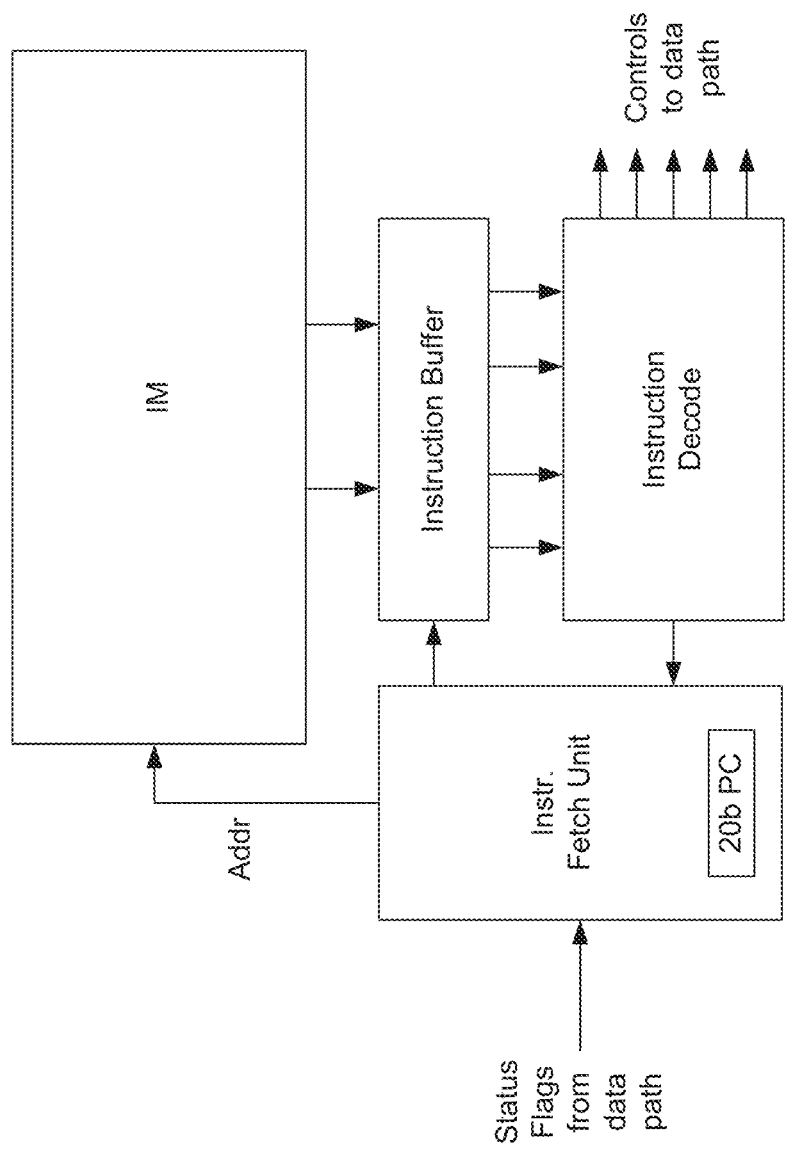
FIG. 28 is a block diagram illustrating one embodiment of an instruction fetch and decode unit.

An example of instruction fetch and decode unit is shown in FIG. 28. Instructions may be maintained in the instruction buffer in a FIFO manner, where the output contains the current instruction that leads the sequence of instructions stored.

As instructions are issued, the IFU computes a new instruction address and reads the instruction memory (IM), and the instruction is loaded in an instruction buffer. The IFU may process instructions that are a mixture of lengths, for example 64b and 128b. These are packed in the instruction memory with no padding. The first instruction word (IW) from the IM may contain a code for the length of the instruction. On startup, 128-bits of instruction are read. Then, following the issue of the instruction, the appropriate number of bits are read to replenish the words of the instruction that was issued.

Many instructions may be stored in the instruction buffer; a typical example would be 8 to 16. In this example, the instructions are maintained in sequence and not re-ordered. Dynamic re-ordering is done in some microprocessor architectures, but requires complex logic, and can dissipate considerable power.

When the current instruction is complete, it is "retired" and the next instruction is designated as the current one and so forth. Groups of instructions small enough to fit in the instruction buffer may be efficiently executed in a loop, and may not require any additional fetching until the loop is completed. The repeat hardware programming is used to detect these sequences and hold the appropriate instructions in the buffer. This provides highly power-efficient inner loops. The buffer and the repeat hardware support nesting up to 3 deep (or 3 dimensional loop execution). For the most efficient inner loop of a single instruction, this single instruction sits quiescent as the current instruction and simply drives the control to the decode in a static manner until the loop counts are satisfied. This is highly power-efficient for a programmable architecture.

During execution from the repeat buffer, the instruction memory may be put into a low power state to save power as fetching is not needed. The number of instructions in an innermost loop of a function is a big factor in execution time for each iteration of the loop, and thus inverse to function speed, throughput, and bandwidth. The purpose of the repeat buffer is to provide sufficient depth (8 or 16 instructions most probably) so that the most critical inner loops will fit in the buffer.

This hybrid architecture processes one instruction at a time per PE, and thus may be called scalar (not superscalar). However, the sub-instructions of the HyperOps are decoded independently and thus may maintain more than one thread of sub-instructions. An optimizing compiler tool may compile a user program into an instruction stream, and then optimize it by splitting it into multiple threads of sub-instructions to achieve greater parallelism. Subject to rules to avoid data hazards, individual sub-instructions may be moved ahead or behind in the instruction stream to optimize it. This limitation of locking the sub-instructions to issue in lockstep greatly reduces the complexity of the decoder, control, and fetch units, thus saving power dissipation.

Repeat

Repeat hardware is a mechanism to provide looping in hardware on tight inner-loops of real-time DSP algorithms that is more efficient than the typical test-and-branch methods of GPPs.

Repeat loop hardware provides:

preload of hardware for inner loops for zero overhead looping supports 3 levels of nesting, using primary index registers auto-increment of 4 secondary base/index registers The function of a repeat loop is shown by the following C-like code:

```
do {
    PC = TOP
    while (PC <= BOTTOM_NEW)
        execute instructions;
} while (CURRENT != END;
    CURRENT += STRIDE)
```

Code Portion Q: Repeat Loop Pseudocode.

The hardware registers for implementing such an operation are shown in Table 1. Some of these have been discussed previously in the discussion of address calculations. Because the index values being used for the repeat loops are often used to calculate addresses into the arrays of data being processed these registers are accessable by the AGUs.

TABLE 1 repeat registers.

| HW Loop Registers | Notes |
|---|---|
| ids_start_<> | Starting index |
| ids_current_<> | Current index |
| ids_end_<> | Ending index |
| ids_stride_<> | Stride for incrementing index |
| ids_top_<> | Address of top of loop |
| ids_bottom_<> | Address of bottom of loop |

In both 64-bit and 128-bit encodings, there may be special instructions to load all of these necessary registers in a single clock and optionally start the repeat hardware. One innovation here over previous generations is the inclusion of a way to load the repeat hardware and prepare it to start once the TOP address of the loop is reached. This provides for 3 deep loops where the two most inner loops are loaded prior to starting the outer loop. In this way there is no fetch of the repeat instruction for the inner loops and thus they become zero overhead loops in terms of cycle count.

With this hardware it is possible to implement a 3-deep nesting on a set of instructions where the entire loop executes with just the clocks required for the instructions. No cycle overhead for loop counters, increments, compares, branches, address calculations, etc. is required. This frees the datapath hardware to concentrate on the arithmetic part of the algorithm.

FIG. 29

Figure 29:
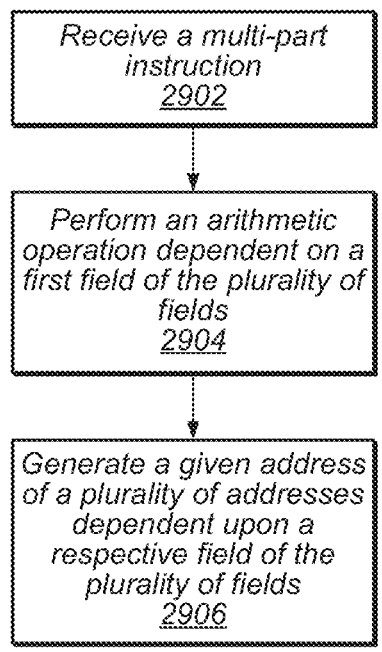
FIG. 29 is a flowchart diagram illustrating a first embodiment of receiving and executing a multi-part instruction.

FIG. 29 is a flowchart diagram illustrating a first embodiment of receiving and executing a multi-part instruction.

The method may operate in a multi-processor apparatus comprising a fetch unit and a plurality of address generator units. The fetch unit may be configured to receive a multi-part instruction, wherein the multi-part instruction includes a plurality of fields. The plurality of address generator units may comprise a first address generator unit configured to perform an arithmetic operation dependent upon a first field of the plurality of fields. The plurality of address generator units may also comprise a second address generator unit configured to generate at least one address of a plurality of addresses, wherein each address of the plurality of addresses is dependent upon a respective field of the plurality of fields. The multi-processor apparatus may further comprise a store unit configured to store first data dependent upon a first address of the plurality of addresses. Further, the fetch unit may be configured to fetch second data dependent upon a second address of the plurality of addresses. The multi-processor apparatus may further comprise a third address generator unit configured to generate at least another address of the plurality of addresses. Further, each field of a subset of the plurality of fields may encode an operation to be performed by a respective address generator unit of the plurality of address generator units.

The method for receiving and executing a multi-part instruction may operate as follows.

First at 2902 the processor may receive a multi-part instruction, wherein the multi-part instruction includes a plurality of fields. At 2904 the processor may then perform an arithmetic operation dependent on a first field of the plurality of fields. At 2906 the processor may further generate a given address of a plurality of addresses dependent upon a respective field of the plurality of fields.

In additional embodiments, the method may further comprise storing first data dependent upon a first address of the plurality of addresses. The method may also further comprise fetching second data dependent upon a second address of the plurality of addresses. In one embodiment, the processor includes a plurality of address generator units, and performing the arithmetic operation comprises performing the arithmetic operation using at least one address generator unit of the plurality of address generator units. Further, in one embodiment each field of a subset of the plurality of fields may encode an operation to be performed by a respective address generator unit of the plurality of address generators units.

The method of FIG. 29 may operate in a system comprising a plurality of processors and a plurality of dynamically configurable communication elements, which may be, for example, Data Memory Routers (DMRs), wherein the plurality of processors and the plurality of dynamically configurable communication elements may be coupled together in an interspersed arrangement. A given processor of the plurality of processors may be configured to: 1) receive a multi-part instruction, wherein the multi-part instruction includes a plurality of fields; 2) perform an arithmetic operation dependent upon a given field of the plurality of fields; and 3) generate a plurality of addresses dependent upon a subset of the plurality of fields. Each processor of the plurality of processors may further be configured to store first data dependent upon a first address of the plurality of addresses. Further, the given processor of the plurality of processors may be further configured to fetch second data dependent upon a second address of the plurality of addresses.

In addition, the given processor of the plurality of processors may include a plurality of address generator units, and each field of a subset of the plurality of fields may encode an operation to be performed by a respective address generator unit of the plurality of address generator units.

FIG. 30

Figure 30:
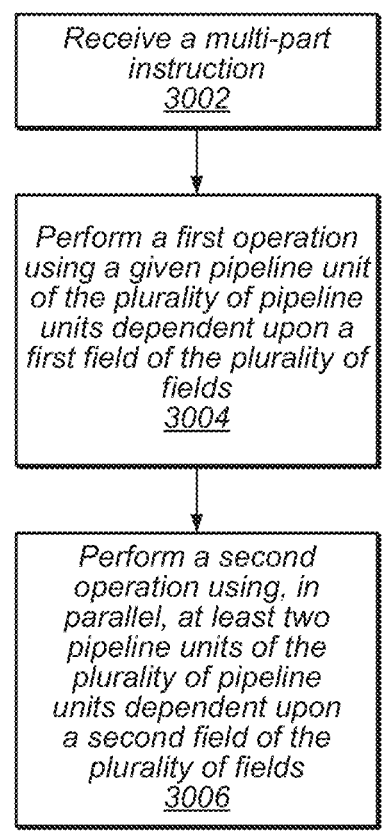
FIG. 30 is a flowchart diagram illustrating a first embodiment of receiving and executing a multi-part instruction.

FIG. 30 is a flowchart diagram illustrating a first embodiment of receiving and executing a multi-part instruction.

The method may operate in a multi-processor apparatus comprising a fetch unit and an execution unit. The fetch unit may be configured to receive a multi-part instruction, wherein the multi-part instruction includes a plurality of data fields. The execution unit may include a plurality of pipeline units and may be configured to: 1) perform a first operation using a given pipeline unit of the plurality of pipeline units dependent upon a first field of the plurality of fields; and 2) perform a second operation using, in parallel, at least two pipeline units of the plurality of pipeline units dependent upon a second field of the plurality of fields. Each pipeline unit of the plurality of pipeline units may include a plurality of multiplier units and a plurality of adder units. Each pipeline unit of the plurality of pipeline units may also include a compressor unit configured to compress a first number of partial products into a second number of partial products. The compressor unit of a first pipeline unit of the plurality of pipeline units may be configured to receive at least one partial product from the compressor unit of a second pipeline unit of the plurality of pipeline units. Also, each field of a subset of the plurality of fields may encode an operation to be performed by a respective pipeline unit of the plurality of pipeline units.

The method for receiving and executing a multi-part instruction may operate as follows. At 3002 the processor may receive a multi-part instruction, wherein the multi-part instruction includes a plurality of fields. At 3004 the processor may then perform performing a first operation using a given pipeline unit of the plurality of pipeline units dependent upon a first field of the plurality of fields. At 3006 the processor may perform a second operation using, in parallel, at least two pipeline units of the plurality of pipeline units dependent upon a second field of the plurality of fields.

In one embodiment, each field of a subset of the plurality of fields encodes an operation to be performed by a respective pipeline unit of the plurality of pipeline units.

Performing the second operation may comprise generating by a first pipeline unit of the at least two pipeline units of the plurality of pipeline units a first set of partial products, and generating by a second pipeline unit of the at least two pipeline units of the plurality of pipeline units a second set of partial products dependent upon at least one partial product of the first set of partial products.

Generation, by the first pipeline unit of the at least two pipeline units of the plurality of pipeline units, the first set of partial products may comprise compressing a first number of partial products to a second number of partial products, wherein the second number is less than the first number. Each pipeline unit of the plurality of pipeline units may include a plurality of multiplier units and a plurality of adder units.

The method of FIG. 30 may operate in a system comprising a plurality of processors and a plurality of dynamically configurable communication elements, e.g., DMRs. Each processor of the plurality of processors may include a plurality of pipeline units. The plurality of processors and the plurality of dynamically configurable communication elements may be coupled together in an interspersed arrangement. Each processor of the plurality of processors may be configured to: 1) receive a multi-part instruction, wherein the multi-part instruction includes a plurality of fields; 2) perform a first operation using a given pipeline unit of the plurality of pipeline units dependent upon a first field of the plurality of fields; and 3) perform a second operation using, in parallel, at least two pipeline units of the plurality of pipeline units dependent upon a second field of the plurality of fields.

Each pipeline unit of the plurality of pipeline units of each processor may include a plurality of multiplier units and a plurality of adder units. Each pipeline unit of the plurality of pipeline units of each processor of the plurality of processors may further include a compressor unit configured to compress a first number of partial products into a second number of partial products. At least one of the compressor units of a first pipeline unit of a respective processor may be further configured to receive at least one partial product from another compressor unit of a second pipeline of the respective processor.

In one embodiment, each field of a subset of the plurality of fields encodes an operation to be performed by a respective pipeline unit of the plurality of pipeline units.

FIG. 31

Figure 31:
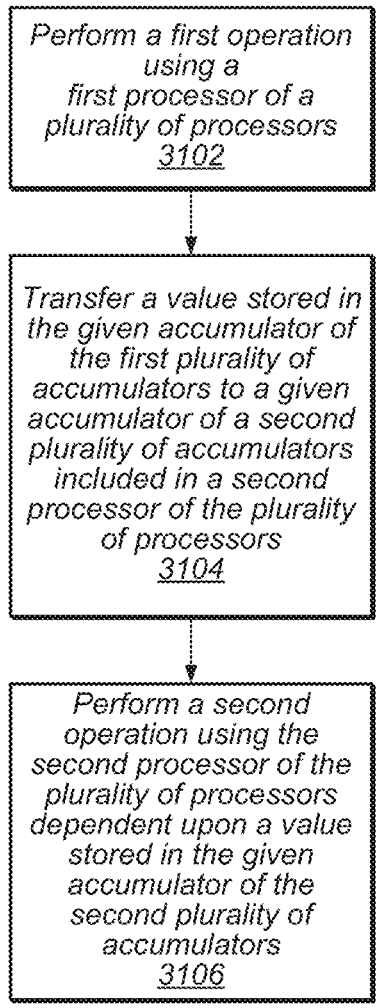
FIG. 31 is a flowchart diagram illustrating one embodiment of performing an operation by a processor.

FIG. 31 is a flowchart diagram illustrating one embodiment of performing an operation by a processor.

The method may operate in a multi-processor apparatus comprising a fetch unit configured to receive an instruction and an execution unit including a plurality of pipeline units. Each pipeline unit may include an accumulator unit. The execution unit may be configured to: 1) perform, using a first pipeline unit of the plurality of pipeline units, a first operation dependent upon the received instruction to generate a result; 2) store the result in the accumulator unit of the first pipeline unit of the plurality of pipeline units; and 3) transfer the result stored in the accumulator unit of the first pipeline unit of the plurality of pipeline units to an accumulator unit of a processor. Each pipeline unit of the plurality of pipeline units may include a plurality of multiplier units and a plurality of adder units.

As one example, the first operation may comprise a multiplication operation, and in order to store the result in the accumulator unit of the first pipeline unit, the execution unit may be further configured to store at least one partial product of the multiplication operation in the first pipeline unit.

In one embodiment the instruction may include a plurality of fields, and in order to perform, using the first pipeline unit, the first operation dependent upon the received instruction, the execution unit may be further configured to perform, using the first pipeline unit, the first operation dependent upon a first field of the plurality of fields.

The execution unit may be further configured to perform a second operation using, in parallel, at least two pipeline units of the plurality of pipeline units dependent upon a second field of the plurality of fields.

The method for performing an operation may operate as follows.

At 3102 the method may comprise performing a first operation using a first processor of a plurality of processors. The first processor may include a first plurality of accumulators, and performing the first operation may comprise storing a value in a given accumulator of the first plurality of accumulators.

At 3104 the method may comprise transferring a value stored in the given accumulator of the first plurality of accumulators to a given accumulator of a second plurality of accumulators included in a second processor of the plurality of processors.

At 3106 the method may comprise performing a second operation using the second processor of the plurality of processors dependent upon a value stored in the given accumulator of the second plurality of accumulators.

In one embodiment, the method may further comprise receiving, by the first processor, a first multi-part instruction, wherein the first multi-part instruction includes a first plurality of fields. Performing the first operation using the first processor may comprise performing the first operation using the first processor of the plurality of processors dependent upon a first field of the first plurality of fields.

The method may further comprise receiving, by the second processor of the plurality of processors, a second multi-part instruction, wherein the second multi-part instruction includes a second plurality of fields.

Performing the second operation using the second processor dependent upon the value stored in the given accumulator may comprise performing the second operation using the second processor dependent upon a first field of the second plurality of fields.

The method of FIG. 31 may operate in a system comprising a plurality of processors and a plurality of dynamically configurable communication elements, e.g. DMRs. Each processor of the plurality of processors may comprise a plurality of accumulator units. The plurality of processors and the plurality of dynamically configurable communication elements may be coupled together in an interspersed arrangement. A first processor may be configured to: 1) receive a first instruction; 2) perform a first operation dependent upon the first instruction to generate a result; 3) store the result in a given accumulator unit of the plurality of accumulator units of the first processor; and 4) transfer the result stored in the given accumulator unit of the plurality of accumulator units of the first processor to a given accumulator unit of the plurality of accumulator units of a second processor of the plurality of processors.

The second processor of the plurality of processors may be configured to: 1) receive a second instruction; and 2) perform a second operation dependent upon the second instruction and a value stored in the given accumulator unit of the plurality of accumulator units of the second processor of the plurality of processors.

The first instruction may comprise a first multi-part instruction, wherein the first multi-part instruction includes a first plurality of fields, and wherein the second instruction comprises a second multi-part instruction, wherein the second multi-part instruction includes a second plurality of fields. To perform the first operation dependent upon the first instruction, the first processor may be further configured to perform the first operation dependent upon a first field of the first plurality of fields. To perform the second operation dependent upon the second instruction and the value stored in the given accumulator unit, the second processor may be further configured to perform the second operation dependent upon a first field of the second plurality of fields.

FIG. 32

Figure 32:
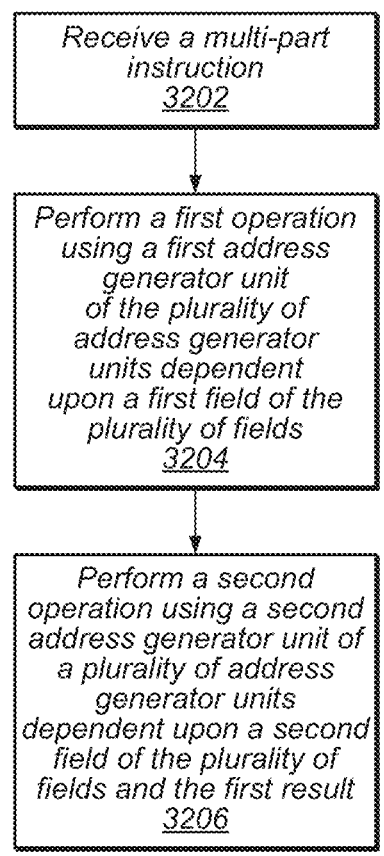
FIG. 32 is a flowchart diagram illustrating one embodiment of performing an operation by a processor.

FIG. 32 is a flowchart diagram illustrating one embodiment of performing an operation by a processor.

The method may operate in a multi-processor apparatus comprising a fetch unit, a plurality of address generator units, and a plurality of buffers. The fetch unit may be configured to receive a multi-part instruction, wherein the multi-part instruction includes a plurality of fields. A first address generator unit of the plurality of address generator units may be configured to perform a first operation dependent upon a first field to generate a first result. In addition, a second address generator unit of the plurality of address generator units may be configured to perform a second operation dependent upon a second field of the plurality of fields and the first result.

In one embodiment, a first buffer is configured to store a first stride value dependent upon at least one field of the plurality of fields, and a second buffer is configured to store a second stride value dependent upon at least another field of the plurality of fields.

To perform the first operation dependent upon the first field of the plurality of fields, the first address generator unit may be further configured to perform the first operation dependent upon the first stride value.

The method for performing an operation may operate as follows. The method may operate in a processor comprising a plurality of address generator units and a plurality of buffers.

At 3002 the method may receive a multi-part instruction, wherein the multi-part instruction includes a plurality of fields. At 3004 the method may perform a first operation using a first address generator unit dependent upon a first field of the plurality of fields. At 3006 the method may perform a second operation using a second address generator unit dependent upon a second field of the plurality of fields and the first result.

The method may further comprise storing a first stride value in a first buffer in the plurality of buffers and storing a second stride value in a second buffer of the plurality of buffers.

Performing the first operation using the first address generator unit dependent upon the first field may comprise performing the first operation dependent upon the first stride value.

The method may operate in a system comprising a plurality of processors and a plurality of dynamically configurable communication elements, e.g. DMRs. The plurality of processors and the plurality of dynamically configurable communication elements may be coupled together in an interspersed arrangement. A given processor of the plurality of processors may be configured to: 1) receive a multi-part instruction, wherein the multi-part instruction includes a plurality of fields; 2) perform a first operation using a first address generator of the plurality of generators dependent upon a first field of the plurality of fields to generate a first result; and 3) perform a second operation using a second address generator of the plurality of generators dependent upon a second field of the plurality of fields and the first result.

In one embodiment, each processor of the plurality of processors includes a plurality of buffers. The given processor may be further configured to store a respective first stride value in a first buffer of the plurality of buffers of the given processor. The given processor may be further configured to store a respective second stride value in a second buffer of the plurality of buffers of the given processor.

To perform the first operation using the first address generator dependent upon a first field, the given processor may be further configured to perform the first operation dependent upon the respective first stride value.

FIG. 33

Figure 33:
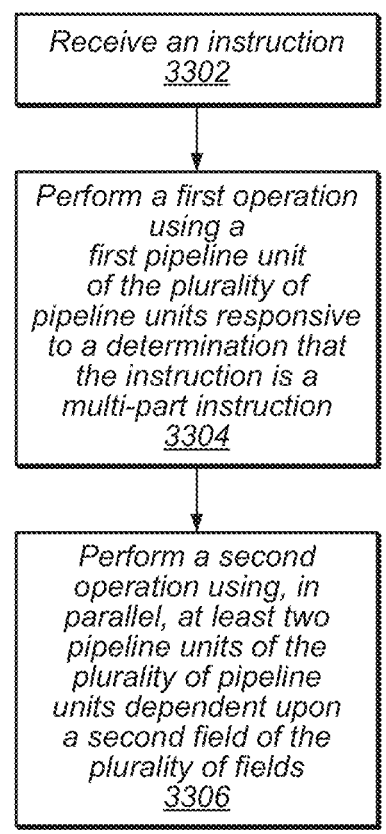
FIG. 33 is a flowchart diagram illustrating one embodiment of operating a processor.

FIG. 33 is a flowchart diagram illustrating one embodiment of operating a processor.

The method may operate in a multi-processor apparatus comprising a fetch unit, an execution unit, and a plurality of address generator units. The fetch unit may be configured to receive an instruction. The execution unit may comprise a plurality of pipeline units. The execution unit may be configured to: 1) perform a first operation using a first pipeline unit of the plurality of pipeline units responsive to a determination that the instruction is a multi-part instruction, wherein the multi-part instruction includes a plurality of fields, wherein the first operation is dependent on a first field of the plurality of fields; and 2) perform a second operation using, in parallel, at least two pipeline units of the plurality of pipeline units dependent upon a second field of the plurality of fields.

The execution unit may be further configured to perform a third operation using the first pipeline unit responsive to a determination that the instruction is a single-part instruction. To perform the third operation using the first pipeline unit of the plurality of pipeline units responsive to the determination that the determination that the instruction is a single-part instruction, the execution unit may be further configured to perform a fourth operation using the second pipeline unit of the plurality of pipeline units dependent upon a previously received multi-part instruction. A first address generator may be configured to perform an arithmetic operation dependent upon a second field of the plurality of fields.

The method for operating a processor may operate as follows. The method may operate in a processor comprising a plurality of pipeline units.

At 3302 the method may receive an instruction.

At 3304 the method may perform a first operation using a first pipeline unit responsive to a determination that the instruction is a multi-part instruction. The multi-part instruction may include a plurality of fields, wherein the first operation is dependent upon a first field of the plurality of fields.

At 3306 the method may perform a second operation using, in parallel, at least two pipeline units of the plurality of pipeline units dependent upon a second field of the plurality of fields.

The method may further perform a third operation using the first pipeline unit responsive to a determination that the instruction is a single-part instruction. Performing the third operation using the first pipeline unit may comprise performing a fourth operation using the second pipeline unit of the plurality of pipeline units dependent upon a previously received multi-part instruction.

The method may further comprise fetching a first address responsive to the determination that the instruction is a single-part instruction. The method may also comprise generating a plurality of addresses dependent upon a subset of the plurality of fields.

The method may operate in a system comprising a plurality of processors and a plurality of dynamically configurable communication elements, e.g. DMRs. The plurality of processors and the plurality of dynamically configurable communication elements may be coupled together in an interspersed arrangement. Each processor of the plurality of processors may comprise a plurality of pipeline units. Each processor may be configured to: 1) receive an instruction; 2) perform a first operation using a first pipeline unit of the plurality of pipeline units responsive to a determination that the instruction is a multi-part instruction, wherein the multi-part instruction includes a plurality of fields, wherein the first operation is dependent on a first field of the plurality of fields; and 3) perform a second operation using, in parallel, at least two pipeline units of the plurality of pipeline units dependent upon a second field of the plurality of fields.

Each processor may be further configured to perform a third operation using the first pipeline unit responsive to a determination that the instruction is a single-part instruction. To perform the third operation using the first pipeline unit responsive to the determination that the determination that the instruction is a single-part instruction, each processor may be further configured to perform a fourth operation using the second pipeline unit dependent upon a previously received multi-part instruction.

In one embodiment, each processor is further configured to generate a plurality of addresses dependent upon a subset of the plurality of fields. Each processor may be further configured to store first data dependent upon a first address of the plurality of addresses.

FIG. 34

Figure 34:
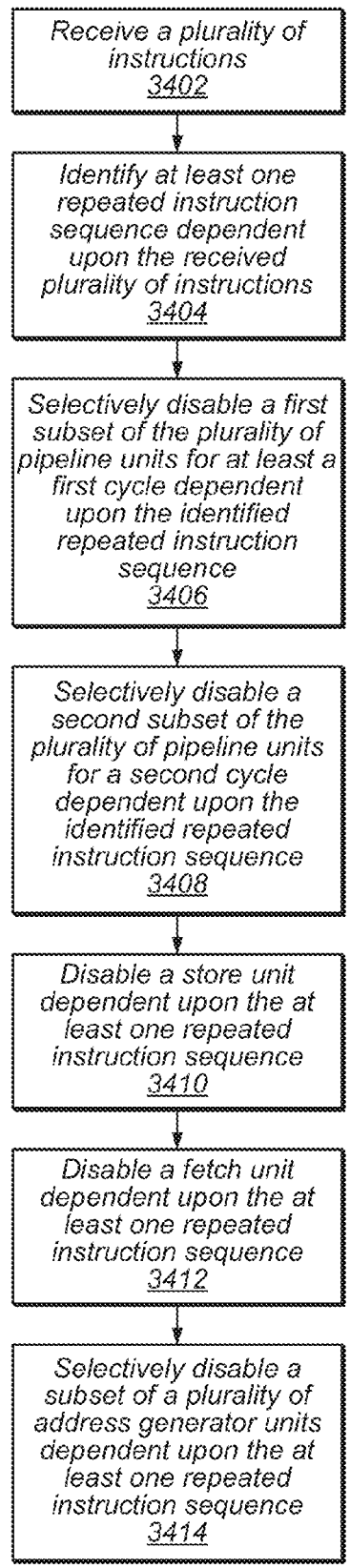
FIG. 34 is a flowchart diagram illustrating a first embodiment of operating a processor having a plurality of pipeline units.

FIG. 34 is a flowchart diagram illustrating a first embodiment of operating a processor having a plurality of pipeline units.

The method may operate in an apparatus comprising a fetch unit and an execution unit. The fetch unit may be configured to receive a plurality of instructions, and to identify at least one repeated instruction sequence dependent upon the received plurality of instructions. The at least one repeated instruction sequence may include at least one instruction of the plurality of instructions. The execution unit may include a plurality of pipeline units, and may be configured to selectively disable a first subset of the plurality of pipeline units for at least a first cycle dependent upon the identified repeated instruction sequence. The execution unit may be further configured to selectively disable a second subset of the plurality of pipeline units for a second cycle dependent upon the identified repeated instruction sequence. For example, the disabling may comprise placing a subset of the plurality of pipeline units in a low power mode. The apparatus may further comprise a plurality of address generator units, a fetch unit, and a store unit. The store unit may be configured to enter a low power mode dependent upon the at least one repeated instruction sequence. The fetch unit may be configured to enter a low power mode dependent upon the at least one repeated instruction sequence. At least one of the plurality of address generator units may be configured to enter a low power mode dependent upon the at least one repeated instruction sequence.

The method for operating a processor may operate as follows.

First at 3402 the processor may receive a plurality of instructions. At 3404, the processor may then identify at least one repeated instruction sequence dependent upon the received plurality of instructions, wherein the at least one repeated instruction sequence includes at least one instruction. At 3406, the processor may selectively disable a first subset of the plurality of pipeline units for at least a first cycle dependent upon the identified repeated instruction sequence. At 3408, the processor may selectively disable a second subset of the plurality of pipeline units for a second cycle dependent upon the identified repeated instruction sequence.

At 3410, the processor may disable the store unit dependent upon the at least one repeated instruction sequence. At 3412, the processor may alternatively, or additionally, disable the fetch unit dependent upon the at least one repeated instruction sequence. At 3414, the processor may alternatively, or additionally, selectively disable a subset of the plurality of addresses generator units dependent upon the at least one repeated instruction sequence.

The method of FIG. 34 may operate in a system comprising a plurality of processors and a plurality of dynamically configurable communication elements, wherein the plurality of processors and the plurality of dynamically configurable communication elements may be coupled together in an interspersed arrangement. Each processor of the plurality of processors may include a plurality of pipeline units, and may be configured to: 1) receive a plurality of instructions; 2) identify at least one repeated instruction sequence dependent upon the received plurality of instructions, wherein the at least one repeated instruction sequence includes at least one instruction of the plurality of instructions; 3) selectively disable a first subset of the plurality of pipeline units for at least a first cycle dependent upon the identified repeated instruction sequence; and 4) selectively disable a second subset of the plurality of pipeline units for a second cycle dependent upon the identified repeated instruction sequence. In additional embodiments, each processor of the plurality of processors may include a plurality of address generator units, a fetch unit, and a store unit. One or more of the store unit, the fetch unit, and at least one of the plurality of address generator units may be configured to enter a low power mode dependent upon the at least one repeated instruction sequence.

The following numbered paragraphs describe additional embodiments:

Controlling Multiple Datapaths

1. An apparatus, comprising: a fetch unit configured to receive a multi-part instruction, wherein the multi-part instruction includes a plurality of data fields; and an execution unit including a plurality of pipeline units, wherein the execution unit is configured to: perform a first operation using a given pipeline unit of the plurality of pipeline units dependent upon a first field of the plurality of fields; and perform a second operation using, in parallel, at least two pipeline units of the plurality of pipeline units dependent upon a second field of the plurality of fields.

2. The apparatus of claim 1, wherein each pipeline unit of the plurality of pipeline units includes a plurality of multiplier units and a plurality of adder units.

3. The apparatus of claim 1, wherein each pipeline unit of the plurality of pipeline units includes a compressor unit configured to compress a first number of partial products into a second number of partial products.

4. The apparatus of claim 4, wherein the compressor unit of a first pipeline unit of the plurality of pipeline units is configured to receive at least one partial product from the compressor unit of a second pipeline unit of the plurality of pipeline units.

5. The apparatus of claim 1, wherein each field of a subset of the plurality of fields encodes an operation to be performed by a respective pipeline unit of the plurality of pipeline units.

6. A method for operating a processor, wherein the processor includes a plurality of pipeline units, the method comprising: receiving a multi-part instruction, wherein the multi-part instruction includes a plurality of fields; performing a first operation using a given pipeline unit of the plurality of pipeline units dependent upon a first field of the plurality of fields; and performing a second operation using, in parallel, at least two pipeline units of the plurality of pipeline units dependent upon a second field of the plurality of fields.

7. The method of claim 6, wherein each field of a subset of the plurality of fields encodes an operation to be performed by a respective pipeline unit of the plurality of pipeline units.

8. The method of claim 6, wherein performing the second operation comprises generating by a first pipeline unit of the at least two pipeline units of the plurality of pipeline units a first set of partial products, and generating by a second pipeline unit of the at least two pipeline units of the plurality of pipeline units a second set of partial products dependent upon at least one partial product of the first set of partial products.

9. The method of claim 8, wherein generating, by the first pipeline unit of the at least two pipeline units of the plurality of pipeline units, the first set of partial products comprises compressing a first number of partial products to a second number of partial products, wherein the second number is less than the first number.

10. The method of claim 6, wherein each pipeline unit of the plurality of pipeline units includes a plurality of multiplier units and a plurality of adder units.

11. A system, comprising: a plurality of processors, wherein each processor of the plurality of processors includes a plurality of pipeline units; and a plurality of dynamically configurable communication elements; wherein the plurality of processors and the plurality of dynamically configurable communication elements are coupled together in an interspersed arrangement; wherein each processor of the plurality of processors is configured to: receive a multi-part instruction, wherein the multi-part instruction includes a plurality of fields; perform a first operation using a given pipeline unit of the plurality of pipeline units dependent upon a first field of the plurality of fields; and perform a second operation using, in parallel, at least two pipeline units of the plurality of pipeline units dependent upon a second field of the plurality of fields.

12. The system of claim 11, wherein each pipeline unit of the plurality of pipeline units of each processor includes a plurality of multiplier units and a plurality of adder units.

13. The system of claim 11, wherein each pipeline unit of the plurality of pipeline units of each processor of the plurality of processors includes a compressor unit configured to compress a first number of partial products into a second number of partial products.

14. The system of claim 13, wherein a compressor unit of a first pipeline unit of the plurality of pipeline units of a given processor of the plurality of processors is further configured to receive at least one partial product from another compressor unit of a second pipeline unit of the plurality of pipeline units of the given processor of the plurality of processors.

15. The system of claim 11, wherein each field of a subset of the plurality of fields encodes an operation to be performed by a respective pipeline unit of the plurality of pipeline units.

Accumulate Forwarding

1. An apparatus, comprising: a fetch unit configured to receive an instruction; an execution unit including a plurality of pipeline units, wherein each pipeline unit of the plurality of pipeline units includes an accumulator unit, wherein the execution unit is configured to: perform, using a first pipeline unit of the plurality of pipeline units, a first operation dependent upon the received instruction to generate a result; store the result in the accumulator unit of the first pipeline unit of the plurality of pipeline units; and transfer the result stored in the accumulator unit of the first pipeline unit of the plurality of pipeline units to an accumulator unit of a processor.

2. The apparatus of claim 1, wherein each pipeline unit of the plurality of pipeline units includes a plurality of multiplier units and a plurality of adder units.

3. The apparatus of claim 1, wherein the first operation comprises a multiplication operation, and wherein to store the result in the accumulator unit of the first pipeline unit of the plurality of pipeline units, the execution unit is further configured to store at least one partial product of the multiplication operation in the first pipeline unit of the plurality of pipeline units.

4. The apparatus of claim 1, wherein the instruction includes a plurality of fields, and wherein to perform, using the first pipeline unit of the plurality of pipeline units, the first operation dependent upon the received instruction, the execution unit is further configured to perform, using the first pipeline unit of the plurality of pipeline units, the first operation dependent upon a first field of the plurality of fields.

5. The apparatus of claim 5, wherein the execution unit is further configured to perform a second operation using, in parallel, at least two pipeline units of the plurality of pipeline units dependent upon a second field of the plurality of fields.

6. A method for operating a plurality of processors, the method comprising: performing a first operation using a first processor of a plurality of processors, wherein the first processor includes a first plurality of accumulators, and wherein performing the first operation includes storing a value in a given accumulator of the first plurality of accumulators; transferring a value stored in the given accumulator of the first plurality of accumulators to a given accumulator of a second plurality of accumulators included in a second processor of the plurality of processors; and performing a second operation using the second processor of the plurality of processors dependent upon a value stored in the given accumulator of the second plurality of accumulators.

7. The method of claim 6, further comprising receiving, by the first processor, a first multi-part instruction, wherein the first multi-part instruction includes a first plurality of fields.

8. The method of claim 7, wherein performing the first operation using the first processor of the plurality of processors comprises performing the first operation using the first processor of the plurality of processors dependent upon a first field of the first plurality of fields.

9. The method of claim 8, further comprising receiving, by the second processor of the plurality of processors, a second multi-part instruction, wherein the second multi-part instruction includes a second plurality of fields.

10. The method of claim 9, wherein performing the second operation using the second processor of the plurality of processors dependent upon the value stored in the given accumulator of the second plurality of accumulators comprises performing the second operation using the second processor of the plurality of processors dependent upon a first field of the second plurality of fields.

11. A system, comprising: a plurality of processors, wherein each processor of the plurality of processors includes a plurality of accumulator units; and a plurality of dynamically configurable communication elements; wherein the plurality of processors and the plurality of dynamically configurable communication elements are coupled together in an interspersed arrangement; wherein a first processor of the plurality of processors is configured to: receive a first instruction; perform a first operation dependent upon the first instruction to generate a result; store the result in a given accumulator unit of the plurality of accumulator units of the first processor; and transfer the result stored in the given accumulator unit of the plurality of accumulator units of the first processor to a given accumulator unit of the plurality of accumulator units of a second processor of the plurality of processors.

12. The system of claim 11, wherein the second processor of the plurality of processors is configured to: receive a second instruction; and perform a second operation dependent upon the second instruction and a value stored in the given accumulator unit of the plurality of accumulator units of the second processor of the plurality of processors.

13. The system of claim 12, wherein the first instruction comprises a first multi-part instruction, wherein the first multi-part instruction includes a first plurality of fields, and wherein the second instruction comprises a second multi-part instruction, wherein the second multi-part instruction includes a second plurality of fields.

14. The system of claim 13, wherein to perform the first operation dependent upon the first instruction, the first processor of the plurality of processors is further configured to perform the first operation dependent upon a first field of the first plurality of fields.

15. The system of claim 13, wherein to perform the second operation dependent upon the second instruction and the value stored in the given accumulator unit, the second processor of the plurality of processors is further configured to perform the second operation dependent upon a first field of the second plurality of fields.

AGU Coupling (Circular Addressing)

1. An apparatus, comprising: a fetch unit configured to receive a multi-part instruction, wherein the multi-part instruction includes a plurality of fields; and a plurality of address generator units; wherein a first address generator unit of the plurality of address generator units is configured to perform a first operation dependent upon a first field of the plurality of fields to generate a first result; and wherein a second address generator unit of the plurality of address generator units is configured to perform a second operation dependent upon a second field of the plurality of fields and the first result.

2. The apparatus of claim 1, further comprising a plurality of buffers.

3. The apparatus of claim 2, wherein a first buffer of the plurality of buffers is configured to store a first stride value dependent upon at least one field of the plurality of fields.

4. The apparatus of claim 3, wherein a second buffer of the plurality of buffers is configured to store a second stride value dependent upon at least another field of the plurality of fields.

5. The apparatus of claim 3, wherein to perform the first operation dependent upon the first field of the plurality of fields, the first address generator unit of the plurality of address generator units is further configured to perform the first operation dependent upon the first stride value.

6. A method for operating a processor, wherein the processor includes a plurality of address generator units, the method comprising: receiving a multi-part instruction, wherein the multi-part instruction includes a plurality of fields; performing a first operation using a first address generator unit of the plurality of address generator units dependent upon a first field of the plurality of fields; and performing a second operation using a second address generator unit of a plurality of address generator units dependent upon a second field of the plurality of fields and the first result.

7. The method of claim 6, wherein the processor further includes a plurality of buffers.

8. The method of claim 7, further comprising storing a first stride value in a first buffer in the plurality of buffers.

9. The method of claim 8, further comprising storing a second stride value in a second buffer of the plurality of buffers.

10. The method of claim 7, wherein performing the first operation using the first address generator unit of the plurality of address generator units dependent upon the first field of the plurality of fields comprises performing the first operation dependent upon the first stride value.

11. A system, comprising: a plurality of processors; and a plurality of dynamically configurable communication elements; wherein the plurality of processors and the plurality of dynamically configurable communication elements are coupled together in an interspersed arrangement; wherein a given processor of the plurality of processors is configured to: receive a multi-part instruction, wherein the multi-part instruction includes a plurality of fields; perform a first operation using a first address generator of the plurality of generators dependent upon a first field of the plurality of fields to generate a first result; and perform a second operation using a second address generator of the plurality of generators dependent upon a second field of the plurality of fields and the first result.

12. The system of claim 11, wherein each processor of the plurality of processors includes a plurality of buffers.

13. The system of claim 12, wherein the given processor of the plurality of processors is further configured to store a respective first stride value in a first buffer of the plurality of buffers of the given processor.

14. The system of claim 13, wherein the given processor of the plurality of processors is further configured to store a respective second stride value in a second buffer of the plurality of buffers of the given processor.

15. The system of claim 13, wherein to perform the first operation using the first address generator of the plurality of generators dependent upon a first field of the plurality of fields, the given processor of the plurality of processors is further configured to perform the first operation dependent upon the respective first stride value.

Receiving Instructions with Single-Part/Multi-Part Determination

1. An apparatus, comprising: a fetch unit configured to receive an instruction; an execution unit including a plurality of pipeline units, wherein the execution unit is configured to: perform a first operation using a first pipeline unit of the plurality of pipeline units responsive to a determination that the instruction is a multi-part instruction, wherein the multi-part instruction includes a plurality of fields, wherein the first operation is dependent on a first field of the plurality of fields; and perform a second operation using, in parallel, at least two pipeline units of the plurality of pipeline units dependent upon a second field of the plurality of fields.

2. The apparatus of claim 1, wherein the execution unit is further configured to perform a third operation using the first pipeline unit of the plurality of pipeline units responsive to a determination that the instruction is a single-part instruction.

3. The apparatus of claim 2, wherein to perform the third operation using the first pipeline unit of the plurality of pipeline units responsive to the determination that the determination that the instruction is a single-part instruction, the execution unit is further configured to perform a fourth operation using the second pipeline unit of the plurality of pipeline units dependent upon a previously received multi-part instruction.

4. The apparatus of claim 1, further comprising a plurality of address generator units.

5. The apparatus of claim 4, wherein a first address generator of the plurality of address generators is configured to perform an arithmetic operation dependent upon a second field of the plurality of fields.

6. A method for operating a processor, wherein the processor includes a plurality of pipeline units, the method comprising: receiving an instruction; performing a first operation using a first pipeline unit of the plurality of pipeline units responsive to a determination that the instruction is a multi-part instruction, wherein the multi-part instruction includes a plurality of fields, wherein the first operation is dependent upon a first field of the plurality of fields; and performing a second operation using, in parallel, at least two pipeline units of the plurality of pipeline units dependent upon a second field of the plurality of fields.

7. The method of claim 6, further comprising performing a third operation using the first pipeline unit of the plurality of pipeline units responsive to a determination that the instruction is a single-part instruction.

8. The method of claim 6, wherein performing the third operation using the first pipeline unit of the plurality of pipeline units comprises performing a fourth operation using the second pipeline unit of the plurality of pipeline units dependent upon a previously received multi-part instruction.

9. The method of claim 6, further comprising fetching a first address responsive to the determination that the instruction is a single-part instruction.

10. The method of claim 6, further comprising generating a plurality of addresses dependent upon a subset of the plurality of fields.

11. A system, comprising: a plurality of processors, wherein each processor of the plurality of processors includes a plurality of pipeline units; and a plurality of dynamically configurable communication elements; wherein the plurality of processors and the plurality of dynamically configurable communication elements are coupled together in an interspersed arrangement; wherein each processor of the plurality of processors is configured to: receive an instruction; perform a first operation using a first pipeline unit of the plurality of pipeline units responsive to a determination that the instruction is a multi-part instruction, wherein the multi-part instruction includes a plurality of fields, wherein the first operation is dependent on a first field of the plurality of fields; and perform a second operation using, in parallel, at least two pipeline units of the plurality of pipeline units dependent upon a second field of the plurality of fields.

12. The system of claim 11, wherein each processor of the plurality of processors is further configured to perform a third operation using the first pipeline unit of the plurality of pipeline units responsive to a determination that the instruction is a single-part instruction.

13. The system of claim 12, wherein to perform the third operation using the first pipeline unit of the plurality of pipeline units responsive to the determination that the determination that the instruction is a single-part instruction, each processor of the plurality of processors is further configured to perform a fourth operation using the second pipeline unit of the plurality of pipeline units dependent upon a previously received multi-part instruction.

14. The system of claim 11, wherein each processor of the plurality of processors is further configured to generate a plurality of addresses dependent upon a subset of the plurality of fields.

15. The system of claim 11, wherein each processor of the plurality of processors is further configured to store first data dependent upon a first address of the plurality of addresses.

Power Down Unused Portions of Processor During Repeat Loops

1. An apparatus, comprising: a fetch unit configured to: receive a plurality of instructions; and identify at least one repeated instruction sequence dependent upon the received plurality of instructions, wherein the at least one repeated instruction sequence includes at least one instruction of the plurality of instructions; and an execution unit including a plurality of pipeline units, wherein the execution unit is configured to: selectively disable a first subset of the plurality of pipeline units for at least a first cycle dependent upon the identified repeated instruction sequence; and selectively disable a second subset of the plurality of pipeline units for a second cycle dependent upon the identified repeated instruction sequence.

2. The apparatus of claim 1, further comprising a plurality of address generator units, a fetch unit, and a store unit.

3. The apparatus of claim 2, wherein the store unit is configured to enter a low power mode dependent upon the at least one repeated instruction sequence.

4. The apparatus of claim 2, wherein the fetch unit is configured to enter a low power mode dependent upon the at least one repeated instruction sequence.

5. The apparatus of claim 2, wherein at least one of the plurality of address generator units is configured to enter a low power mode dependent upon the at least one repeated instruction sequence.

6. A method for operating a processor, wherein the processor includes a plurality of pipeline units, the method comprising: receiving a plurality of instructions; identify at least one repeated instruction sequence dependent upon the received plurality of instructions, wherein the at least one repeated instruction sequence includes at least one instruction; selectively disabling a first subset of the plurality of pipeline units for at least a first cycle dependent upon the identified repeated instruction sequence; and selectively disabling a second subset of the plurality of pipeline units for a second cycle dependent upon the identified repeated instruction sequence.

7. The method of claim 6, wherein the processor further includes a fetch unit, a store unit, and a plurality of address generator units.

8. The method of claim 7, further comprising disabling the store unit dependent upon the at least one repeated instruction sequence.

9. The method of claim 7, further comprising disabling the fetch unit dependent upon the at least one repeated instruction sequence.

10. The method of claim 7, further comprising selectively disabling a subset of the plurality of address generator units dependent upon the at least one repeated instruction sequence.

11. A system, comprising: a plurality of processors, wherein each processor of the plurality of processors includes a plurality of pipeline units; and a plurality of dynamically configurable communication elements; wherein the plurality of processors and the plurality of dynamically configurable communication elements are coupled together in an interspersed arrangement; wherein each processor of the plurality of processors is configured to: receive a plurality of instructions; identify at least one repeated instruction sequence dependent upon the received plurality of instructions, wherein the at least one repeated instruction sequence includes at least one instruction of the plurality of instructions; selectively disable a first subset of the plurality of pipeline units for at least a first cycle dependent upon the identified repeated instruction sequence; and selectively disable a second subset of the plurality of pipeline units for a second cycle dependent upon the identified repeated instruction sequence.

12. The system of claim 11, wherein each processor of the plurality of processors includes a plurality of address generator units, a fetch unit, and a store unit.

13. The system of claim 12, wherein the store unit is configured to enter a low power mode dependent upon the at least one repeated instruction sequence.

14. The system of claim 12, wherein the fetch unit is configured to enter a low power mode dependent upon the at least one repeated instruction sequence.

15. The system of claim 12, wherein at least one of the plurality of address generator units is configured to enter a low power mode dependent upon the at least one repeated instruction sequence.

In various embodiments a computer-readable memory medium may store program instructions executable by the processors of the MPS and/or one or more external processors to implement various functions described above, such as functions involved in swapping software applications. Generally, the computer-readable memory medium may include any set of instructions which, when executed, implement a portion or all of the functions described herein. Generally speaking, a computer-readable memory medium may include any storage media accessible by a computer during use to provide instructions and/or data to a computer system. For example, a computer-readable memory medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link. A carrier medium may include computer accessible storage media as well as transmission media such as wired or wireless transmission.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. An apparatus, comprising:
an execution unit;
a fetch unit configured to receive a multi-part instruction, wherein the multi-part instruction includes a plurality of fields; and
a plurality of address generator units;
wherein a first address generator unit of the plurality of address generator units is configured to perform a first arithmetic operation for a first thread of sub-instructions dependent upon a first field of the plurality of fields and store a result of the first arithmetic operation in a register;
wherein a second address generator unit is configured to generate at least one address of a plurality of addresses, wherein each address of the plurality of addresses is dependent upon a respective field of the plurality of fields, wherein the apparatus is configured to use the at least one address to access one or more input operands for the execution unit for a second thread of sub-instructions; and wherein the apparatus is configured to use the result of the first arithmetic operation stored in the register to access one or more input operands for the execution unit for a sub-instruction in the first thread of sub-instructions in a subsequent multi-part instruction.

2. The apparatus of claim 1, wherein the apparatus is a multi-processor array that includes a plurality of processing elements and a plurality of memory unit interspersed between the processing elements, wherein each of the processing elements includes a respective execution unit, fetch unit, plurality of address generator units, decoding circuitry, and an accumulator register;
wherein the decoding circuitry is configured to decode both single-part and multi-part instructions;
wherein ones of the processing elements are configured to store execution unit results in their respective accumulator register;
wherein ones of the processing elements are configured to transfer output of the accumulator register to an internal register in response to a first command and are configured to transfer output of the accumulator register to one of the memory units in response to a second command; and
wherein ones of the processing elements are configured to receive accumulator results from other processing elements and input the results to their respective accumulator register.

3. The apparatus of claim 2, wherein the fetch unit is further configured to fetch second data dependent upon a second address of the plurality of addresses.

4. The apparatus of claim 1, wherein a third address generator unit is configured to generate at least another address of the plurality of addresses.

5. The apparatus of claim 1, wherein each field of a subset of the plurality of fields encodes an operation to be performed by a respective address generator unit of the plurality of address generator units.

6. A method for operating a processor, the method comprising:
receiving a multi-part instruction, wherein the multi-part instruction includes a plurality of fields;
performing an arithmetic operation for a first thread of sub-instructions dependent on a first field of the plurality of fields and storing a result of the first arithmetic operation in a register;
generating a given address of a plurality of addresses dependent upon a respective field of the plurality of fields and using the given address to access one or more input operands for an execution unit for a second thread of sub-instructions; and
using the result of the first arithmetic operation stored in the register to access one or more input operands for the execution unit for a sub-instruction in the first thread of sub-instructions in a subsequent multi-part instruction.

7. The method of claim 6, further comprising storing first data dependent upon a first address of the plurality of addresses.

8. The method of claim 7, further comprising fetching second data dependent upon a second address of the plurality of addresses.

9. The method of claim 6, wherein the processor includes a plurality of address generator units, and wherein performing the arithmetic operation comprises performing the arithmetic operation using at least one address generator unit of the plurality of address generator units.

10. The method of claim 9, wherein each field of a subset of the plurality of fields encodes an operation to be performed by a respective address generator unit of the plurality of address generators units.

11. A system, comprising:
a plurality of processors; and
a plurality of dynamically configurable communication elements;
wherein the plurality of processors and the plurality of dynamically configurable communication elements are coupled together in an interspersed arrangement;
wherein a given processor of the plurality of processors is configured to:
receive a multi-part instruction, wherein the multi-part instruction includes a plurality of fields;
perform an arithmetic operation for a first thread of sub-instructions dependent upon a given field of the plurality of fields and store a result of the first arithmetic operation in a register;
generate a plurality of addresses dependent upon a subset of the plurality of fields, wherein the given processor is configured to use the plurality of addresses to access one or more input operands for an execution unit for a second thread of sub-instructions, and
use the result of the first arithmetic operation stored in the register to access one or more input operands for the execution unit for a sub-instruction in the first thread of sub-instructions in a subsequent multi-part instruction.

12. The system of claim 11, wherein each processor of the plurality of processors if further configured to store first data dependent upon a first address of the plurality of addresses.

13. The system of claim 12, wherein the given processor of the plurality of processors is further configured to fetch second data dependent upon a second address of the plurality of addresses.

14. The system of claim 11, wherein the given processor of the plurality of processors includes a plurality of address generator units.

15. The system of claim 14, wherein each field of a subset of the plurality of fields encodes an operation to be performed by a respective address generator unit of the plurality of address generator units.

* * * * *